United States Patent
Sato

(10) Patent No.: US 10,362,316 B2
(45) Date of Patent: Jul. 23, 2019

(54) IMAGE PROCESSING DEVICE AND METHOD

(75) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1039 days.

(21) Appl. No.: 13/638,477

(22) PCT Filed: Mar. 11, 2011

(86) PCT No.: PCT/JP2011/055725
§ 371 (c)(1),
(2), (4) Date: Sep. 28, 2012

(87) PCT Pub. No.: WO2011/125411
PCT Pub. Date: Oct. 13, 2011

(65) Prior Publication Data
US 2013/0022125 A1    Jan. 24, 2013

(30) Foreign Application Priority Data

Apr. 1, 2010   (JP) ............... P2010-085236
Sep. 30, 2010   (JP) ............... P2010-222298

(51) Int. Cl.
*H04N 7/32*   (2006.01)
*H04N 7/36*   (2006.01)
(Continued)

(52) U.S. Cl.
CPC ........... *H04N 19/174* (2014.11); *H04N 19/13* (2014.11); *H04N 19/139* (2014.11); *H04N 19/52* (2014.11); *H04N 19/593* (2014.11); *H04N 19/70* (2014.11)

(58) Field of Classification Search
CPC ........... H04N 7/36; H04N 7/32; H04N 19/52; H04N 19/139; H04N 19/174;
(Continued)

(56) References Cited

U.S. PATENT DOCUMENTS 5,175,618 A * 12/1992 Ueda .................. H04N 19/105
                                                    348/699
5,278,706 A *  1/1994 Iketani .................. G11B 15/473
                                                    360/27
(Continued)

FOREIGN PATENT DOCUMENTS

CN    101422047 A    4/2009
JP    05-227522    9/1993
(Continued)

OTHER PUBLICATIONS

Yang, J.Y., et al., "Motion Vector Coding with Optimal PMV Selection," ITU—Telecommunications Standardization Sector, Study Group 16, Question 6, VCEG-AI22, pp. 1-6, (2013).
(Continued)

*Primary Examiner* — Dave Czekaj
*Assistant Examiner* — Kehinde Abimbola
(74) *Attorney, Agent, or Firm* — Paratus Law Group, PLLC

(57) ABSTRACT

The present disclosure relates to an image processing device and method whereby higher encoding efficiency can be achieved.
A prediction motion vector generating unit 76 uses peripheral motion vector information supplied thereto to generate multiple types of prediction motion vector information, and supplies each prediction motion vector information and code numbers assigned to the prediction motion vector information by a code number assigning unit 77 to a motion prediction/compensation unit 75. The code number assigning unit 77 supplies code number assignation information indicating which code numbers have been assigned to which prediction motion vector information, to a lossless encoding unit 66. the present technology can be applied to an image encoding device which performs encoding based on the H.264/AVC format, for example.

8 Claims, 35 Drawing Sheets

| A | e₁ | b |   | A |
|---|----|---|---|---|
|   | e₂ | e₃ |   |   |
| d |    | c |   | d |
|   |    |   |   |   |
| A |    | b |   | A |

(51) Int. Cl.
   *H04N 19/174* (2014.01)
   *H04N 19/52* (2014.01)
   *H04N 19/139* (2014.01)
   *H04N 19/70* (2014.01)
   *H04N 19/13* (2014.01)
   *H04N 19/593* (2014.01)

(58) Field of Classification Search
   CPC ...... H04N 19/593; H04N 19/70; H04N 19/13; H04N 19/176; H04N 19/146; H04N 19/51; H04N 19/61; H04N 19/46; H04N 19/63; H04N 19/30; H04N 19/436; H04N 19/423; H04N 7/26755; H04N 9/64; H04N 9/8042; H04N 19/11; H04N 19/105; H04N 19/159; H04N 19/60; H04N 19/136; H04N 19/109; H04N 19/517; H04N 19/577
   See application file for complete search history.

(56) References Cited

U.S. PATENT DOCUMENTS

| | | | | |
|---|---|---|---|---|
| 6,987,884 B2* | 1/2006 | Kondo | H04N 5/21 | 345/641 |
| 7,023,919 B2* | 4/2006 | Cho | H04N 19/517 | 348/394.1 |
| 7,095,896 B2* | 8/2006 | Abe | G06T 9/004 | 341/67 |
| 7,466,774 B2* | 12/2008 | Boyce | H04N 19/105 | 375/240.13 |
| 7,643,559 B2* | 1/2010 | Kato | H04N 19/176 | 375/240.23 |
| 7,929,605 B2* | 4/2011 | Kimata | H04N 19/105 | 375/240.12 |
| 7,973,648 B2* | 7/2011 | Kawakita | G08C 19/28 | 340/12.23 |
| 8,111,429 B2* | 2/2012 | Kim | G06T 11/001 | 345/475 |
| 8,144,789 B2* | 3/2012 | Tasaka | H04N 19/172 | 345/589 |
| 8,204,113 B2* | 6/2012 | Kondo | H04N 19/30 | 375/240.12 |
| 8,693,546 B2* | 4/2014 | Takahashi | H04N 19/52 | 348/699 |
| 8,861,596 B2* | 10/2014 | Koyabu | H04N 19/00187 | 375/240.03 |
| 9,282,345 B2* | 3/2016 | Nakagami | H04N 19/105 | |
| 2002/0075957 A1* | 6/2002 | Cho | H04N 19/51 | 375/240.12 |
| 2003/0035594 A1* | 2/2003 | Kondo | H04N 5/21 | 382/298 |
| 2003/0128762 A1 | 7/2003 | Nakagawa et al. | | |
| 2004/0028282 A1* | 2/2004 | Kato | H04N 19/176 | 382/236 |
| 2004/0184538 A1* | 9/2004 | Abe | G06T 9/004 | 375/240.12 |
| 2004/0264570 A1* | 12/2004 | Kondo | H04N 19/70 | 375/240.16 |
| 2005/0147167 A1* | 7/2005 | Dumitras | H04N 19/139 | 375/240.16 |
| 2006/0153297 A1* | 7/2006 | Boyce | H04N 19/105 | 375/240.16 |
| 2007/0098068 A1* | 5/2007 | Kimata | H04N 19/105 | 375/240.12 |
| 2007/0153332 A1* | 7/2007 | Kim | G06T 5/50 | 358/3.13 |
| 2007/0274387 A1* | 11/2007 | Kurahashi | G06K 9/3266 | 375/240.13 |
| 2008/0025396 A1* | 1/2008 | Tasaka | H04N 19/172 | 375/240.12 |
| 2008/0088495 A1* | 4/2008 | Kawakita | G08C 19/28 | 341/176 |
| 2008/0100744 A1* | 5/2008 | Lee | H04N 5/144 | 348/452 |
| 2008/0112482 A1* | 5/2008 | Ueda | G11B 20/00007 | 375/240.03 |
| 2008/0317291 A1* | 12/2008 | Kondo | G11B 27/3036 | 382/107 |
| 2009/0028241 A1* | 1/2009 | Takahashi | H04N 19/176 | 375/240.12 |
| 2009/0129464 A1 | 5/2009 | Jung | | |
| 2009/0257491 A1* | 10/2009 | Kondo | H04N 19/30 | 375/240.12 |
| 2009/0316789 A1 | 12/2009 | Bosma | | |
| 2009/0323808 A1* | 12/2009 | Lin | H04N 19/139 | 375/240.16 |
| 2010/0150253 A1* | 6/2010 | Kuo | H04N 19/61 | 375/240.27 |
| 2011/0013695 A1* | 1/2011 | Endo | H04N 19/176 | 375/240.16 |
| 2011/0019736 A1* | 1/2011 | Koyabu | H04N 19/00187 | 375/240.03 |
| 2011/0142133 A1* | 6/2011 | Takahashi | H04N 19/52 | 375/240.16 |
| 2011/0164683 A1* | 7/2011 | Takahashi | H04N 19/70 | 375/240.16 |
| 2011/0194611 A1* | 8/2011 | Dumitras | H04N 19/139 | 375/240.16 |
| 2011/0255602 A1* | 10/2011 | Kondo | H04N 19/61 | 375/240.16 |
| 2011/0293014 A1* | 12/2011 | Nakagami | H04N 19/105 | 375/240.16 |
| 2012/0002725 A1* | 1/2012 | Kazui | H04N 19/105 | 375/240.12 |
| 2012/0051433 A1* | 3/2012 | Roji | H04N 19/61 | 375/240.16 |
| 2015/0110195 A1* | 4/2015 | Nakagami | H04N 19/105 | 375/240.16 |

FOREIGN PATENT DOCUMENTS

| | | |
|---|---|---|
| JP | 10-224000 | 8/1998 |
| JP | 10-224800 | 8/1998 |
| JP | 11-75188 | 3/1999 |
| JP | 2008-211697 | 9/2008 |
| JP | 2008-283490 | 11/2008 |
| JP | 2009-523348 | 6/2009 |
| JP | 2009-171608 | 7/2009 |
| KR | 10-0252342 | 4/2000 |
| WO | WO2009/115901 | 9/2009 |
| WO | WO2011/061880 A1 | 5/2011 |

OTHER PUBLICATIONS

Jun. 23, 2015, CN communication issued for related CN application No. 201180015616.

Jul. 28, 2015, JP communication issued for related JP application No. 2014-046193.

Jul. 28, 2015, JP communication issued for related JP application No. 2012-509364.

Sep. 29, 2016, JP communication issued for related JP application No. 2015-176319.

Jun. 21, 2016, Japanese Office Action for related JP Application No. 2015-16472.

Jun. 21, 2016, Japanese Office Action for related JP Application No. 2015-16473.

Jun. 27, 2016, Korean Office Action for related KR Application No. 10-2016-7015921.

Jul. 1, 2016, Chinese Office Action for related CN Application No. 201180015616.0.

Oct. 23, 2015, JP communication issued for related JP application No. 2012-509364.

Oct. 23, 2015, JP communication issued for related JP application No. 2014-046193.

Nov. 6, 2015, KR communication issued for related KR application No. 10-2012-7024692.

(56) References Cited

OTHER PUBLICATIONS

Dec. 4, 2015, EP communication issued for related EP application No. 11765313.9.

Joel Jung, et al., Competition-Based Scheme for Motion Vector Selection and Coding, ITU—Telecommunications Standardization Sector, Study Group 16 Question 6, Video Coding Experts Group (VCEG), Jul. 17-18, 2006, pp. 1-7, $29^{th}$ Meeting: Klagenfurt, Austria.

Juan Liu, et al., Adaptive Motion Vector Prediction Based on Spatiotemporal Correlation, Department of Electronics and Information Engineering, Huazhong University of Science and Technology (HUST), IEEE, 2006, pp. 1-4, Wuhan, China.

Kazushi Sato, On Motion Vector Coding, Joint Collaborative Team on Video Coding (JCT-VC) of ITU-T SG16 WP3 and ISO/IEC JTC1/SC29/WG11, Jul. 21-28, 2010, pp. 1-9, $2^{nd}$ Meeting: Geneva, CH.

Teruhiko Suzuki, Description of video coding technology proposal by Sony, Joint Collaborative Team on Video Coding (JCT-VC) of ITU-T SG16 WP3 and ISO/IEC JTC1/SC29/WG11, Apr. 15-23, 2010, pp. 1-51, $1^{st}$ Meeting: Dresden, DE.

J. Jung, et al., RD-Optimized Competition Scheme for Efficient Motion Prediction, Orange-France Telecom R&D, Visual Communications and Image Processing, 2007, pp. 1-11, Paris, France.

Apr. 28, 2015, JP communication issued for related JP application No. 2014-046193.

Apr. 28, 2015, JP communication issued for related JP application No. 2012-509364.

Feb. 3, 2015, JP communication issued for related JP application No. 2012-509364.

Feb. 3, 2015, JP communication issued for related JP application No. 2014-046193.

Feb. 10, 2017, KR communication for related KR application No. 10-2017-7002397.

Feb. 14, 2017, KR communication for related KR application No. 10-2017-7002421.

\* cited by examiner

FIG. 8

| Code Number | Code Words |
|---|---|
| 0 | 1 |
| 1 | 010 |
| 2 | 011 |
| 3 | 00100 |
| 4 | 00101 |
| 5 | 00110 |
| 6 | 00111 |
| ... | ... |

FIG. 9

| v | Code Number |
|---|---|
| 0 | 0 |
| 1 | 1 |
| -1 | 2 |
| 2 | 3 |
| -2 | 4 |
| 3 | 5 |
| ... | ... |

| Code Symbol | Binarization |
|---|---|
| 0 | 0 |
| 1 | 10 |
| 2 | 110 |
| 3 | 1110 |
| 4 | 11110 |
| 5 | 111110 |
| ... | ... |

FIG. 14

```
SliceHeader()
{
    ---
    ---
    ---
    mv_predictor_definition_flag
    if (mv_predictor_definition_flag == 1)
        {
            code_number_for_predictor_0;
            code_number_for_predictor_1;
            ---
        }
    ---
    ---
    ---
}
```

IMAGE PROCESSING DEVICE AND METHOD

TECHNICAL FIELD

The present invention relates to an image processing device and method, and specifically relates to an image processing device and method which enable higher encoding efficiency to be realized.

BACKGROUND ART

In recent years, devices have come into widespread use which subject an image to compression encoding by employing an encoding format handling image information as digital signals, and at this time compress the image by orthogonal transform such as discrete cosine transform or the like and motion compensation, taking advantage of redundancy which is a feature of the image information, in order to perform highly efficient transmission and storage of information. Examples of this encoding method include MPEG (Moving Picture Experts Group) and so forth.

In particular, MPEG2 (ISO/IEC 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. By employing the MPEG2 compression format, a code amount (bit rate) of 18 through 22 Mbps is allocated in the event of an interlaced scanning image of high resolution having 1920×1088 pixels, for example. Thus, a high compression rate and excellent image quality can be realized.

MPEG2 has principally been aimed at high image quality encoding adapted to broadcasting usage, but does not handle lower code amount (bit rate) than the code amount of MPEG1, i.e., an encoding format having a higher compression rate. It is expected that demand for such an encoding format will increase from now on due to the spread of personal digital assistants, and in response to this, standardization of the MPEG4 encoding format has been performed. With regard to an image encoding format, the specification thereof was confirmed as an international standard as ISO/IEC 14496-2 in December in 1998.

Further, in recent years, standardization of a standard called H.26L (ITU-T Q6/16 VCEG) has progressed with image encoding for television conference usage as the object. With H.26L, it has been known that though greater computation amount is requested for encoding and decoding thereof as compared to a conventional encoding format such as MPEG2 or MPEG4, higher encoding efficiency is realized. Also, currently, as part of activity of MPEG4, standardization for taking advantage of a function that is not supported by H.26L with this H.26L taken as base to realize higher encoding efficiency has been performed as Joint Model of Enhanced-Compression Video Coding. As a schedule of standardization, H.264 and MPEG-4 Part10 (Advanced Video Coding, hereafter referred to as H.264/AVC) become an international standard in March, 2003.

Further, as an expansion thereof, standardization of FRExt (Fidelity Range Extension), which includes encoding tools necessary for operations such as RGB, 4:2:2, 4:4:4, and MPEG-2 stipulated 8×8DCT and quantization matrices, has been completed in February of 2005. Accordingly, an encoding format capable of expressing well film noise included in movies using H.264/AVC was obtained, and is to be used in a wide range of applications such as Blu-Ray Disc®.

However, as of recent, there are increased needs for even further high compression encoding, such as to compress images around 4000×2000 pixels, which is fourfold that of Hi-Vision images, or such as to distribute Hi-Vision images in an environment with limited transmission capacity, such as the Internet. Accordingly, the VCEG (=Video Coding Expert Group) under ITU-T, described above, is continuing study relating to improved encoding efficiency.

Incidentally, for example, with the MPEG2 format, motion prediction/compensation processing with ½ pixel precision has been performed by linear interpolation processing. On the other hand, with the H.264/AVC format, prediction/compensation processing with ¼ pixel precision using 6-tap FIR (Finite Impulse Response Filter) filter as an interpolation filter has been performed.

FIG. 1 is a diagram for describing prediction/compensation processing with ¼ pixel precision according to the H.264/AVC format. With the H.264/AVC format, prediction/compensation processing with ¼ pixel precision using 6-tap FIR (Finite Impulse Response Filter) filter is performed.

With the example in FIG. 1, positions A indicate the positions of integer precision pixels, and positions b, c, and d indicate positions with ½ pixel precision, and positions e1, e2, and e3 indicate positions with ¼ pixel precision. First, hereafter, Clip( ) is defined as with the following Expression (1).

[Mathematical Expression 1]

$$Clip1(a) = \begin{cases} 0; \text{ if } (a < 0) \\ a; \text{ otherwise} \\ \max\_pix; \text{ if } (a > \max\_pix) \end{cases} \quad (1)$$

Note that in the event that the input image has 8-bit precision, the value of max_pix is 255.

The pixel values in the positions b and d are generated as with the following Expression (2) using a 6-tap FIR filter.

[Mathematical Expression 2]

$$F = A_{-2} - 5 \cdot A_{-1} + 20 \cdot A_0 + 20 \cdot A_1 - 5 \cdot A_2 + A_3$$

$$b, d = Clip1((F+16) >> 5) \quad (2)$$

The pixel value in the position c is generated as with the following Expression (3) by applying a 6-tap FIR filter in the horizontal direction and the vertical direction.

[Mathematical Expression 3]

$$F = b_{-2} - 5 \cdot b_{-1} + 20 \cdot b_0 + 20 \cdot b_1 - 5 \cdot b_2 + b_3$$

or $$F = d_{-2} - 5 \cdot d_{-1} + 20 \cdot d_0 + 20 \cdot d_1 - 5 \cdot d_2 + d_3$$

$$c = Clip1((F+512) >> 10) \quad (3)$$

Note that Clip processing is lastly executed only once after both of sum-of-products processing in the horizontal direction and the vertical direction are performed.

Positions e1 through e3 are generated by linear interpolation as shown in the following Expression (4).

[Mathematical Expression 4]

$$e_1 = (A+b+1) \gg 1$$

$$e_2 = (b+d+1) \gg 1$$

$$e_3 = (b+c+1) \gg 1 \qquad (4)$$

Also, with the MPEG2 format, in the event of the frame motion compensation mode, motion prediction/compensation processing is performed in increments of 16×16 pixels, and in the event of the field motion compensation mode, motion prediction/compensation processing is performed as to each of the first field and the second field in increments of 16×8 pixels.

On the other hand, with motion prediction compensation with the H.264/AVC format, the macroblock size is 16×16 pixels, but motion prediction/compensation can be performed with the block size being variable.

FIG. 2 is a diagram illustrating an example of the block size of motion prediction/compensation according to the H.264/AVC format.

Macroblocks made up of 16×16 pixels divided into 16×16-pixel, 16×8-pixel, 8×16-pixel, and 8×8-pixel partitions are shown from the left in order on the upper tier in FIG. 2. 8×8-pixel partitions divided into 8×8-pixel, 8×4-pixel, 4×8-pixel, and 4×4-pixel sub partitions are shown from the left in order on the lower tier in FIG. 2.

That is to say, with the H.264/AVC format, one macroblock may be divided into one of 16×16-pixel, 16×8-pixel, 8×16-pixel, and 8×8-pixel partitions with each partition having independent motion vector information. Also, an 8×8-pixel partition may be divided into one of 8×8-pixel, 8×4-pixel, 4×8-pixel, and 4×4-pixel sub partitions with each sub partition having independent motion vector information.

Also, with the H.264/AVC format, motion prediction/compensation processing of multi-reference frames is also performed.

FIG. 3 is a diagram for describing the prediction/compensation processing of multi-reference frames according to the H.264/AVC format. With the H.264/AVC format, the motion prediction/compensation method of multi-reference frames (Multi-Reference Frame) is stipulated.

With the example in FIG. 3, the current frame Fn to be encoded from now on, and encoded frames Fn-5 through Fn-1, are shown. The frame Fn-1 is, on the temporal axis, a frame one frame before the current frame Fn, the frame Fn-2 is a frame two frames before the current frame Fn, and the frame Fn-3 is a frame three frames before the current frame Fn. Similarly, the frame Fn-4 is a frame four frames before the current frame Fn, and the frame Fn-5 is a frame five frames before the current frame Fn. In general, the closer to the current frame Fn a frame is on the temporal axis, the smaller a reference picture number (ref_id) to be added is. Specifically, the frame Fn-1 has the smallest reference picture number, and hereafter, the reference picture numbers are small in the order of Fn-2, . . . , Fn-5.

With the current frame Fn, a block A1 and a block A2 are shown, a motion vector V1 is searched with assuming that the block A1 is correlated with a block A1' of the frame Fn-2 that is two frames before the current frame Fn. Similarly, a motion vector V2 is searched with assuming that the block A2 is correlated with a block A1' of the frame Fn-4 that is four frames before the current frame Fn.

As described above, with the H.264/AVC format, different reference frames may be referenced in one frame (picture) with multi-reference frames stored in memory. That is, independent reference frame information (reference picture number (ref_id)) may be provided for each block in one picture, such that the block A1 references the frame Fn-2, and the block A2 references the frame Fn-4, for example.

Here, the blocks indicate one of 16×16-pixel, 16×8-pixel, 8×16-pixel, and 8×8-pixel partitions described with reference to FIG. 2. Reference frames within an 8×8-pixel sub-block partition have to agree.

As described above, with the H.264/AVC format, by the ¼-pixel motion prediction/compensation processing described above with reference to FIG. 1, and the motion prediction/compensation processing described above with reference to FIG. 2 and FIG. 3 being performed, vast amounts of motion vector information are generated, and if these are encoded without change, deterioration in encoding efficiency is caused. In response to this, with the H.264/AVC format, reduction in motion vector coding information has been realized, according to a method shown in FIG. 4.

FIG. 4 is a diagram for describing a motion vector information generating method according to the H.264/AVC format.

With the example in FIG. 4, a current block E to be encoded from now on (e.g., 16×16 pixels), and blocks A through D, which have already been encoded, adjacent to the current block E are shown.

That is to say, the block D is adjacent to the upper left of the current block E, the block B is adjacent to above the current block E, the block C is adjacent to the upper right of the current block E, and the block A is adjacent to the left of the current block E. Note that the reason why the blocks A through D are not sectioned is because each of the blocks represents a block having one structure of 16×16 pixels through 4×4 pixels described above with reference to FIG. 2.

For example, let us say that motion vector information as to X (=A, B, C, D, E) is represented with $mv_X$. First, prediction motion vector information $pmv_E$ as to the current block E is generated as with the following Expression (5) by median prediction using motion vector information regarding the blocks A, B, and C.

$$pmv_E = med(mv_A, mv_B, mv_C) \qquad (5)$$

The motion vector information regarding the block C may not be usable (may be unavailable) due to a reason such as being at the edge of an image frame, not having been encoded yet, or the like. In this case, the motion vector information regarding the block D is used instead of the motion vector information regarding the block C.

Data $mvd_E$ to be added to the header portion of the compressed image, serving as the motion vector information as to the current block E, is generated as with the following Expression (6) using $pmv_E$.

$$mvd_E = mv_E - pmv_E \qquad (6)$$

Note that, in reality, processing is independently performed as to the components in the horizontal direction and vertical direction of the motion vector information.

In this way, prediction motion vector information is generated, difference motion vector information that is difference between the prediction motion vector information generated based on correlation with an adjacent block, and the motion vector information is added to the header portion of the compressed image, whereby the motion vector information can be reduced.

Also, though the information amount of the motion vector information regarding B pictures is vast, with the H.264/AVC format, a mode referred to as a direct mode is prepared. In the direct mode, motion vector information is not stored in a compressed image.

That is to say, on the decoding side, with motion vector information around the current block, or a reference picture, the motion vector information of the current block is extracted from the motion vector information of a co-located block that is a block having the same coordinates as the current block. Accordingly, the motion vector information does not have to be transmitted to the decoding side.

This direct mode includes two types, a spatial direct mode (Spatial Direct Mode) and a temporal direct mode (Temporal Direct Mode). The spatial direct mode is a mode for taking advantage of correlation of motion information principally in the spatial direction (horizontal and vertical two-dimensional space within a picture), and generally has an advantage in the event of an image including similar motions of which the motion speeds vary. On the other hand, the temporal direct mode is a mode for taking advantage of correlation of motion information principally in the temporal direction, and generally has an advantage in the event of an image including different motions of which the motion speeds are constant.

Which is to be employed of these spatial direct mode and temporal direct mode can be switched for each slice.

Referencing FIG. 4 again, the spatial direct mode according to the H.264/AVC format will be described. With the example in FIG. 4, as described above, the current block E to be encoded from now on (e.g., 16×16 pixels), and the blocks A through D, which have already been encoded, adjacent to the current block E are shown. Also, the motion vector information as to X (=A, B, C, D, E) is represented with $mv_X$, for example.

The prediction motion vector information $pmv_E$ as to the current block E is generated as with the above-described Expression (5) by median prediction using the motion vector information regarding the blocks A, B, and C. Also, motion vector information $mv_E$ as to the current block E in the spatial direct mode is represented with the following Expression (7).

$$mv_E = pmv_E \quad (7)$$

That is to say, in the spatial direct mode, the prediction motion vector information generated by median prediction is taken as the motion vector information of the current block. That is to say, the motion vector information of the current block is generated from the motion vector information of encoded blocks. Accordingly, the motion vector according to the spatial direct mode can also be generated on the decoding side, and accordingly, the motion vector information does not have to be transmitted to the decoding side.

Next, the temporal direct mode according to the H.264/AVC format will be described with reference to FIG. 5.

With the example in FIG. 5, temporal axis t represents elapse of time, an L0 (List0) reference picture, the current picture to be encoded from now on, and an L1 (List1) reference picture are shown from the left in order. Note that, with the H.264/AVC format, the row of the L0 reference picture, current picture, and L1 reference picture is not restricted to this order.

The current block of the current picture is included in a B slice, for example. Accordingly, with regard to the current block of the current picture, L0 motion vector information $mv_{L0}$ and L1 motion vector information $mv_{L1}$ based on the temporal direct mode are calculated as to the L0 reference picture and L1 reference picture.

Also, with the L0 reference picture, motion vector information $mv_{col}$ in a co-located block that is a block positioned in the same spatial address (coordinates) as the current block to be encoded from now on is calculated based on the L0 reference picture and L1 reference picture.

Now, let us say that distance on the temporal axis between the current picture and L0 reference picture is taken as $TD_B$, and distance on the temporal axis between the L0 reference picture and L1 reference picture is taken as $TD_D$. In this case, the L0 motion vector information $mv_{L0}$ in the current picture, and the L1 motion vector information $mv_{L1}$ in the current picture can be calculated with the following Expression (8).

[Mathematical Expression 5]

$$mv_{L0} = \frac{TD_B}{TD_D} mv_{col} \quad (8)$$

$$mv_{L1} = \frac{TD_D - TD_B}{TD_D} mv_{col}$$

Note that, with the H.264/AVC format, there is no information equivalent to distances $TD_B$ and $TD_D$ on the temporal axis t as to the current picture within the compressed image. Accordingly, POC (Picture Order Count) that is information indicating the output sequence of pictures is employed as the actual values of the distances $TD_B$ and $TD_D$.

Also, with the H.264/AVC format, the direct mode can be defined with increments of 16×16 pixel macroblocks, or 8×8 pixel blocks.

Now, referencing FIG. 4, NPL 1 proposes the following method to improve motion vector encoding using median prediction.

That is to say, the proposal is to adaptively use one of spatial prediction motion vector information (Spatial Predictor) obtained from the above-described Expression (5), and also temporal prediction motion vector information (Temporal Predictor) and spatio-temporal prediction motion vector information (Spatio-Temporal Predictor) which will be described with reference to FIG. 6, as prediction motion vector information.

With the example in FIG. 6, there are shown a frame N which is the current frame to be encoded, and a frame N-1 which is a reference frame referenced at the time of performing searching of motion vectors.

In frame N, the current block to be now encoded has motion vector information my indicated as to the current block, and the already-encoded blocks adjacent to the current block each have motion vector information $mv_a$, $mv_b$, $mv_c$, and $mv_d$ as to the respective blocks.

Specifically, the block adjacent to the current block at the upper left has the motion vector information $mv_d$ indicated corresponding to that block, and the block adjacent above the current block has the motion vector information $mv_b$ indicated corresponding to that block. The block adjacent to the current block at the upper right has the motion vector information $mv_c$ indicated corresponding to that block, and the block adjacent to the current block at the left has the motion vector information $mv_a$ indicated corresponding to that block.

In frame N-1, a corresponding block (Co-Located block) to the current block has motion vector information $mv_{col}$ indicated as to the corresponding block. Note that here, a corresponding block is a block in an already-encoded frame that is different from the current frame (a frame situated before or after), and is a block at a position corresponding to the current block.

Also, in frame N-1, the blocks adjacent to the corresponding block have motion vector information $mv_{t4}$, $mv_{t0}$, $mv_{t7}$, $mv_{t1}$, $mv_{t3}$, $mv_{t5}$, $mv_{t2}$, and $mv_{t6}$, indicated respectively as to each block.

Specifically, the block adjacent to the corresponding block at the upper left has motion vector information $mv_{t4}$ indicated corresponding to that block, and the block adjacent above the corresponding block has motion vector information $mv_{t0}$ indicated corresponding to that block. The block adjacent to the corresponding block at the upper right has motion vector information $mv_{t7}$ indicated corresponding to that block, and the block adjacent to the corresponding block at the left has motion vector information $mv_{t1}$ indicated corresponding to that block. The block adjacent to the corresponding block at the right has motion vector information $mv_{t3}$ indicated corresponding to that block, and the block adjacent to the corresponding block at the lower left has motion vector information $mv_{t5}$ indicated corresponding to that block. The block adjacent below the corresponding block has motion vector information $mv_{t2}$ indicated corresponding to that block, and the block adjacent to the corresponding block at the lower right has motion vector information $mv_{t6}$ indicated corresponding to that block.

Also, while the prediction motion vector information pmv in the above-described Expression (5) was generated is motion vector information of blocks adjacent to the current block, the respective prediction motion vector information $pmv_{tm5}$, $pmv_{tm9}$, and $pmv_{spt}$, are defined as with the following Expressions (9) and (10). Note that of these, $pmv_{tm5}$ and $pmv_{tm9}$ are temporal prediction motion vector information, and $pmv_{spt}$ is spatio-temporal prediction motion vector information.

Temporal Predictor:

$$pmv_{tm5}=med(mv_{col}, mv_{t0}, \ldots, mv_{t3})$$

$$pmv_{tm9}=med(mv_{col}, mv_{t0}, \ldots, mv_{t7}) \quad (9)$$

Spatio-Temporal Predictor:

$$pmv_{spt}=med(mv_{col}, mv_{col}, mv_a, mv_b, mv_c) \quad (10)$$

As to which prediction motion vector information to use of Expression (5), Expression (9), and Expression (10), cost function values are calculated for cases of using each prediction motion vector information, and thus selected. A flag indicating information relating to which prediction motion vector information has been used for each block is then transmitted to the decoding side.

Note that the above-described drawings and Expressions will also be used in description of the present application as appropriate.

CITATION LIST

Non Patent Literature

NPL 1: "Motion Vector Coding with Optimal PMV Selection", VCEG-AI22, ITU-Telecommunications Standardization Sector STUDY GROUP 16 Question 6, July 2008

SUMMARY OF INVENTION

Technical Problem

Incidentally, with the proposal according to the above-described NPL 1, which code numbers will be assigned as to which prediction motion vector information is fixed.

Now, with the H.264/AVC format, lossless encoding such as variable-length encoding like CAVLC (Context-Adaptive Variable Length Coding), or arithmetic encoding like CABAC (Context-Adaptive Binary Arithmetic Coding) is stipulated.

In both cases of these CAVLC format and CABAC format, prediction motion vector information with higher frequency of appearance should be assigned smaller code numbers, and the frequency of appearance of each prediction motion vector information should differ for each sequence and bit rate. However, these are fixed, which might interfere with improvement in encoding efficiency.

The present disclosure has been made in light of this situation, and enables higher encoding efficiency to be achieved.

Solution to Problem

One aspect of the present disclosure is an image processing device including: a code number assigning unit configured to control a way in which code numbers are assigned to prediction motion vector information, in accordance with motion features of an image; and a prediction motion vector generating unit configured to use peripheral motion information which is motion information of a peripheral region of a current region which is to be processed to generate prediction motion vector information of the region, and assign the code number to the prediction motion vector information that has been generated, following the way in which code numbers are assigned that has been decided by the code number assigning unit.

The code number assigning unit may control the way in which code numbers are assigned to the prediction motion vector information, for each increment region of prediction processing.

In the event that the region is a still region, the code number assigning unit may control the way in which code numbers are assigned such that a small code number is assigned to temporal prediction motion vector information.

In the event that the region is a still region, the prediction motion vector generating unit may generate only the temporal prediction motion vector information, and assigns to the temporal prediction motion vector information a code number decided by the code number assigning unit.

In the event that the region is a moving region, the code number assigning unit may control the way in which code numbers are assigned such that a small code number is assigned to spatial prediction motion vector information.

The image processing device may further include: a still region determining unit configured to determine whether or not a current region is a still region; with the code number assigning unit controlling the way in which code numbers are assigned to prediction motion vector information of the current region, following the determination results of the still region determining unit.

The still region determining region may determine whether or not a current region is a still region using motion information of a Co-Located region of the current region.

The still region determining region may determine a current region to be a still region in the event that absolute values of a horizontal component of motion information of the Co-Located region of the current region and a vertical component of the motion information are within a predetermined threshold value, and also in the event that a reference index is 0, a Ref_PicR_reordering is applied, or a reference index has a POC value indicating a picture immediately prior.

The code number assigning unit may control the way in which code numbers are assigned to the prediction motion vector information, in accordance with user settings.

The code number assigning unit may control the way in which code numbers are assigned to the prediction motion vector information, so as to raise encoding efficiency.

The code number assigning unit may control the way in which code numbers are assigned to the prediction motion vector information, so as to optimize subjective image quality.

The code number assigning unit may control the way in which code numbers are assigned to the prediction motion vector information, for each slice.

The image processing device may further include a flag generating unit configured to generate a flag indicating a variable mode in which the way in which the code numbers are assigned is changeable.

The prediction motion vector generating unit may generate multiple prediction motion vector information for each prediction mode; with the image processing device further including: a difference motion vector generating unit configured to select, for each the prediction mode, optimal prediction motion vector information from the plurality of prediction motion vector information generated by the prediction motion vector generating unit, and generating a difference motion vector which is the difference as to a motion vector of the current region; a mode determining unit configured to determine from the prediction modes, an optimal prediction mode; and a transmission unit configured to transmit the difference motion vector information of the prediction mode determined by the mode determining unit, and the code number of the prediction motion vector information of the prediction mode.

The image processing device may further include an encoding unit configured to encode the difference motion vector information of the prediction mode determined by the mode determining unit, and the code number of the prediction motion vector information of the prediction mode; with the transmission unit transmitting the difference vector information encoded by the encoding unit, and the code number of the prediction motion vector information.

An aspect of the present disclosure is also an image processing method of an image processing device, the method including: a code number assigning unit controlling a way in which code numbers are assigned to prediction motion vector information, in accordance with motion features of an image; and a prediction motion vector generating unit using peripheral motion information which is motion information of a peripheral region of a current region which is to be processed to generate prediction motion vector information of the region, and assigning the code number to the prediction motion vector information that has been generated, following the way in which code numbers are assigned that has been decided.

Another aspect of the present disclosure is an image processing device including: a code number assigning unit configured to control a way in which code numbers are assigned to prediction motion vector information, in accordance with motion features of an image; and a prediction motion vector reconstructing unit configured to obtain a code number of prediction motion vector information of a current region which is to be processed, and reconstruct the prediction motion vector information from the code number, following the way in which code numbers are assigned that has been decided by the code number assigning unit.

The code number assigning unit may control the way in which code numbers are assigned to the prediction motion vector information, for each increment region of prediction processing.

In the event that the region is a still region, the code number assigning unit may control the way in which code numbers are assigned such that a small code number is assigned to temporal prediction motion vector information.

In the event that the region is a moving region, the code number assigning unit may control the way in which code numbers are assigned such that a small code number is assigned to spatial prediction motion vector information.

The image processing device may further include: a still region determining unit configured to determine whether or not a current region is a still region; with the code number assigning unit controlling the way in which code numbers are assigned to prediction motion vector information of the current region, following the determination results of the still region determining unit.

The still region determining region may determine whether or not a current region is a still region using motion information of a Co-Located region of the current region.

The still region determining region may determine a current region to be a still region in the event that absolute values of a horizontal component of motion information of the Co-Located region of the current region and a vertical component of the motion information are within a predetermined threshold value, and also in the event that a reference index is 0, a Ref_PicR_reordering is applied, or a reference index has a POC value indicating a picture immediately prior.

The code number assigning unit may control the way in which code numbers are assigned to the prediction motion vector information, in accordance with user settings.

The code number assigning unit may control the way in which code numbers are assigned to the prediction motion vector information, so as to raise encoding efficiency.

The code number assigning unit may control the way in which code numbers are assigned to the prediction motion vector information, so as to optimize subjective image quality.

The code number assigning unit may control the way in which code numbers are assigned to the prediction motion vector information, for each slice.

The image processing device may further include: a flag obtaining unit configured to obtain a flag indicating a variable mode in which the way in which the code numbers are assigned is changeable; and in the event that the flag obtained by the flag indicates the variable mode, the code number assigning unit may control the way in which the code numbers are assigned to the prediction motion vector information.

Another aspect of the present invention is also an image processing method of an image processing device, the method including: a code number assigning unit controlling a way in which code numbers are assigned to prediction motion vector information, in accordance with motion features of an image; and a prediction motion vector reconstructing unit obtaining a code number of prediction motion vector information of a current region which is to be processed, and reconstructing the prediction motion vector information from the code number, following the way in which code numbers are assigned that has been decided.

With one aspect of the present invention, the way in which code numbers are assigned to prediction motion vector information is controlled in accordance with motion features of an image, peripheral motion information which is motion information of a peripheral region of a current region which is to be processed is used to generate prediction motion vector information of the region, and the code number is assigned to the prediction motion vector information that has been generated, following the way in which code numbers are assigned that has been decided.

With another aspect of the present invention, the way in which code numbers are assigned to prediction motion vector information is controlled in accordance with motion features of an image, a code number of prediction motion vector information of a current region which is to be processed is obtained, and the prediction motion vector information from the code number is reconstructed, following the way in which code numbers are assigned that has been decided.

Note that the above-described image processing devices may each be stand-alone devices, or may be internal blocks making up a single image encoding device or image decoding device.

Advantageous Effects of Invention

According to the present disclosure, encoding efficiency and subjective image quality can be improved. Also, according to the present disclosure, higher encoding efficiency can be achieved.

BRIEF DESCRIPTION OF DRAWINGS

FIG. 8 is a diagram for describing Exponential Golomb coding.

FIG. 9 is a diagram for describing the correlation relation between syntax elements and code numbers without signs.

FIG. 14 is a diagram for describing a slice header syntax.

DESCRIPTION OF EMBODIMENTS

Hereafter, an embodiment of the present technology will be described with reference to the drawings.
[Configuration Example of Image Encoding Device]

Figure 7:
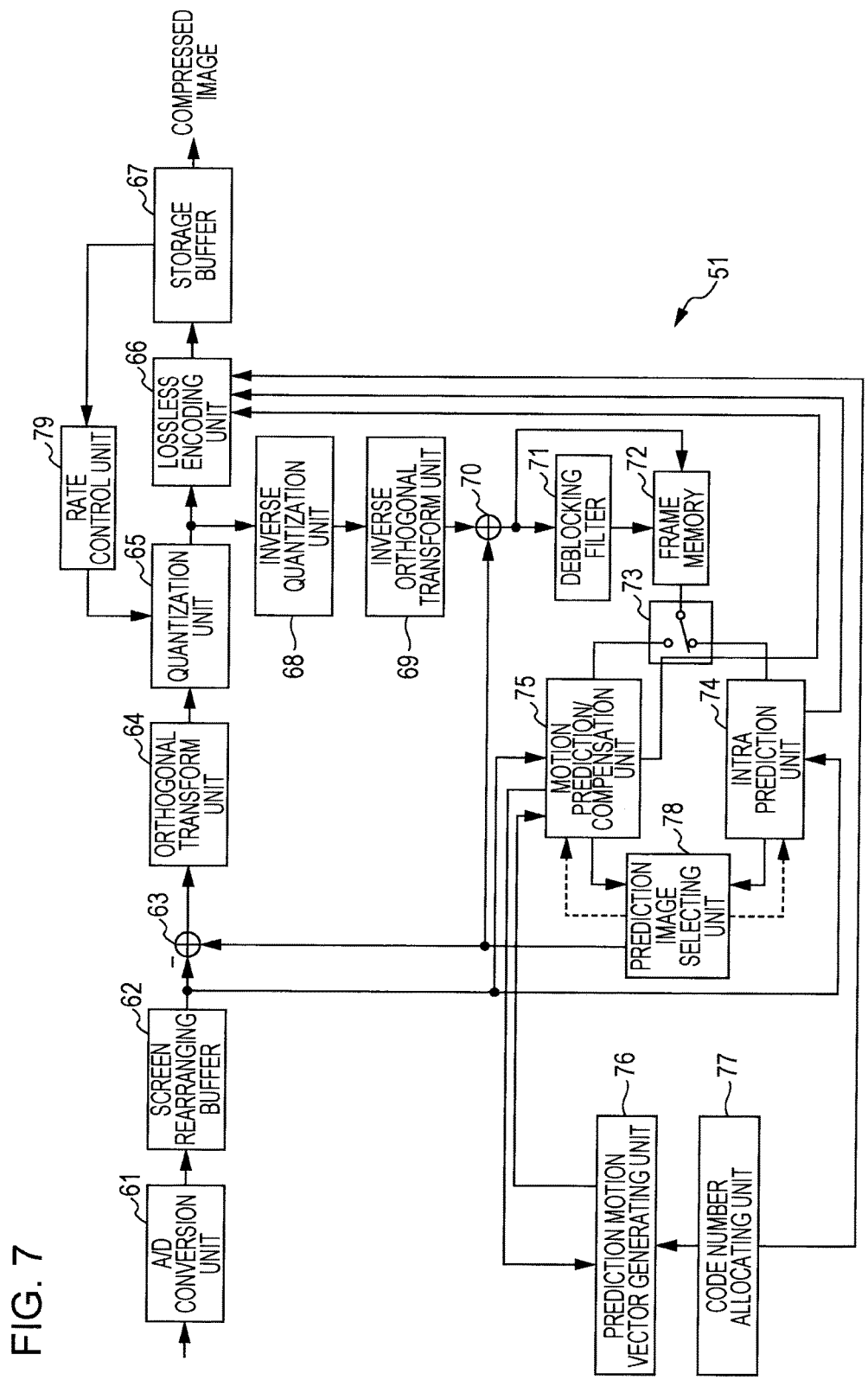
FIG. 7 is a block diagram illustrating a configuration of an embodiment of an image encoding device.

FIG. 7 represents the configuration of an embodiment of an image encoding device serving as an image processing device.

This image encoding device 51 subjects an image to compression encoding using, for example, the H.264 and MPEG-4 Part10 Advanced Video Coding) (hereinafter, described as 264/AVC) format as a base. That is to say, with the image encoding device 51, the motion compensation block mode stipulated in the H.264/AVC format is used.

With the example in FIG. 7, the image encoding device 51 is configured of an A/D conversion unit 61, a screen rearranging buffer 62, a computing unit 63, an orthogonal transform unit 64, a quantization unit 65, a lossless encoding unit 66, a storage buffer 67, an inverse quantization unit 68, an inverse orthogonal transform unit 69, a computing unit 70, a deblocking filter 71, frame memory 72, a switch 73, an intra prediction unit 74, a motion prediction/compensation unit 75, a prediction motion vector generating unit 76, a code number assigning unit 77, a prediction image selecting unit 78, and a rate control unit 79.

The A/D conversion unit 61 performs A/D conversion of an input image, and outputs to the screen rearranging buffer 62 for storing. The screen rearranging buffer 62 rearranges the images of frames in the stored order for display into the order of frames for encoding according to GOP (Group of Picture).

The computing unit 63 subtracts, from the image read out from the screen rearranging buffer 62, the prediction image from the intra prediction unit 74 selected by the prediction image selecting unit 78 or the prediction image from the motion prediction/compensation unit 75, and outputs difference information thereof to the orthogonal transform unit 64. The orthogonal transform unit 64 subjects the difference information from the computing unit 63 to orthogonal transform, such as discrete cosine transform, Karhunen-Loéve transform, or the like, and outputs a transform coefficient thereof. The quantization unit 65 quantizes the transform coefficient that the orthogonal transform unit 64 outputs.

The quantized transform coefficient that is the output of the quantization unit 65 is input to the lossless encoding unit 66, and subjected to lossless encoding, such as variable length coding, arithmetic coding, or the like, and compressed.

The lossless encoding unit 66 obtains information indicating intra prediction from the intra prediction unit 74, and obtains information indicating an intra inter prediction mode, and so forth from the motion prediction/compensation unit 75. Note that, hereafter, the information indicating intra prediction and the information indicating inter prediction will be referred to as intra prediction mode information and inter prediction mode information, respectively.

The lossless encoding unit 66 encodes the quantized transform coefficient, and also encodes information indicating intra prediction, information inter prediction mode, or the like, and takes these as part of header information in the compressed image. The lossless encoding unit 66 supplies the encoded data to the storage buffer 67 for storage.

For example, with the lossless encoding unit 66, lossless encoding processing, such as variable length coding, arithmetic coding, or the like, is performed. Examples of the variable length coding include CAVLC (Context-Adaptive Variable Length Coding) determined by the H.264/AVC format. Examples of the arithmetic coding include CABAC (Context-Adaptive Binary Arithmetic Coding).

The storage buffer 67 outputs the data supplied from the lossless encoding unit 66 to, for example, a downstream image decoding device, storage device or transmission path or the like not shown in the drawing, as a compressed image encoded by the H.264/AVC format.

Also, the quantized transform coefficient output from the quantization unit 65 is also input to the inverse quantization unit 68, subjected to inverse quantization, and then subjected to further inverse orthogonal transform at the inverse orthogonal transform unit 69. The output subjected to inverse orthogonal transform is added to the prediction image supplied from the prediction image selecting unit 78 by the computing unit 70, and changed into a locally decoded image. The deblocking filter 71 removes block distortion from the decoded image, and then supplies to the frame memory 72 for storing. An image before the deblocking filter processing is performed by the deblocking filter 71 is also supplied to the frame memory 72 for storing.

The switch 73 outputs the reference images stored in the frame memory 72 to the motion prediction/compensation unit 75 or intra prediction unit 74.

With this image encoding device 51, the I picture, B picture, and P picture from the screen rearranging buffer 62 are supplied to the intra prediction unit 74 as an image to be subjected to intra prediction (also referred to as intra processing), for example. Also, the B picture and P picture read out from the screen rearranging buffer 62 are supplied to the motion prediction/compensation unit 75 as an image to be subjected to inter prediction (also referred to as inter processing).

The intra prediction unit 74 performs intra prediction processing of all of the intra prediction modes serving as candidates based on the image to be subjected to intra prediction read out from the screen rearranging buffer 62, and the reference image supplied from the frame memory 72 to generate a prediction image. At this time, the intra prediction unit 74 calculates a cost function value as to all of the intra prediction modes serving as candidates, and selects the intra prediction mode of which the calculated cost function value provides the minimum value, as the optimal intra prediction mode.

The intra prediction unit 74 supplies the prediction image generated in the optimal intra prediction mode, and the cost function value thereof to the prediction image selecting unit 78. In the event that the prediction image generated in the optimal intra prediction mode has been selected by the prediction image selecting unit 78, the intra prediction unit 74 supplies the information indicating the optimal intra prediction mode to the lossless encoding unit 66. The lossless encoding unit 66 encodes this information, and takes this as part of the header information in a compressed image.

The image to be subjected to inter processing read out from the screen rearranging buffer 62, and the reference image from the frame memory 72 via the switch 73, are supplied to the motion prediction/compensation unit 75. The motion prediction/compensation unit 75 performs motion searching (prediction) of all candidate inter prediction modes, subjects the reference image to compensation processing using the searched motion vectors, and generates a prediction image.

The motion prediction/compensation unit 75 uses the searched motion vectors to calculate cost function values for all candidate inter prediction modes. At this time, the motion prediction/compensation unit 75 calculates cost function values using multiple types of prediction motion vector information generated by the prediction motion vector generating unit 76 and code numbers assigned thereto.

The motion prediction/compensation unit 75 selects prediction motion vector information which yields the smallest value of the cost function value in each block of the candidate inter prediction modes. Further, the motion prediction/compensation unit 75 compares the cost function values of the inter prediction modes which are candidates by way of the prediction motion vector information selected for each block, thereby determining the inter prediction mode yielding the smallest value as the optimal inter prediction mode. The motion prediction/compensation unit 75 then supplies the prediction image generated in the optimal inter prediction mode, and the cost function value thereof, to the prediction image selecting unit 78.

In the event that the prediction image generated in the optimal inter prediction mode is selected by the prediction image selecting unit 78, the motion prediction/compensation unit 75 outputs information indicating the optimal inter prediction mode (inter prediction mode information) to the lossless encoding unit 66.

At this time, difference motion vector information which is the difference between the motion vector information and the prediction motion vector information, the code number for that prediction motion vector information, and so forth, are also output to the lossless encoding unit 66. The lossless encoding unit 66 also subjects the information from the motion prediction/compensation unit 75 to lossless encoding processing such as variable-length encoding, arithmetic encoding, or the like, and inserts into the header portion of the compressed image.

The prediction motion vector generating unit 76 is supplied from the motion prediction/compensation unit 75 with the motion vector information already obtained with the peripheral blocks of the block which is the object. Note that peripheral blocks include not only blocks which are in the periphery spatially, but also blocks which are in the periphery spatio-temporally, i.e., in the periphery spatially in a frame one before the current frame in time.

The prediction motion vector generating unit 76 uses the supplied peripheral motion vector information to generate multiple types of prediction motion vector information, by the above described Expression (5), Expression (9), and Expression (10) and so forth. The prediction motion vector generating unit 76 then supplies each prediction motion vector information, and code number assigned to the prediction motion vector information by the code number assigning unit 77, to the motion prediction/compensation unit 75.

The code number assigning unit 77 assigns a code number to each prediction motion vector information, by a user setting by way of an unshown operation input unit or the like, or in accordance with application settings. The code number assigning unit 77 then supplies the prediction motion vector generating unit 76 and lossless encoding unit 66 with code number assignation information indicating the correlation between prediction motion vector information and code numbers, of which prediction motion vector information has been assigned with which code number. Also, the code number assigning unit 77 generates flag information indicating whether a variable mode in which assignment of code numbers to prediction motion vector information is changeable, or a fixed mode in which default settings are used, and supplies the generated flag information to the lossless encoding unit 66.

The prediction image selecting unit 78 determines the optimal prediction mode from the optimal intra prediction mode and optimal inter prediction mode, based on the cost function values output from the intra prediction unit 74 or motion prediction/compensation unit 75. The prediction image selecting unit 78 then selects the prediction image of the optimal prediction mode that has been determined, and supplies this to the computing units 63 and 70. At this time, the prediction image selecting unit 78 supplies the selection information of the prediction image to the intra prediction unit 74 or motion prediction/compensation unit 75.

The rate control unit 79 controls the rate of the quantization operations of the quantization unit 65, based on compressed images stored in the storage buffer 67, such that overflow or underflow does not occur.

[Description of H.264/AVC Format]

First, things other than those described above with the background art will be further described regarding the H.264/AVC format upon which the image encoding device 51 is based.

As described above with FIG. 7, with the H.264/AVC format, one of CAVLC and CABAC can be used as variable-length encoding.

First, the CAVLC format will be described. With CAVLC, a VLC table switched in accordance with occurrence of orthogonal transform coefficients in nearby blocks is used for encoding of orthogonal transform coefficients. Exponential Golomb (Exponential Golomb) coding shown in FIG. 8 is used for encoding of other syntax elements.

With the Exponential Golomb coding in FIG. 8, for example, code number (Code Number) 0 and code word (Code Words) 1 correspond, code number 1 and code word 010 correspond, and code number 2 and code word 011 correspond. Also, code number 3 and code word 00100 correspond, code number 4 and code word 00101 correspond, code number 5 and code word 00110 correspond, and code number 6 and code word 00111 correspond.

Also, with regard to syntax elements such as motion vectors, there is the possibility that a negative value may occur. Accordingly, in the case of syntax elements regarding which there is the possibility that a negative value may occur, these are replaced with code numbers which have no sign based on the correlative relation shown in FIG. 9, and after having been replaced with code numbers which have no sign, the Exponential Golomb coding in FIG. 8 is used for the encoding thereof.

FIG. 9 illustrates the correlative relation between code number and syntax element v. That is to say, by being based on this correlative relation, for example, syntax element v=0 is replaced with code number 0, syntax element v=1 is replaced with code number 1, and syntax element v=−1 is replaced with code number 2. Also, syntax element v=2 is replaced with code number 3, syntax element v=−2 is replaced with code number 4, and syntax element v=3 is replaced with code number 5.

Next, encoding processing of orthogonal transform coefficients according to the CAVLC format will be described.

Firstly, the orthogonal transform coefficients converted into one-dimensional data are scanned from high frequency toward low frequency. Secondly, NumCoef (the number of coefficients which are not 0) and T1s (the number of coefficients which are ±1 when scanning from high frequency to low frequency, a maximum of 3) are encoded. At this time, the VLC table is switched in accordance with the NumCoef in the peripheral blocks.

Thirdly, encoding of Level (DCT coefficient value) is performed. For example, with regard to T1s, only positive/negative is encoded. Other coefficients are assigned code numbers (Code Number) and encoded. At this time, the VLC table is switched in accordance with intra/inter, quantization parameter QP, and Level encoded last.

Fourthly, encoding of Run is performed. At this time, the VLC table is switched in encoding of TotalZero in accordance to the NumCoef. Also, encoding of Run_before (the number of 0s continuing before a non-0 coefficient) is performed sequentially. With this encoding, the VLC table is switched in accordance with ZerosLeft (the number of non-0 coefficients remaining). Upon ZerosLeft=0, the encoding processing ends.

Next, the CABAC format will be described.

Figure 10:
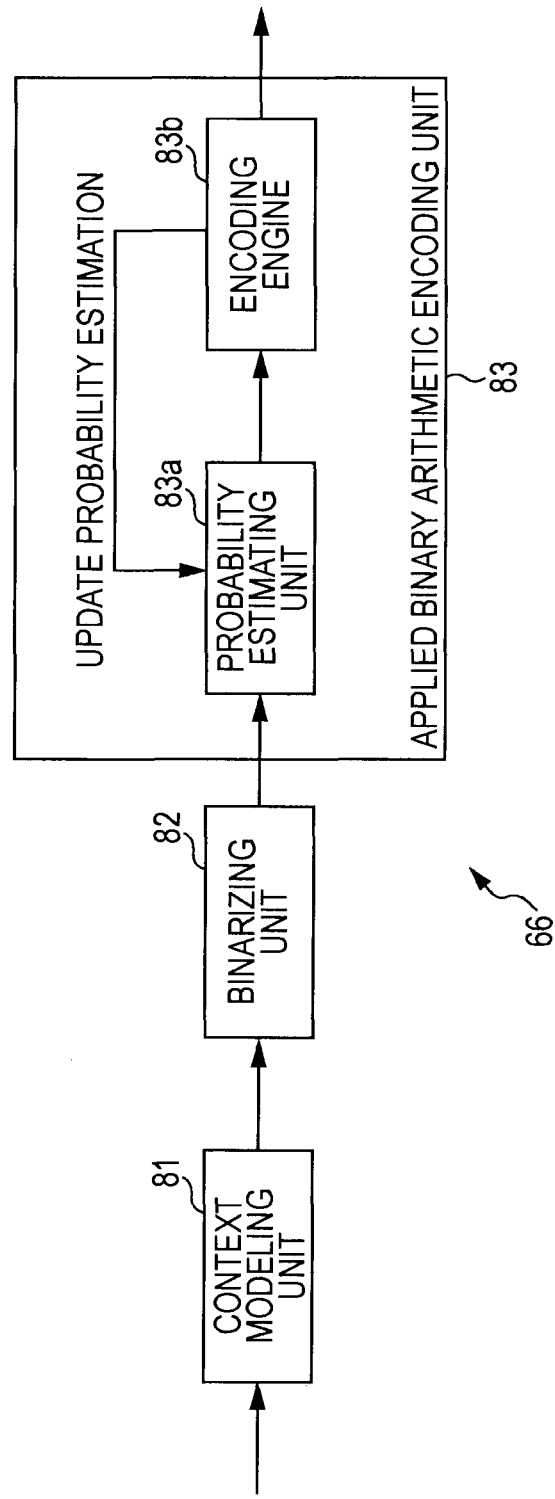
FIG. 10 is a block diagram representing a configuration example of a lossless encoding unit which performs CABAC encoding.

FIG. 10 illustrates an example of the configuration of a lossless encoding unit that performs CABAC encoding. In the example shown in FIG. 10, the lossless encoding unit is configured of a context modeling unit 81, a binarizing unit 82, and an adaptive binary arithmetic coding unit 83 including a probability estimating unit 83a and an encoding engine 83b.

Relating to an arbitrary syntax element of a compressed image, the context modeling unit 81 first converts a symbol (symbol) of a syntax element into an appropriate context model, in accordance with past history. In CABAC coding, different syntax elements are encoded using different contexts. Also, even the same syntax elements are encoded using different contexts according to encoding information of nearby blocks or macroblock.

For example, a flag mb_skip_frag will be described with reference to FIG. 11 as an example, but this is the same for processing as to other syntax elements as well.

Figures 11, 12:
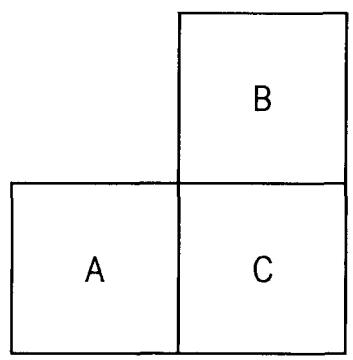
FIG. 11 is a diagram for describing CABAC encoding.
FIG. 12 is a diagram illustrating a binary table.

In the example in FIG. 11, a target macroblock C yet to be encoded, and adjacent macroblocks A and B that have already been encoded and that are adjacent to the target macroblock C, are shown. We will say that the flag mb_skip_frag is defined as to each of the macroblocks X (X=A, B, C) and is the following Expression (11).

[Mathematical Expression 6]

$$f(X) = \begin{cases} 0 & (\text{if}\{X = \text{skip}\}) \\ 1 & (\text{otherwise}) \end{cases} \quad (11)$$

That is, in the event that the macroblock X is a skipped macroblock that uses pixels in a reference frame at spatially corresponding positions, f(X)=1 is set, and otherwise, f(X)=0 is set.

At this time, context Context(C) for the current macroblock C is calculated as the sum of f(A) of the left adjacent macroblock A and f(B) of the upper adjacent macroblock B as in the following Expression (12).

$$\text{Context}(C) = f(A) + f(B) \quad (12)$$

That is to say, the context Context(C) as to the target macroblock C has one of the values of 0, 1, and 2, in accordance with the flag mb_skip_frag of the adjacent macroblocks A and B. That is, the flag mb_skip_frag as to the target macroblock C is encoded using an encoding engine 83b differing for one of 0, 1, and 2.

For example, the binarizing unit 82 performs conversion of the symbol of an element which is non-binary data with regard to the syntax, as with the intra prediction mode, using the table shown in FIG. 12.

Illustrated in the table in FIG. 12 is that in the event that the code symbol is 0, the code symbol is binarized into 0, if code symbol is 1, binarized into 10, and if the code symbol is 2, binarized into 110. Also, in the event that the code symbol is 3, this is binarized into 1110, if the code symbol is 4, binarized into 11110, and if the code symbol is 5, binarized into 111110.

The syntax elements binarized by binarization tables such as described above are encoded by the downstream adaptive binary arithmetic coding unit 83.

Returning to FIG. 10, at the adaptive binary arithmetic coding unit 83, the probability estimating unit 83a performs probability estimation regarding the binarized symbols, and binary arithmetic encoding based on the probability estimation is performed by the encoding engine 83b. At this time, the probability of "0" and "1" is initialized at the start of the slice, and the probability table thereof is updated each time encoding of 1Bin is performed. That is to say, related models are updated after binary arithmetic encoding processing is performed, so each model can perform encoding processing corresponding to the statistics of actual image compression information.

In both cases of these CAVLC format and CABAC format described above, prediction motion vector information with higher frequency of appearance should be assigned smaller code numbers, and the frequency of appearance of each prediction motion vector information should differ for each sequence and bit rate. However, with the proposal in NPL 1, code numbers to be assigned to the prediction motion vector information are fixed.

[Overview of Present Technology]

Accordingly, with the image encoding device 51 in FIG. 7, the user on an application can change code number assignation as to the prediction motion vectors from the default by way of the code number assigning unit 77, so that encoding efficiency or subjective image quality is optimal.

That is to say, with the image encoding device 51, multiple candidate prediction motion vector information are generated, and further, a cost function value is generated for each prediction motion vector information. Then, the prediction motion vector information which yields the smallest value thereof is taken as the prediction motion vector information as to the block to be processed, and encoding is performed using this, at which time the code number assigned to each prediction motion vector by the code number assigning unit 77 is used for cost function value generating and encoding.

For example, let us say that with default settings, the code number=0 is assigned to the spatial prediction motion vector information (Spatial Predictor) in the above-described Expression (5), and the code number=1 is assigned to the temporal prediction motion vector information (Temporal Predictor) in the above-described Expression (10).

Generally, in the event that a content to be encoded includes a great amount of still image region (e.g., videoconferencing), temporal prediction motion vector information is more preferably than spatial prediction motion vector information from the perspective of encoding efficiency or subjecting image quality.

However, in the event of a low bit rate in particular (i.e., high quantization parameter QP), the prediction motion vector information assigned code number=0 has fewer bits necessary to express the prediction motion vector information, and accordingly is more readily selected, which is undesirable.

Accordingly, with the image encoding device 51, the code number assignation as to each prediction motion vector can be changed from default. Accordingly, in such a case, change is made such that, for example, code number=0 is assigned to temporal prediction motion vector information, and code number=1 is assigned to spatial prediction motion vector information. Accordingly, encoding efficiency or subjective image quality can be improved.

[Advantages of the Present Technology]

Next, advantages of the present technology will be described with reference to FIG. 13. In the example in FIG. 13, a reference frame and a current frame of a moving image with the camera fixed are shown. In this moving image, we will say that an elliptical object is moving toward the right direction of the screen at a speed v. The camera is fixed, so the background other than the elliptical object is a still region.

In the current frame, a current block X, and adjacent blocks A, B, and C, adjacent to the current block X at the left, top, and upper right, are shown, and in the reference frame is shown a corresponding block (Co-Located block) Y of the current block X. Note that the corresponding block is a block in an already-encoded frame that is different from the current frame (a frame situated before or after), and is a block at a position corresponding to the current block.

Now, we will say that MVK is motion vector information as to a block K, and that Median (MVA, MVB, MVC) is assigned to code number=0, and MVY is assigned to code number=1.

In this case, with a low bit rate in particular, Median (MVA, MVB, MVC) which has fewer bits necessary to express the prediction motion vector information is more readily selected.

Figure 13:
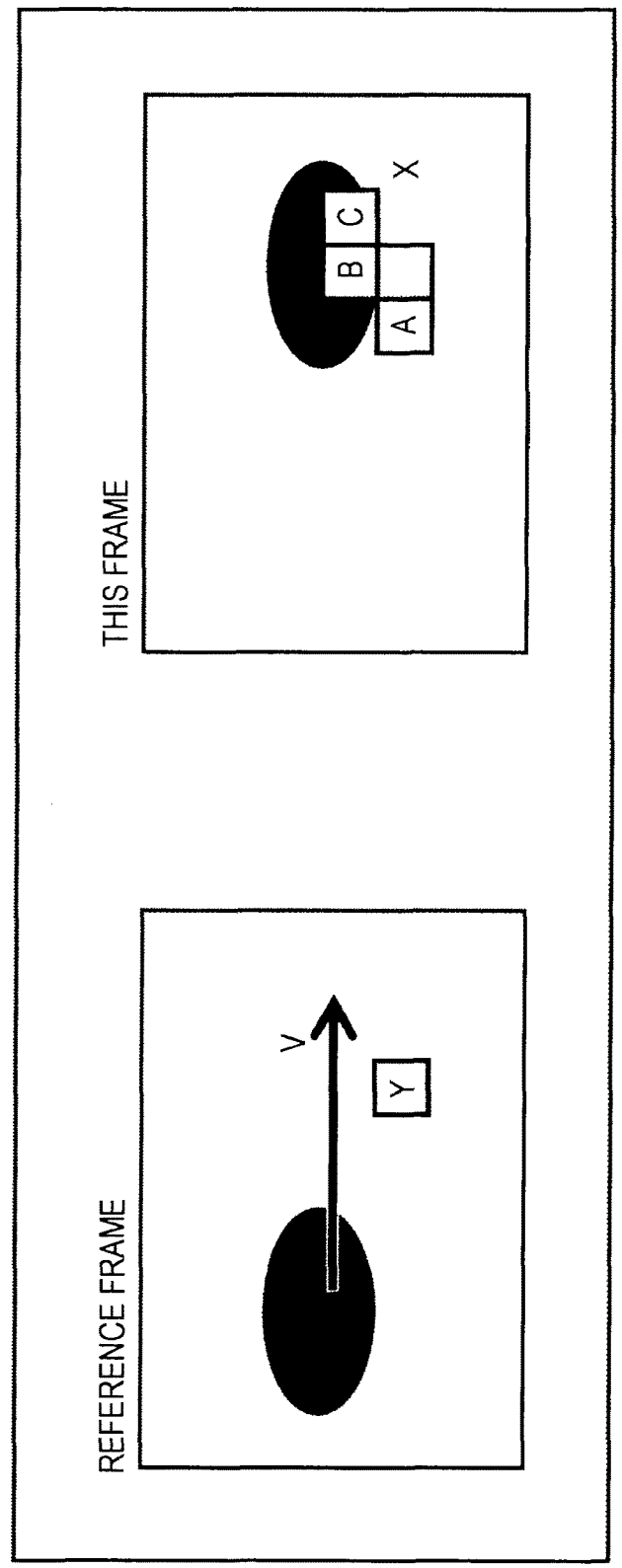
FIG. 13 is a diagram illustrating advantages of the present technology.

However, with the example in FIG. 13, block X, adjacent block A, and corresponding block Y are blocks in the still image region, and adjacent blocks B and C are blocks on the elliptical object. Accordingly, when viewed regarding the media prediction of the adjacent blocks, the following Expression (13) holds, and encoding efficiency is clearly not good.

$$\text{Median}(MVA,MVB,MVC)=\text{Median}(v,v,0)=v \tag{13}$$

On the other hand, considering the corresponding block Y, the following Expression (14) holds, so higher encoding efficiency can be realized by assigning code number=0 to MVY so as to be more readily selected.

MVY=0

Note that with the present disclosure, code number assignation to each prediction motion vector information is performed in increments of slices, for example.

That is to say, first, mv_predictor_definition_flag is encoded to the slice header. mv_predictor_definition_flag is flag information indicating whether a fixed mode whether default code numbers as to be assigned, or a variable mode where assignation-changeable (i.e., changed) code numbers are assigned. Note that it is sufficient for the flag information to be information allowing whether a changeable variable mode or a fixed mode to be identified, i.e., whether the variable mode or fixed mode.

In the event that mv_predictor_definition_flag=0, code numbers assignation to each prediction motion vector information defined by default are applied. In the event that mv_predictor_definition_flag=1, assignation of code numbers to each prediction motion vector information assigned by the code number assigning unit 77 will be applied. Accordingly, in this case, mv_predictor_definition_flag=1 is following by description of code number assignation to each prediction motion vector information by the code number assigning unit 77.

Specifically, in the case of mv_predictor_definition_flag=1, a syntax element such as shown in FIG. 14 will be inserted in the slice header.

With the example in FIG. 14, the description of mv_predictor_definition_flag=1 is followed by a space provided to describe which prediction motion vector information is to be assigned to code number 0 (code_number_for_predictor_0;) and to code number 1 (code_number_for_predictor_1;).

Note that description of the syntax relating to code number assignation according to the present disclosure is not restricted to the example in FIG. 14. In a sequence parameter set or picture parameter set, a syntax is provided relating to code number assignation. In the event that mv_predictor_definition_flag=0 at the slice header, any assignation defined in the immediately-previous existing sequence parameter set or picture parameter set may be used. Of course, this can be provided to only a sequence parameter set or picture parameter set.

As described above, by enabling changing of code number assignation, in an event of a moving object passing through a still region such as a background for example, a smaller code number can be assigned to the temporal prediction motion vector information (Temporal Predictor). Accordingly, this can avoid deterioration of the image due to the still region being affected by the motion of the moving object, and encoding efficiency and subjective image quality can be improved.

Accordingly, higher encoding efficiency can be achieved.

Note that while an example has been described above where a moving object passes through a still region such as a background or the like, for example, as a specific example, this is not restricted to this example, and encoding efficiency and subjective image quality can be improved by assigning smaller code numbers to prediction motion vector information with a higher frequency (rate) of appearance, for example, as well.

Also, the user or an application can set code number assignation as to prediction motion vector information such that encoding efficiency and subjective image quality is improved.

Further detailed description will be made below.

[Configuration Example of Motion Prediction/Compensation Unit]

Figure 15:
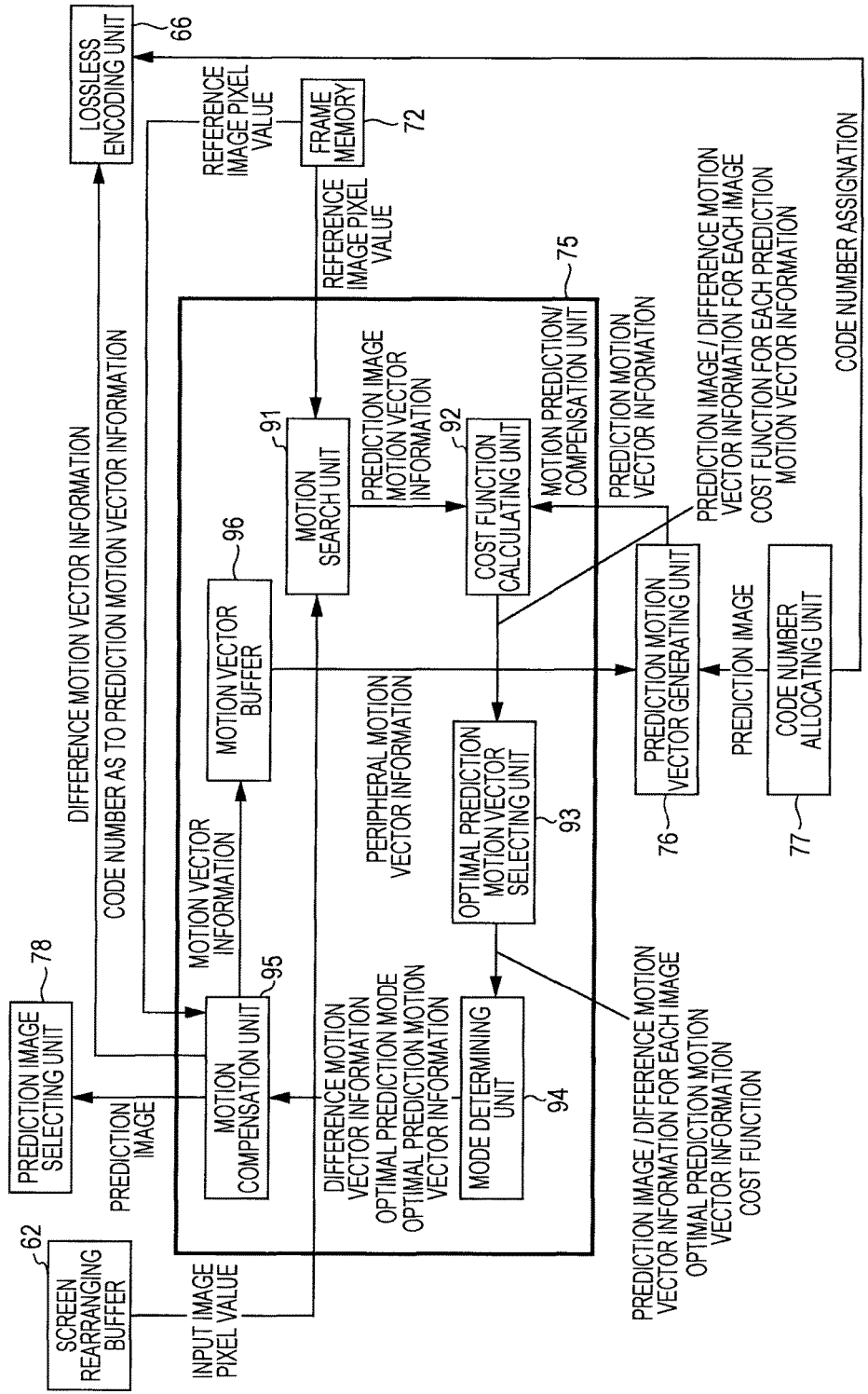
FIG. 15 is a block diagram illustrating a configuration example of the motion prediction/competition unit in FIG. 7.

FIG. 15 is a block diagram illustrating a detailed configuration example of the motion prediction/compensation unit 75. Note that the switch 73 in FIG. 7 has been omitted from FIG. 15.

In the example in FIG. 15, the motion prediction/compensation unit 75 is configured of a motion search unit 91, a cost function calculating unit 92, an optimal prediction motion vector selecting unit 93, a mode determining unit 94, motion compensation unit 95, and a motion vector buffer 96. Note that only input to the motion search unit 91 is not illustrated in the drawing as the input image pixel values from the screen rearranging buffer 62, but actually, there is input to the cost function calculating unit 92 which calculates cost function values and to the motion compensation unit 95 as well.

Input image pixel values from the screen rearranging buffer 62 and reference image pixel values from the frame memory 72 are input to the motion search unit 91. The motion search unit 91 performs motion search processing in all inter prediction modes shown in FIG. 2, performs compensation processing on the reference image using the search motion vector information, and generates prediction images. The motion search unit 91 supplies the motion vector information searched for each inter prediction mode, and the generated prediction images, to the cost function calculating unit 92.

The cost function calculating unit 92 is supplied with the input image pixel values from the screen rearranging buffer 62, the motion vector information and prediction images for the inter prediction modes from the motion search unit 91, and each prediction motion vector information from the prediction motion vector generating unit 76, and code numbers assigned to each. The cost function calculating unit 92 calculates difference motion vector information by taking the difference of the motion vector information and each prediction motion vector information.

The cost function calculating unit 92 then uses information supplied thereto, such as the difference motion vector information, code numbers assigned to the prediction motion vector information, prediction images, and so forth, to calculate a cost function value for each prediction motion vector of each block in each inter prediction mode. The cost function calculating unit 92 supplies the prediction images as to each of the inter prediction modes, difference motion vector information, prediction motion vector information, and corresponding code numbers and cost function values, to the optimal prediction motion vector selecting unit 93.

The optimal prediction motion vector selecting unit 93 selects optimal prediction motion vector information for each of the blocks in each prediction mode, based on the cost function values. The optimal prediction motion vector information selected thereby is supplied to the mode determining unit 94, along with the prediction images for each of the inter prediction modes, cost function values difference motion vector information, optimal prediction motion vector information, and code number assigned thereto.

The mode determining unit 94 determines which of the inter prediction modes is optimal to use, using cost function values as to each inter prediction mode, and takes the inter prediction mode with the smallest cost function value as the optimal prediction mode. The mode determining unit 94 then supplies the optimal prediction mode, and related difference motion vector information, and optimal prediction motion vector information and code number assigned thereto, to the motion compensation unit 95.

The motion compensation unit 95 obtains a motion vector from the difference motion vector information and optimal prediction motion vector information, and performs compensation on the reference image from the frame memory 72 using the obtained motion vector, thereby generating a prediction image of the optimal prediction mode. Also, the input image pixel values from the screen rearranging buffer 62 are also supplied to the motion compensation unit 95, and the motion compensation unit 95 obtains the cost function value of the optimal prediction mode again from the supplied information, and outputs the prediction image of the optimal prediction mode and cost function values thereof to the prediction image selecting unit 78.

In the event that the prediction image of the optimal inter mode is selected by the prediction image selecting unit 78, a signal to that effect is supplied from the prediction image selecting unit 78. In response, the motion compensation unit 95 supplies the optimal inter mode information, difference motion vector information of that mode, and code number corresponding to the prediction motion vector information, to the lossless encoding unit 66. Also, at this time, the motion compensation unit 95 stores motion vector information obtained from the difference motion vector information and optimal prediction motion vector information in the motion vector buffer 96. Note that in the event that the prediction image of the optimal inter mode is not selected by the prediction image selecting unit 78 (i.e., in the event that an intra prediction image is selected), a 0 vector is stored in the motion vector buffer 96 as motion vector information.

The motion vector buffer 96 stores motion block information for each block in the optimal prediction mode. The stored motion vector information is supplied to the prediction motion vector generating unit 76 as periphery motion vector information of peripheral blocks, in order to generate prediction motion vector information for the next block.

The prediction motion vector generating unit 76 generates multiple candidate prediction motion vector information as described in NPL 1, using the peripheral motion vector information of blocks spatio-temporally adjacent to the current blocks, supplied from the motion vector buffer 96. Note however, the difference with NPL 1 is the point that the code number as to each prediction motion vector information has been assigned by the code number assigning unit 77.

That is to say, with the prediction motion vector generating unit 76, spatial prediction motion vector information (Spatial Predictor) is generated according to the above-described Expression (5), and temporal prediction motion vector information (Temporal Predictor) is generated according to the above-described Expression (9), as to the current block. Also, spatio-temporal prediction motion vector information (Spatio-Temporal Predictor) is generated according to the above-described Expression (10), as to the current block. Each generated candidate prediction motion vector information, and code numbers respectively assigned thereto, are supplied to the cost function calculating unit 92.

Also, prior to performing encoding processing, information relating to which code number is to be assigned to which prediction motion vector information is input to the code number assigning unit 77 in accordance with user operations at an unshown operation input unit, for example. The code number assigning unit 77 sets assignation of code numbers as to the prediction motion vector information in accordance with the input information, and also generates flag information indicating that the mode is a code number assignation variable mode.

The code number assigning unit 77 supplies information of code number assignation to the prediction motion vector generating unit 76. Also, the code number assigning unit 77 sends the generated flag information and code number assignation information to the lossless encoding unit 66. At the lossless encoding unit 66, encoding processing of these information is performed at the slice header.

[Description of Encoding Processing of Image Encoding Device]

Figure 16:
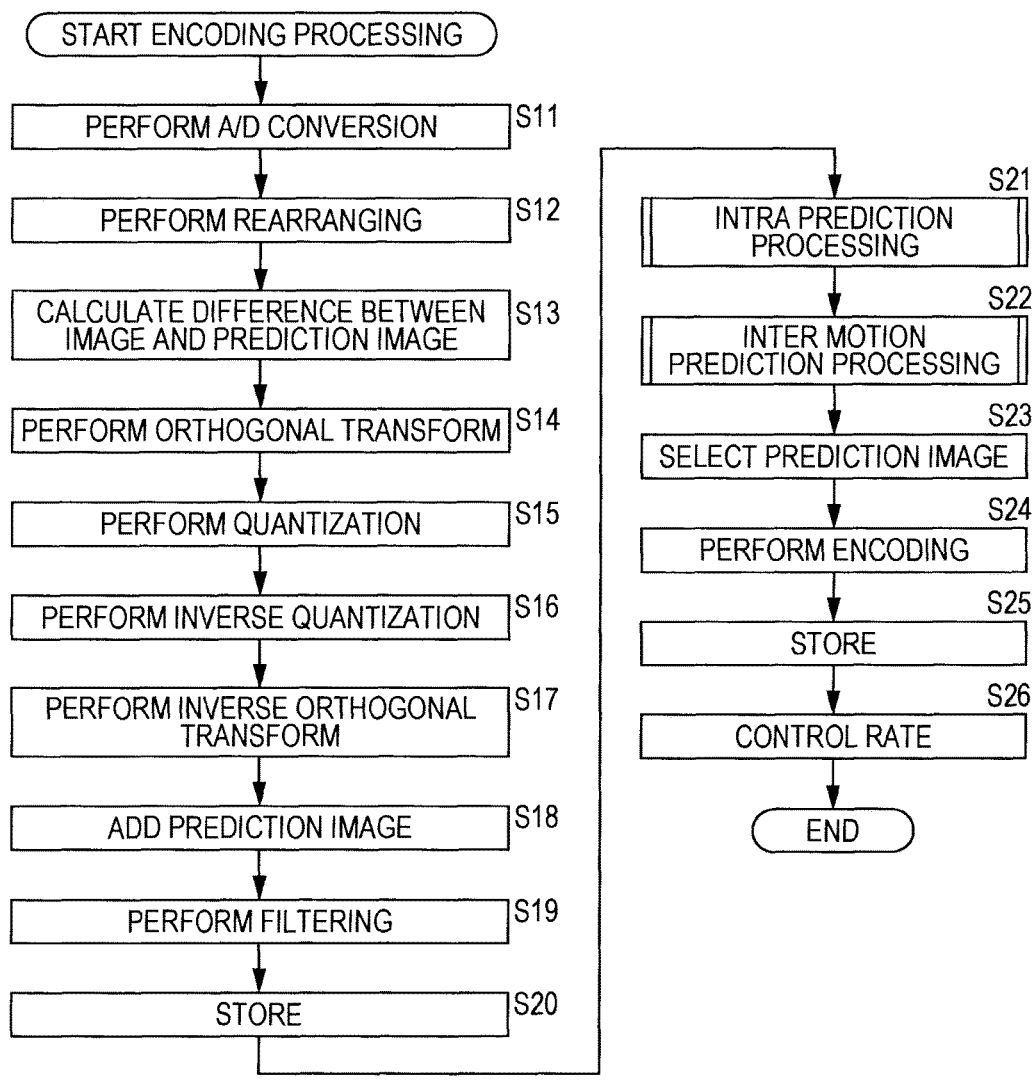
FIG. 16 is a flowchart for describing the encoding processing of the image encoding device in FIG. 7.

Next, the encoding processing of the image encoding device 51 in FIG. 7 will be described with reference to the flowchart in FIG. 16.

In step S11, the A/D conversion unit 61 converts an input image from analog to digital. In step S12, the screen rearranging buffer 62 stores the image supplied from the A/D conversion unit 61, and performs rearranging from the sequence for displaying the pictures to the sequence for encoding.

In step S13, the computing unit 63 computes difference between an image rearranged in step S12 and the prediction image. The prediction image is supplied to the computing unit 63 from the motion prediction/compensation unit 75 in the event of performing inter prediction, and from the intra prediction unit 74 via the prediction image selecting unit 78 in the event of performing intra prediction.

The difference data is smaller in data amount as compared to the original image data. Accordingly, the data amount can be compressed as compared to the case of encoding the original image without change.

In step S14, the orthogonal transform unit 64 subjects the difference information supplied from the computing unit 63 to orthogonal transform. Specifically, orthogonal transform, such as discrete cosine transform, Karhunen-Loéve transform, or the like, is performed, and a transform coefficient is output. In step S15, the quantization unit 65 quantizes the transform coefficient. At the time of this quantization, rate is controlled, which will be described regarding the processing in the later-described step S26.

The difference information thus quantized is locally decoded as follows. That is to say, in step S16, the inverse quantization unit 68 subjects the transform coefficient quantized by the quantization unit 65 to inverse quantization using a property corresponding to the property of the quantization unit 65. In step S17, the inverse orthogonal transform unit 69 subjects the transform coefficient subjected to inverse quantization by the inverse quantization unit 68 to inverse orthogonal transform using a property corresponding to the property of the orthogonal transform unit 64.

In step S18, the computing unit 70 adds the prediction image input via the prediction image selecting unit 78 to the locally decoded difference information, and generates a locally decoded image (the image corresponding to the input to the computing unit 63). In step S19, the deblocking filter 71 subjects the image output from the computing unit 70 to filtering. Thus, block distortion is removed. In step S20, the frame memory 72 stores the image subjected to filtering. Note that an image not subjected to filtering processing by the deblocking filter 71 is also supplied from the computing unit 70 to the frame memory 72 for storing.

In the event that the image to be processed that is supplied from the screen rearranging buffer 62 is an image of a block for intra processing, a decoded image to be referenced is read out from the frame memory 72, and supplied to the intra prediction unit 74 via the switch 73.

In step S21, the intra prediction unit 74 performs intra prediction of pixels of the block to be processed in all candidate intra prediction modes, based on these images. Note that for decoded pixels to be referenced, pixels not subjected to deblocking filtering by the deblocking filter 71 are used.

Figure 17:
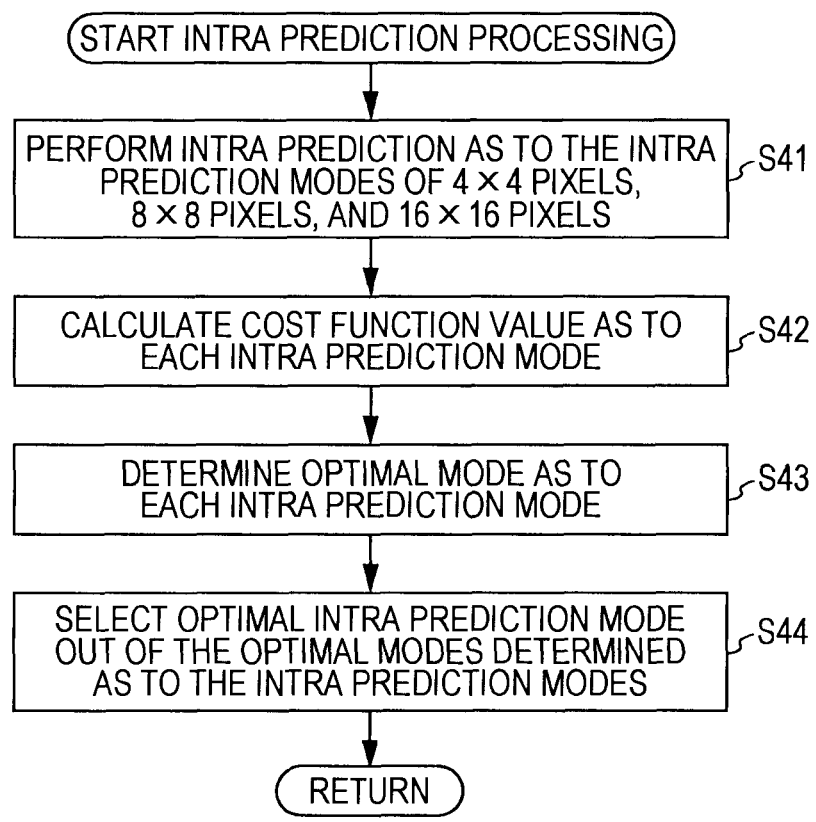
FIG. 17 is a flowchart for describing intra prediction processing in step S21 in FIG. 16.

While the details of the prediction processing in step S21 will be described later with reference to FIG. 17, due to this processing, intra prediction is performed in all candidate intra prediction modes, and cost function values are calculated for all candidate intra prediction modes. An optimal intra prediction mode is selected based on the calculated cost function value, and a prediction image generated by intra prediction of the optimal intra prediction mode, and the cost function value thereof, are supplied to the prediction image selecting unit 78.

In the event that the image to be processed supplied from the screen rearranging buffer 62 is an image to be inter processed, a reference image is read out from the frame memory 72, and is supplied to the motion prediction/compensation unit 75 via the switch 73. In step S22, the motion prediction/compensation unit 75 performs inter motion prediction processing based on these images.

Figure 18:
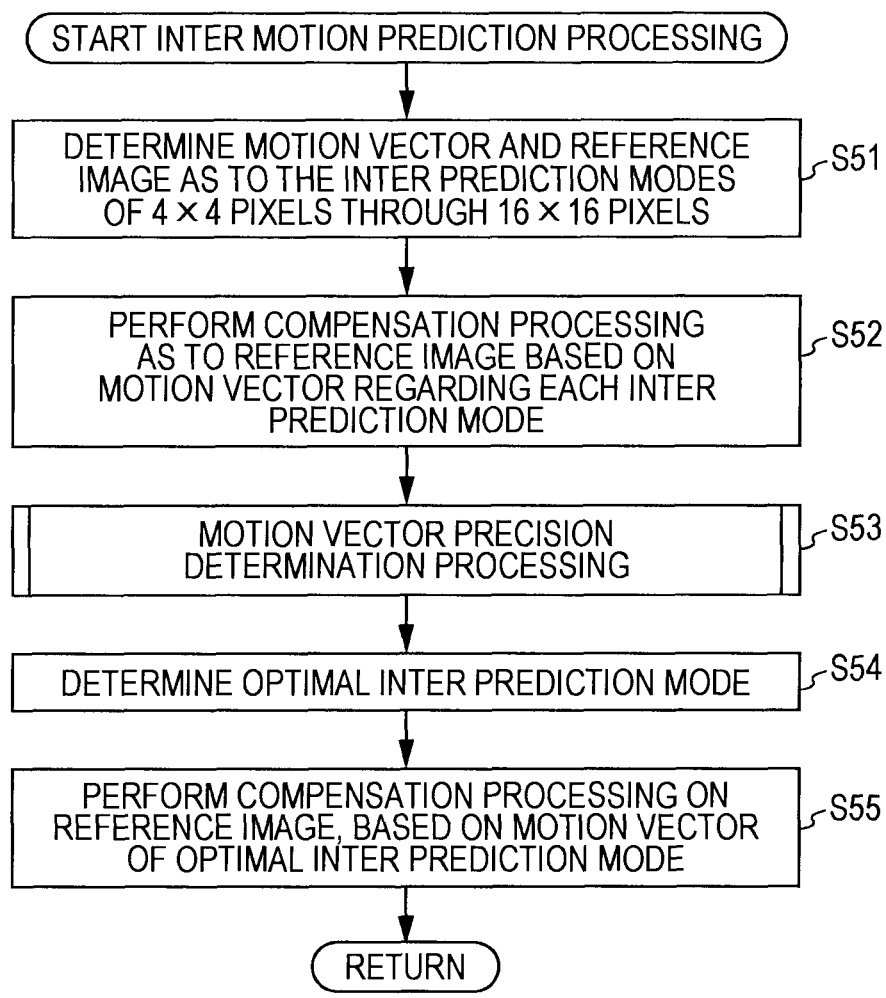
FIG. 18 is a flowchart for describing inter motion prediction processing in step S22 in FIG. 16.

The details of the prediction processing in step S22 will be described later with reference to FIG. 18. According to this processing, motion search processing is performed in all candidate intra prediction modes, the cost function values in all candidate intra prediction modes are calculated, and optimal prediction motion vector information is selected. Further, the optimal intra prediction mode is selected based on the calculated cost function values as to all inter prediction modes. The prediction image generated in the optimal intra prediction mode, and the cost function value thereof, are supplied to the prediction image selecting unit 78.

At this time, for example, a code number is assigned to each prediction motion vector information, with the code number assignation information being supplied to the motion prediction/compensation unit 75 and the lossless encoding unit 66. Accordingly, at the motion prediction/compensation unit 75, cost function values and so forth are calculated using the assigned code numbers. Also, the code number assigning unit 77 generates flag information indicating whether or not the mode is the variable mode in which code number assignation is changeable, which is supplied to the lossless encoding unit 66.

In step S23, the prediction image selecting unit 78 determines one of the optimal intra prediction mode and the optimal inter prediction mode to be the optimal prediction mode based on the cost function values output from the intra prediction unit 74 and the motion prediction/compensation unit 75. The prediction image selecting unit 78 then selects the prediction image in the determined optimal prediction mode, and supplies to the computing units 63 and 70. This prediction image is, as described above, used for calculations in steps S13 and S18.

Note that the selection information of this prediction image is supplied to the intra prediction unit 74 or motion prediction/compensation unit 75. In the event that the prediction image in the optimal intra prediction mode has been selected, the intra prediction unit 74 supplies information indicating the optimal intra prediction mode (i.e., intra prediction mode information) to the lossless encoding unit 66.

In the event that the prediction image in the optimal inter prediction mode has been selected, the motion prediction/compensation unit 75 outputs information indicating the optimal inter prediction mode, and according to need, information according to the optimal inter prediction mode to the lossless encoding unit 66. Examples of the information according to the optimal inter prediction mode include information such as difference motion vector information between motion vector information and prediction motion vector information for each block, code number assigned to the prediction motion vector information of each block, and so forth. Also, note that at this time, the motion compensation unit 95 of the motion prediction/compensation unit 75 stores the motion vector information obtained from the difference motion vector information and prediction motion vector information in the motion vector buffer 96.

In step S24, the lossless encoding unit 66 encodes the quantized transform coefficient output from the quantization unit 65. Specifically, the difference image is subjected to lossless encoding such as variable length coding, arithmetic coding, or the like, and compressed. At this time, the intra prediction mode information from the intra prediction unit 74, input to the lossless encoding unit 66 in step 21 described above, or the information according to the optimal inter prediction mode from the motion prediction/compensation unit 75, and so forth in step S22 are also encoded, and added to the header information. Also, the flag information and code number assignation information from the code number assigning unit 77 are also added to the header information.

For example, information indicating the inter prediction mode is encoded for each macroblock. Code numbers as to difference motion vector information and prediction motion vector information are encoded each current block. Further, flag information and code number assignation information from the code number assigning unit 77 are encoded each slice.

In step S25, the storage buffer 67 stores the difference image as a compressed image. The compressed image stored in the storage buffer 67 is read out as appropriate, and transmitted to the decoding side via the transmission path.

In step S26, the rate control unit 79 controls the rate of the quantization operation of the quantization unit 65 based on the compressed image stored in the storage buffer 67 so as not to cause overflow or underflow.

[Description of Intra Prediction Processing]

Next, the intra prediction processing in step S21 of FIG. 16 will be described with reference to the flowchart in FIG. 17. Note that in the example in FIG. 17, the case of luminance signals will be described as an example.

In step S41, the intra prediction unit 74 performs intra prediction as to each intra prediction mode of 4×4 pixels, 8×8 pixels, and 16×16 pixels.

There are nine types of 4×4 pixel and 8×8 pixel block-increment and four types of 16×16 pixel macroblock-increment prediction modes for luminance signal intra prediction modes in the block increments, and there are four types of 8×8 pixel block-increment prediction modes for color difference signal intra prediction modes. The color difference signal intra prediction mode can be set separately from the luminance signal intra prediction mode. For the luminance signal 4×4 pixel intra prediction modes and 8×8 pixel intra prediction modes, one intra prediction mode is defined for each 4×4 pixel and 8×8 pixel luminance signal block. For luminance signal 16×16 pixel intra prediction modes and color difference signal intra prediction modes, one prediction mode is defined for each macroblock.

Specifically, the intra prediction unit 74 makes reference to the decoded image that has been read out from the frame memory 72 and supplied to the intra prediction unit 74 via the switch 73, and performs intra prediction on the pixels of the block to be processed. Performing this intra prediction processing in each intra prediction mode results in a prediction image being generated in each intra prediction mode. Note that pixels not subject to deblocking filtering by the deblocking filter 71 are used as the decoded pixels to be referenced.

In step S42, the intra prediction unit 74 calculates a cost function value as to the intra prediction modes of 4×4 pixels, 8×8 pixels, and 16×16 pixels. Here, for a cost function for obtaining cost function values, a cost function employed with the H.264/AVC format is used.

With the H.264/AVC format, a method is used where selection is made of two mode determination methods of High Complexity mode and Low Complexity mode stipulated in JM, for example. In the case of this method, both calculate a cost function value relating to the respective prediction modes Mode, and the prediction mode which yields the smallest is selected as the optimal mode as to the current block or macroblock.

In the High Complexity mode, the cost function value can be calculated as with the following Expression (15).

$$\text{Cost}(\text{Mode} \in \Omega) = D + \lambda \times R \quad (15)$$

In Expression (15), $\Omega$ is the whole set of candidate modes for encoding the current block through macroblock. Also, D is difference energy between the decoded image and input image in the case of encoding with the current prediction mode Mode. Further, $\lambda$ is a Lagrange multiplier given as a function of a quantization parameter. Also, R is the total code amount in the case of encoding with the current mode Mode, including orthogonal transform coefficients.

That is to say, in order to perform encoding with the High Complexity Mode, there is the need to perform tentative encoding processing once by all candidate modes Mode in order to calculate the above parameters D and R, requiring a greater amount of computations.

On the other hand, the cost function value in the Low Complexity Mode can be obtained as shown in the following Expression (16).

$$\text{Cost}(\text{Mode} \in \Omega) = D + \text{QP2Quant}(\text{QP}) \times \text{HeaderBit} \quad (16)$$

In Expression (16), D is the difference energy between the prediction image and input image, unlike the case of the High Complexity Mode. Also, QP2Quant (QP) is given as a function of a quantization parameter QP. Further, HeaderBit is the code amount relating to information belonging to the Header not including orthogonal transform coefficients, such as motion vectors and mode.

That is to say, in the Low Complexity mode, prediction processing needs to be performed relating to each candidate mode Mode, but there is not need to perform all the way to a decoded image, so there is no need to perform all the way to decoding processing. Accordingly, realization with a smaller amount of computation as compared to the High Complexity Mode is enabled.

In step S43, the intra prediction unit 74 determines the optimal mode as to the intra prediction modes of 4×4 pixels, 8×8 pixels, and 16×16 pixels. That is to say, as described above, in the event of the intra 4×4 prediction mode and intra 8×8 prediction mode, the number of prediction mode types is nine, and in the event of the intra 16×16 prediction mode, the number of prediction mode types is four. Accordingly, the intra prediction unit 74 determines, based on the cost function values calculated in step S42, the optimal intra 4×4 prediction mode, optimal intra 8×8 prediction mode, and optimal intra 16×16 prediction mode out thereof.

In step S44, the intra prediction unit 74 selects the optimal intra prediction mode out of the optimal modes determined as to the intra prediction modes of 4×4 pixels, 8×8 pixels, and 16×16 pixels based on the cost function values calculated in step S42. That is to say, the intra prediction unit 74 selects a mode of which the cost function value is the minimum value out of the optimal modes determined as to 4×4 pixels, 8×8 pixels, and 16×16 pixels, as the optimal intra prediction mode. The intra prediction unit 74 then supplies the prediction image generated in the optimal intra prediction mode, and the cost function value thereof to the prediction image selecting unit 78.

[Description of Inter Motion Prediction Processing]

Next, the inter motion prediction processing in step S22 in FIG. 16 will be described with reference to the flowchart in FIG. 18.

In step S51, the motion search unit 91 determines a motion vector and a reference image as to each of the eight kinds of the inter prediction modes made up of 16×16 pixels through 4×4 pixels described above with reference to FIG. 2.

In step S52, the motion search unit 91 subjects the reference image to compensation processing based on the determined motion vector and generates a prediction image, regarding each of the inter prediction modes. The motion search unit 91 supplies the motion vector information searched based on each inter prediction mode, and the generated prediction images, to the cost function calculating unit 92.

In step S53, the motion prediction vector generating unit 76 and cost function calculating unit 92 perform motion prediction motion determining processing. This prediction motion determining processing will be described later with reference to FIG. 19.

According to the processing in step S53, multiple types of prediction motion vector information are generated. The generated prediction motion vector information and the respectively assigned code numbers are used to calculate cost function values as to each of the prediction motion vectors, for each block in each inter prediction mode, and optimal prediction motion vector information is selected.

The optimal prediction motion vector information thus selected is supplied to the mode determining unit 94, along with the prediction image, cost function value, difference motion vector information, and optimal prediction motion vector information and code number assigned thereto, as to each inter prediction mode.

In step S54, the mode determining unit 94 determines the optimal inter prediction mode. That is to say, the mode determining unit 94 adds the cost function values as to the optimal prediction motion vectors of all blocks in each inter prediction mode, compares the cost function values of all candidate inter prediction modes, and determines the inter prediction mode with the smallest cost function value as the optimal inter prediction mode. The optimal inter prediction mode is supplied to the motion compensation unit 95 along with the optimal prediction motion vector information and the code number assigned to the optimal prediction motion vector.

In step S55, the motion compensation unit 95 performs compensation processing on the reference image from the frame memory 72, based on the motion vector of the optimal inter prediction mode, and generates a prediction image. Also, the motion compensation unit 95 obtains the cost function value of the optimal prediction mode again from supplied information, and outputs the prediction image and cost function value of the optimal prediction mode to the prediction image selecting unit 78.

[Description of Prediction Motion Vector Determining Processing]

Figure 19:
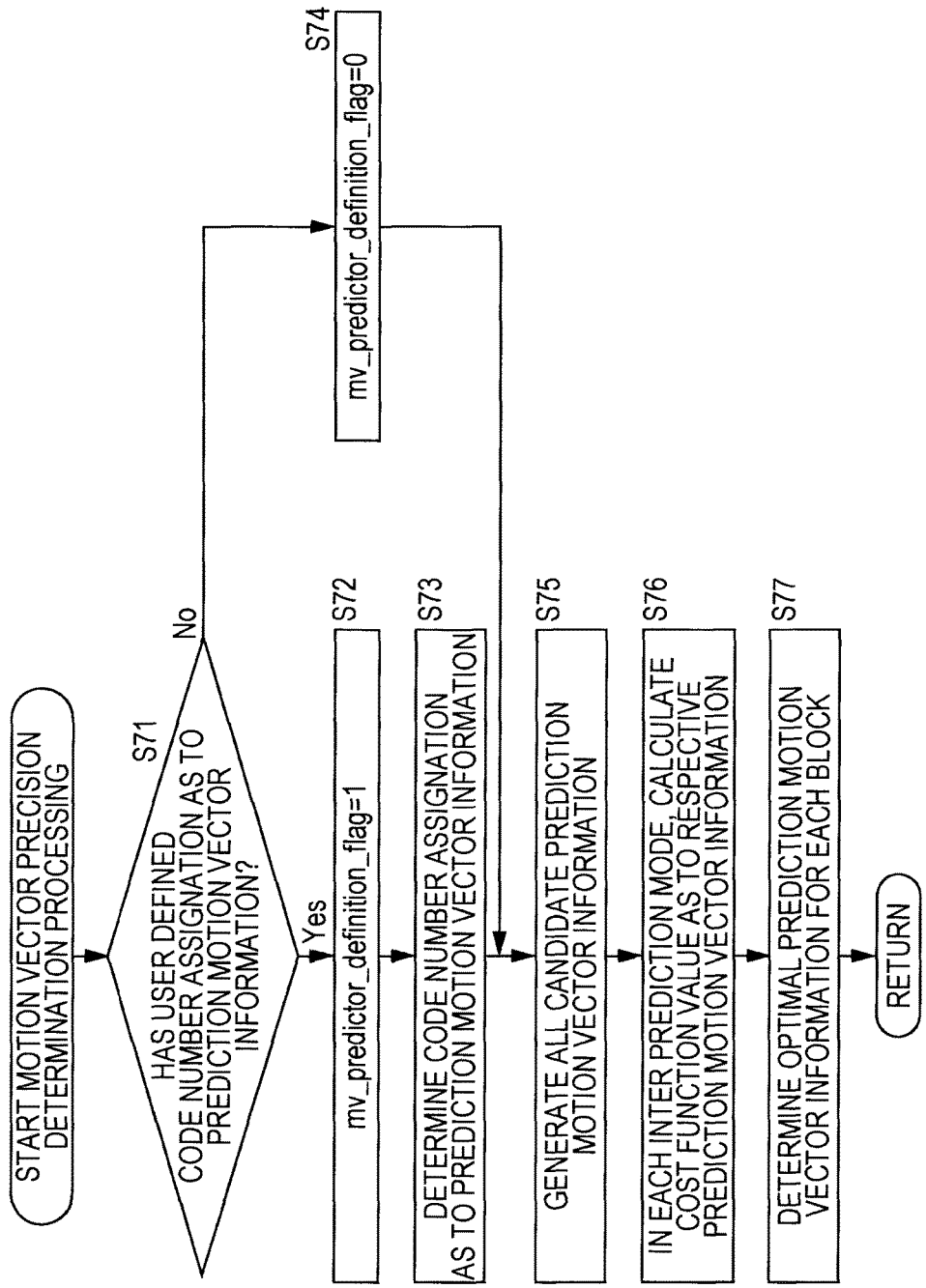
FIG. 19 is a flowchart for describing prediction motion vector determination processing in step S53 in FIG. 18.

Next, the prediction motion vector determining processing in step S53 of FIG. 18 will be described with reference to the flowchart in FIG. 19. Note that the following steps S71 through S74 are processing performed each slice, for example, and steps S75 through S77 are processing performed each block.

In step S71, the code number assigning unit 77 determines whether or not code number assignment as to the prediction motion vector information has been defined by the user. For example, in the event that information relating to which code number is to be assigned to which prediction motion vector information has been input from an unshown operation input unit, and this is not default information, in step S71, determination is made that code number assignment as to the prediction motion vector information has been defined by the user, and the processing advances to step S72.

In step S72, the code number assigning unit 77 sets mv_predictor_definition_flag=1, and supplies that flag information to the lossless encoding unit 66. In step S73, the code number assigning unit 77 then determines code number assignment as to the prediction motion vector information, based on the information relating to which code number is to be assigned to which input prediction motion vector information. The determined code number assignment is supplied to the lossless encoding unit 66 and the prediction motion vector generating unit 76.

On the other hand, for example, in the event that information relating to which code number is to be assigned to which prediction motion vector information has been input from an unshown operation input unit, and this is default information, in step S71, determination is made that code number assignment as to the prediction motion vector information has not been defined by the user, and the processing advances to step S74.

In step S74, the code number assigning unit 77 sets mv_predictor_definition_flag=0, and supplies that flag information to the lossless encoding unit 66. In this case, default code number assignment information is supplied to the prediction motion vector generating unit 76.

In step S75, the prediction motion vector generating unit 76 generates all candidate prediction motion vector information for the current block, using peripheral motion vector information of spatio-temporally peripheral blocks from the motion vector buffer 96. The prediction motion vector generating unit 76 then supplies, along with the generated multiple prediction motion vector information the code numbers respectively assigned to each, to the cost function calculating unit 92.

In step S76, the cost function calculating unit 92 calculates cost function values for each of the prediction motion vectors, at each block in each inter prediction mode, by the above-described Expression (15) or Expression (16) using the supplied information. The cost function calculating unit 92 calculates a cost function value for each prediction motion vector at each block in each inter prediction mode, using the supplied information such as the difference motion vector information, the code number assigned to the prediction motion vector information, and prediction image and so forth.

In step S77, the optimal prediction motion vector selecting unit 93 selects the optimal prediction motion vector information for each block in each prediction mode, based on the cost function values. The optimal prediction motion vector information selected in this way is supplied to the mode determining unit 94, along with the prediction image, cost function value, difference motion vector information, and prediction motion vector information and code number assigned thereto.

As described above, code number assignment is thus changeable, so code number assignment as to prediction motion vector information can be changed such that encoding efficiency and subjective image quality is improved, for example.

For example, assigning smaller code numbers to prediction motion vector information with a higher frequency (rate) of appearance and so forth can be performed, so encoding efficiency and subjective image quality can be improved.

The encoded compressed image is transmitted via a predetermined transmission path, and is decoded by an image decoding device.

[Configuration Example of Image Decoding Device]

Figure 20:
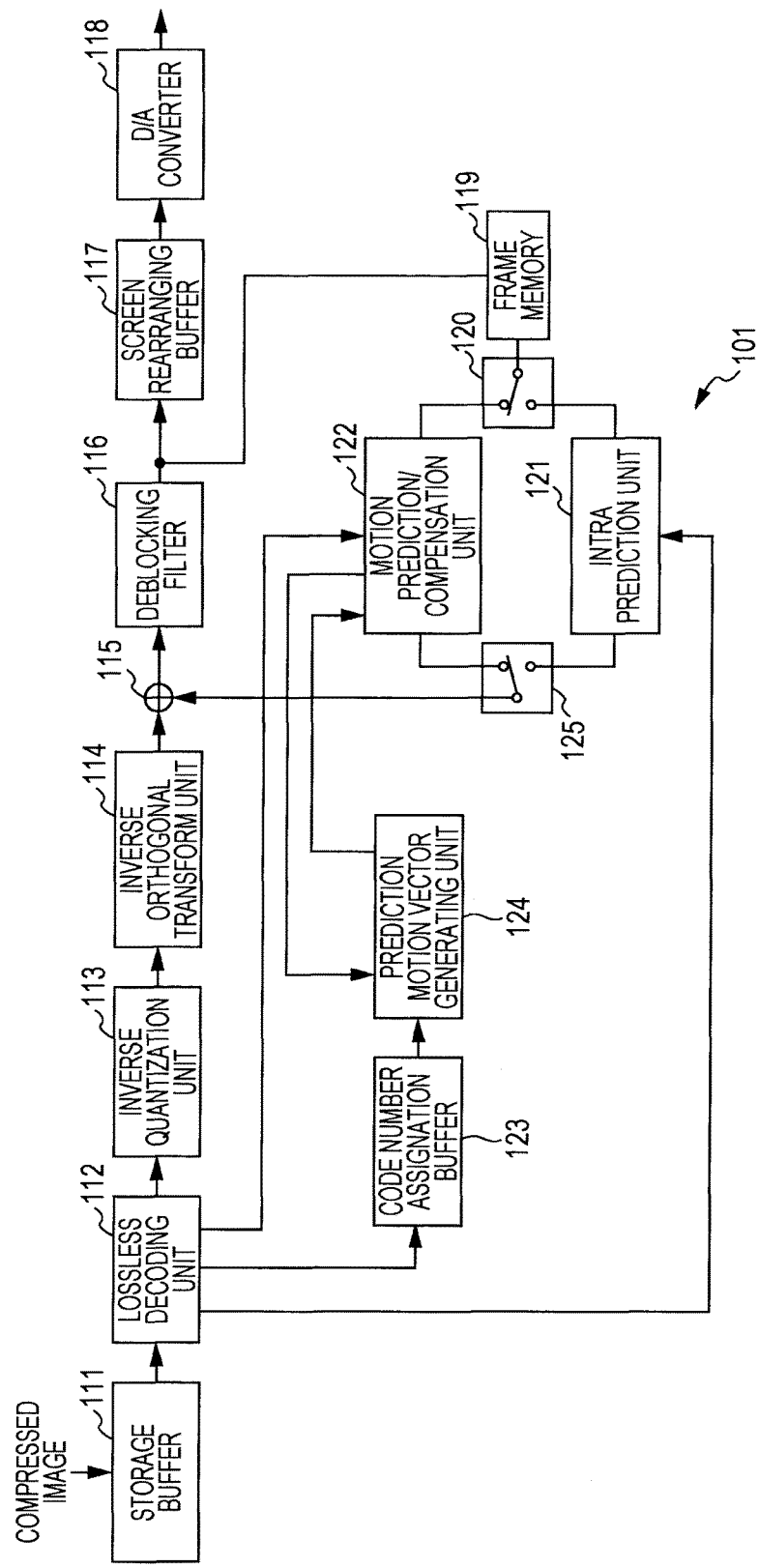
FIG. 20 is a block diagram illustrating the configuration of an embodiment of an image decoding device.

FIG. 20 represents the configuration of an embodiment of an image decoding device serving as the image processing device to which the present invention has been applied.

An image decoding device 101 is configured of a storage buffer 111, a lossless decoding unit 112, an inverse quantization unit 113, an inverse orthogonal transform unit 114, a computing unit 115, a deblocking filter 116, a screen rearranging buffer 117, a D/A conversion unit 118, frame memory 119, a switch 120, an intra prediction unit 121, a motion prediction/compensation unit 122, a code number assigning buffer 123, a prediction motion vector generating unit 124, and a switch 125.

The storage buffer 111 stores a transmitted compressed image. The lossless decoding unit 112 decodes information supplied from the storage buffer 111 and encoded by the lossless encoding unit 66 in FIG. 7 using a format corresponding to the encoding format of the lossless encoding unit 66. The inverse quantization unit 113 subjects the image decoded by the lossless decoding unit 112 to inverse quantization using a format corresponding to the quantization format of the quantization unit 65 in FIG. 7. The inverse orthogonal transform unit 114 subjects the output of the inverse quantization unit 113 to inverse orthogonal transform using a format corresponding to the orthogonal transform format of the orthogonal transform unit 64 in FIG. 7.

The output subjected to inverse orthogonal transform is decoded by being added with the prediction image supplied from the switch 125 by the computing unit 115. The deblocking filter 116 removes the block noise of the decoded image, then supplies to the frame memory 119 for storage, and also outputs to the screen rearranging buffer 117.

The screen rearranging buffer 117 performs rearranging of images. Specifically, the sequence of frames rearranged for encoding sequence by the screen rearranging buffer 62 in FIG. 7 is rearranged in the original display sequence. The D/A conversion unit 118 performs D/A conversion of the image supplied from the screen rearranging buffer 117, and outputs to an unshown display for display.

The switch 120 reads out an image to be subjected to inter processing and an image to be referenced from the frame memory 119, outputs to the motion prediction/compensation unit 122, and also reads out an image to be used for intra prediction from the frame memory 119, and supplies to the intra prediction unit 121.

Information indicating the intra prediction mode obtained by decoding the header information is supplied from the lossless decoding unit 112 to the intra prediction unit 121. The intra prediction unit 121 generates, based on this information, a prediction image, and outputs the generated prediction image to the switch 125.

Of the information obtained by decoding the header information, the motion prediction/compensation unit 122, is supplied with the inter prediction mode information, difference motion vector information, code number as to prediction motion vector information, reference frame information, and so forth, from the lossless decoding unit 112. The inter prediction mode information is transmitted every macroblock. The code number as to prediction motion vector information and reference frame information are transmitted every current block.

The motion prediction/compensation unit 122 supplies the code number of the prediction motion vector information supplied from the lossless decoding unit 112 to the prediction motion vector generating unit 124, and obtains the prediction motion vector information generated by the prediction motion vector generating unit 124 accordingly. The motion prediction/compensation unit 122 uses the difference motion vector information supplied from the lossless decoding unit 112 and the prediction motion vector information from the prediction motion vector generating unit 124 to generate motion vector information of the current block. The motion prediction/compensation unit 122 uses the generated motion vector information to perform compensation processing on the reference image supplied from the frame memory 119, and generates pixel values of a prediction image as to the current block, in the prediction mode which the inter prediction mode information supplied from the lossless decoding unit 112 indicates.

The code number assigning buffer 123 stores code number assignation information which is information indicating the correlation between the default (in the event of the fixed mode) prediction motion vector information and code numbers. Also, the code number assigning buffer 123 receives from the lossless decoding unit 112 flag information indicating whether the mode is the variable mode where the code number assignation is changeable as to the prediction motion vector information for each slice, or whether the mode is the fixed mode where default settings are used. In the event that this flag information indicates the variable mode, the code number assigning buffer 123 receives the code number assignation corresponding to the prediction motion vector information, i.e., information of the correlation between the prediction motion vector information and the code number, along with the flag information. The code number assigning buffer 123 then stores code number assignation information indicating the correlation of the prediction motion vector information and the code number in the case of the variable mode, and supplies this to the prediction motion vector generating unit 124.

For each block, the prediction motion vector generating unit 124 is supplied with the code number corresponding to the prediction motion vector information for each block from the motion prediction/compensation unit 122, and motion vector information of spatio-temporally peripheral blocks. Also, the prediction motion vector generating unit 124 is supplied with default or encoding-side-set code number assignation from the code number assigning buffer 123, for each slice.

The prediction motion vector generating unit 124 uses the information supplied thereto to generate prediction motion vector information for each block, by a corresponding Expression out of the above-described Expression (5), Expression (9), and Expression (10), and supplies the generated prediction motion vector information to the motion prediction/compensation unit 122.

The switch 125 selects the prediction image generated by the motion prediction/compensation unit 122 or intra prediction unit 121, and supplies to the computing unit 115.

Note that with the motion prediction/compensation unit 75 and prediction motion vector generating unit 76 shown in FIG. 7, there is the need to generate prediction images for all candidate modes, generate multiple candidate prediction motion vector information, calculate cost function values, and perform selection of prediction motion vector information and mode determination.

Conversely, with the motion prediction/compensation unit 122 and prediction motion vector generating unit 124 shown in FIG. 20, the mode information corresponding to the current block, code number as to the prediction motion vector information, and difference motion vector information, are received form the header of the compressed image, and only motion compensation processing using these is performed. Note that at this time, flag information indicating variable mode or fixed mode for code number assignation information as to prediction motion vector information sent for each slice, and code number assignation as to the prediction motion vector information, are used, to generate prediction motion vector information, which is also used for motion compensation processing.

[Configuration Example of Motion Prediction/Compensation Unit]

Figure 21:
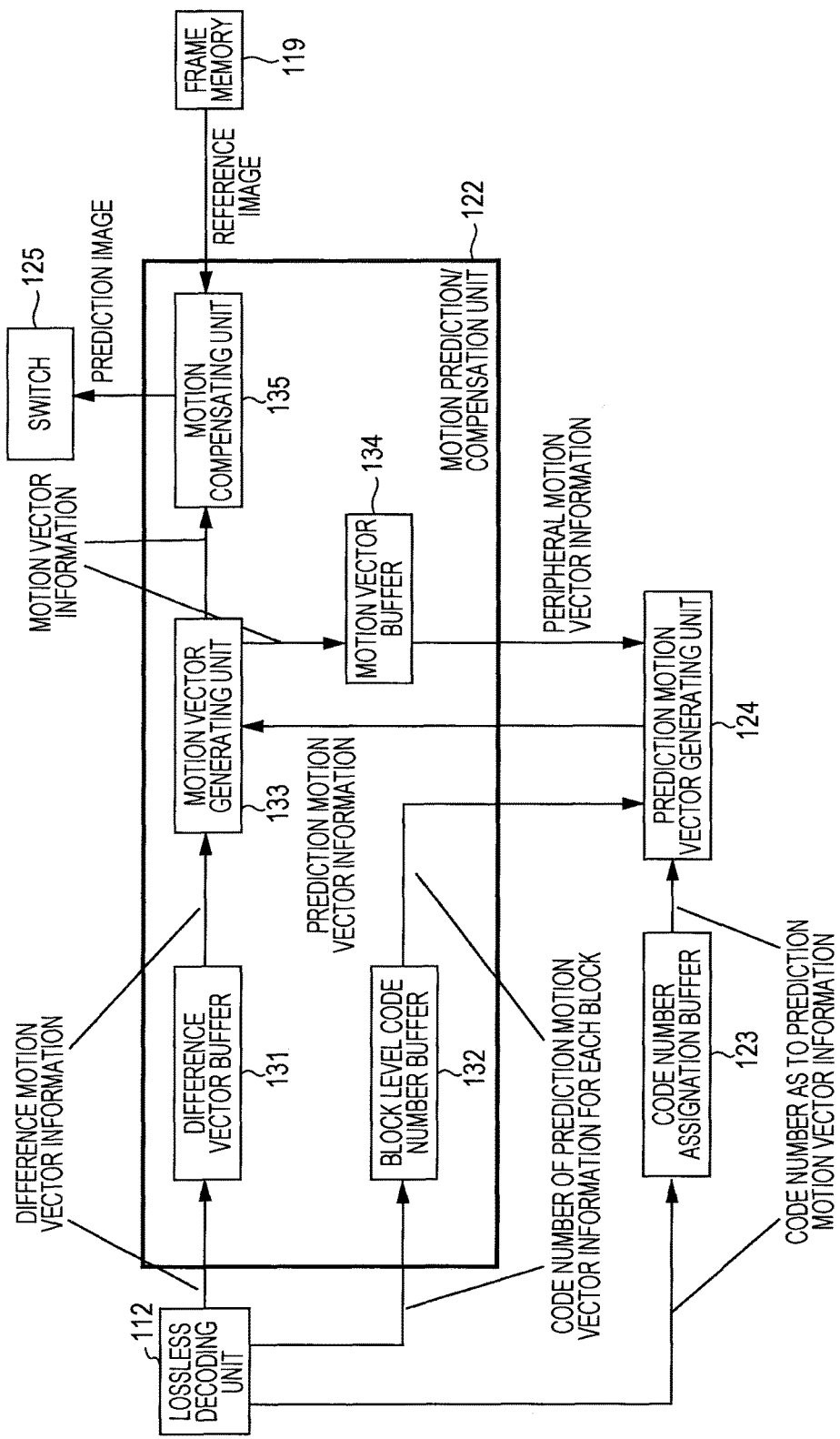
FIG. 21 is a block diagram illustrating a configuration example of the motion prediction/competition unit in FIG. 20.

FIG. 21 is a block diagram illustrating a detailed configuration example of the motion prediction/compensation unit 122. Note that in FIG. 17, the switch 120 in FIG. 20 is omitted.

In the example in FIG. 21, the motion prediction/compensation unit 122 is configured of a difference vector buffer 131, a block level code number buffer 132, a motion vector generating unit 133, a motion vector buffer 134, and a motion compensation unit 135.

Difference motion vector information for each block is supplied from the lossless decoding unit 112 to the difference vector buffer 131. The difference vector buffer 131 stores the difference motion vector information supplied thereto and supplies this to the motion vector generating unit 133.

Code numbers, indicating information which prediction motion vector information is used for which block, is supplied from the lossless decoding unit 112 to the block level code number buffer 132. The block level code number buffer 132 stores the code numbers of the prediction motion vector information for each block, and supplies to the prediction motion vector generating unit 124.

The difference motion vector information from the difference vector buffer 131, and the prediction motion vector information for each block generated by the prediction motion vector generating unit 124, are supplied to the motion vector generating unit 133. The motion vector generating unit 133 adds the prediction motion vector information of the current block to the difference motion vector information of the current block, thereby generating motion vector information of the current block. The motion vector generating unit 133 supplies the generated motion vector information to the motion vector buffer 134 and motion compensation unit 135.

The motion vector buffer 134 stores the motion vector information for each block from the motion vector generating unit 133 as peripheral motion vector information, for generating the prediction motion vector information of the next block. The stored peripheral motion vector information is supplied to the prediction motion vector generating unit 124.

The motion compensation unit 135 subjects the reference image from the frame memory 119 to compensation processing in the prediction mode which the prediction mode information indicates, using the motion vector information from the motion vector generating unit 133, thereby generating a prediction image.

[Description of Decoding Processing of Image Decoding Device]

Figure 22:
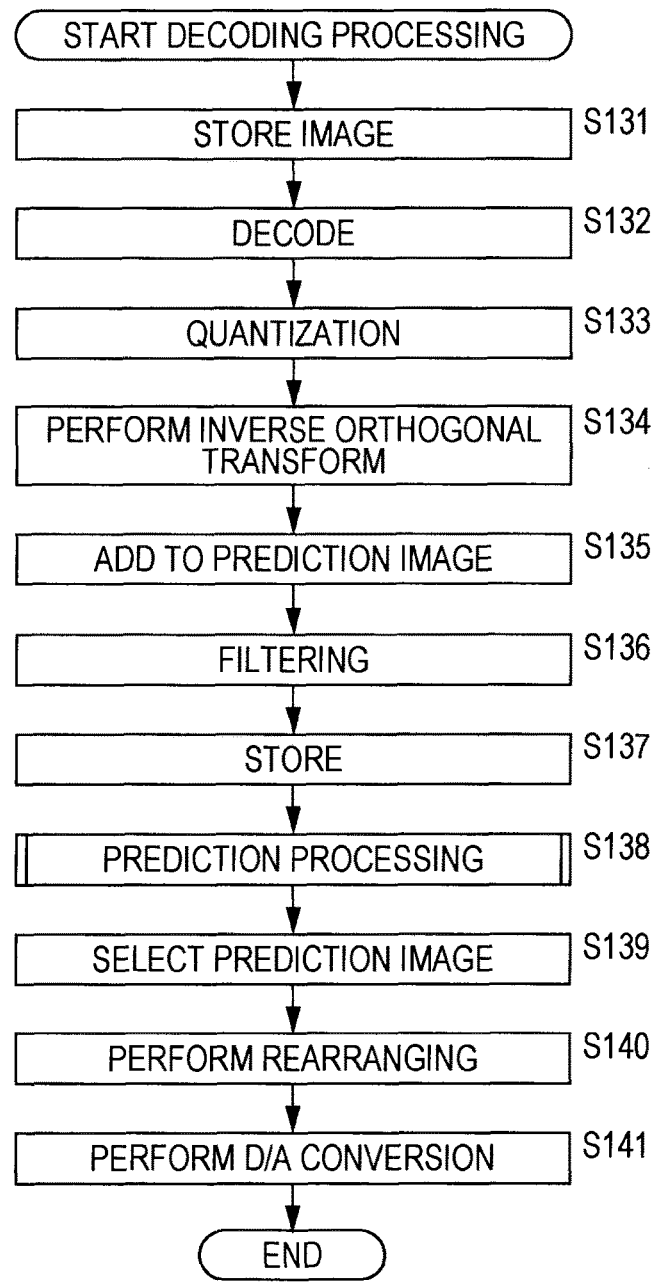
FIG. 22 is a flowchart for describing the decoding processing of the image decoding device in FIG. 20.

Next, the decoding processing that the image decoding device 101 executes will be described with reference to the flowchart in FIG. 22.

In step S131, the storing buffer 111 stores the transmitted image. In step S132, the lossless decoding unit 112 decodes the compressed image supplied from the storing buffer 111. Specifically, the I picture, P picture, and B picture encoded by the lossless encoding unit 66 in FIG. 7 are decoded.

At this time, the difference motion vector information, reference frame information, flag information of code number assignment as to prediction motion vector information (mv_predictor_definition_flag), code number assignment information indicating the relation thereof if available, and prediction mode information (information indicating the intra prediction mode or inter prediction mode), and so forth, are also decoded.

That is to say, in the event that the prediction mode information is intra prediction mode information, the prediction mode information is supplied to the intra prediction unit 121. In the event that the prediction mode information is inter prediction mode information, the difference motion vector information and reference frame information corresponding to the prediction mode information are supplied to the motion prediction/compensation unit 122. Also, the flag information of code number assignment as to prediction motion vector information, and the assignment thereof if available, are supplied to the motion vector precision determining unit 123.

In step S133, the inverse quantization unit 113 inversely quantizes the transform coefficient decoded by the lossless decoding unit 112 using a property corresponding to the property of the quantization unit 65 in FIG. 7. In step S134, the inverse orthogonal transform unit 114 subjects the transform coefficient inversely quantized by the inverse quantization unit 113 to inverse orthogonal transform using a property corresponding to the property of the orthogonal transform unit 64 in FIG. 7. This means that difference information corresponding to the input of the orthogonal transform unit 64 in FIG. 7 (the output of the computing unit 63) has been decoded.

In step S135, the computing unit 115 adds the prediction image selected in the processing in later-described step S139 and input via the switch 125, to the difference information. Thus, the original image is decoded. In step S136, the deblocking filter 116 subjects the image output from the computing unit 115 to filtering. Thus, block distortion is removed. In step S137, the frame memory 119 stores the image subjected to filtering.

In step S138, the intra prediction unit 121 or motion prediction/compensation unit 122 performs the corresponding image prediction processing in response to the prediction mode information supplied from the lossless decoding unit 112.

That is to say, in the event that the intra prediction mode information has been supplied from the lossless decoding unit 112, the intra prediction unit 121 performs the intra prediction processing in the intra prediction mode. In the event that the inter prediction mode information has been supplied from the lossless decoding unit 112, the motion prediction/compensation unit 122 performs the motion prediction/compensation processing in the inter prediction mode. At this time, the code number assignment information corresponding to the flag information for code number assignment as to the prediction motion vector information is used to generate prediction motion vector information, with which and also difference motion vector information, motion vector information is generated. The generated motion vector information is then used to perform compensation processing as to the reference image, thereby generating a prediction image in the intra prediction mode.

Figure 23:
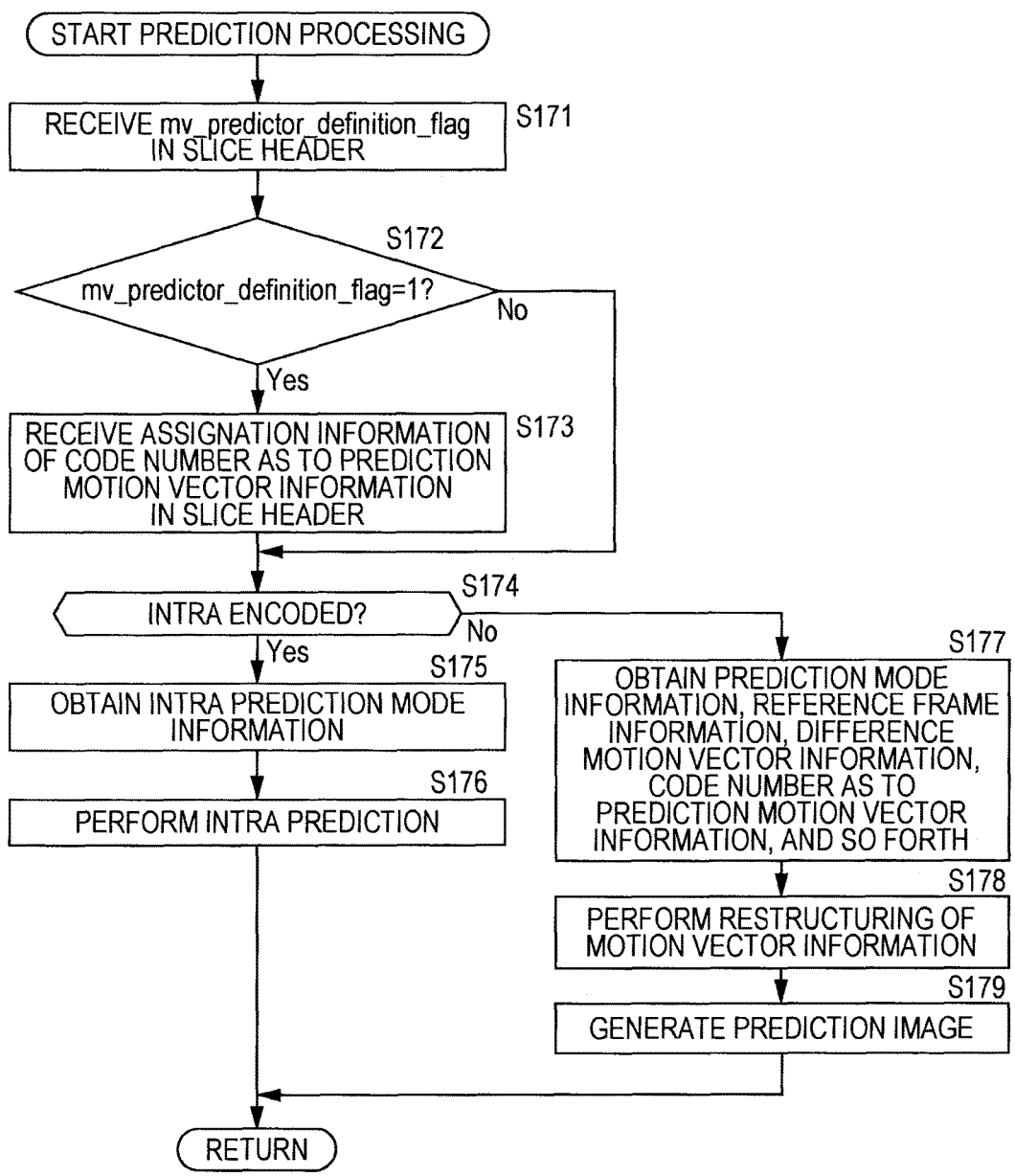
FIG. 23 is a flowchart for describing prediction processing in step S138 in FIG. 22.

The details of the prediction processing in step S138 will be described later with reference to FIG. 23, but according to this processing, the prediction image generated by the intra prediction unit 121 or the prediction image generated by the motion prediction/compensation unit 122 is supplied to the switch 125.

In step S139, the switch 125 selects the prediction image. Specifically, the prediction image generated by the intra prediction unit 121 or the prediction image generated by the motion prediction/compensation unit 122 is supplied. Accordingly, the supplied prediction image is selected, supplied to the computing unit 115, and is added to the output of the inverse orthogonal transform unit 114 in step S135, as described above.

In step S140, the screen rearranging buffer 117 performs rearranging. Specifically, the sequence of frames rearranged for encoding by the screen rearranging buffer 62 of the image encoding device 51 is rearranged in the original display sequence.

In step S141, the D/A conversion unit 118 performs D/A conversion of the image from the screen rearranging buffer 117. This image is output to an unshown display, and the image is displayed.

[Description of Prediction Processing of Image Decoding Device]

Next, the prediction processing in step S138 in FIG. 22 will be described with reference to the flowchart in FIG. 23.

In step S171 the code number assigning buffer 123 receives the mv_predictor_definition_flag in the slice header from the lossless decoding unit 112. The code number assigning buffer 123 then determines in step S172 whether or not the mv_predictor_definition_flag indicates 1.

In the event that determination is made in step S172 that mv_predictor_definition_flag indicates 1, this is the variable mode where code assignment to the prediction motion vector information is changeable. Accordingly, in step S173 the code number assigning buffer 123 receives the code number assignment information as to the prediction motion vector information in the slice header from the lossless decoding unit 112, and temporarily stores this. The code number assigning buffer 123 then supplies the stored code number assignment to the prediction motion vector generating unit 124.

Also, in the event that determination is made in step S172 that mv_predictor_definition_flag indicates 0, this is the fixed mode for code assignment as to prediction motion vector information, so step S173 is skipped. In this case, the code number assigning buffer 123 supplies the stored default code number assignment information to the prediction motion vector generating unit 124.

In step S174, the intra prediction unit 121 determines whether or not the current block has been subjected to intra encoding. Upon the intra prediction mode information being supplied from the lossless decoding unit 112 to the intra prediction unit 121, in step S174 the intra prediction unit 121 determines that the current block has been subjected to intra encoding, and the processing proceeds to step S175.

In step S175, the intra prediction unit 121 obtains the intra prediction mode information, and in step S176 performs intra prediction.

That is to say, in the event that the image to be processed is an image to be subjected to intra processing, the necessary image is read out from the frame memory 119, and supplied to the intra prediction unit 121 via the switch 120. In step S176, the intra prediction unit 121 performs intra prediction in accordance with the intra prediction mode information obtained in step S175 to generate a prediction image. The generated prediction image is output to the switch 125.

On the other hand, in the event that determination is made in step S174 that intra encoding has not been performed, the processing proceeds to step S177.

In the event that the image to be processed is an image to be inter processed, the motion prediction/compensation unit 122 is supplied with inter prediction mode information for each block from the lossless decoding unit 112, and also reference frame information for each block, difference motion vector information, and code number as to prediction motion vector information.

In step S178, the motion prediction/compensation unit 122 obtains the inter prediction mode, reference frame information, difference motion vector information, and code number as to prediction motion vector information. The obtained difference motion vector information is stored in the difference vector buffer 131. The code number as to the prediction motion vector information is stored in the block level code number buffer 132. The inter prediction mode information and reference frame information are supplied to the motion vector generating unit 133, though not illustrated in the example in FIG. 21.

In step S178, the motion vector generating unit 133 and prediction motion vector generating unit 124 perform reconstruction of motion vector information. That is to say, the prediction motion vector generating unit 124 obtains the types of prediction motion vector information, based on the code number assignment information from the code number assigning buffer 123 and code number assigned to the prediction motion vector information for each block from the block level code number buffer 132. The prediction motion vector generating unit 124 then generates prediction motion vector information for each block by the corresponding Expression of the above-described Expression (5), Expression (9), and Expression (19), using the peripheral motion vector information from the motion vector buffer 134. The generated prediction motion vector information is supplied to the motion vector generating unit 133.

The motion vector generating unit 133 adds the prediction motion vector information of the current block from the prediction motion vector generating unit 124 to the difference motion information of the current block from the difference vector buffer 131, and generates motion vector information of the current block. The generated motion vector information is supplied to the motion compensation unit 135 along with the inter prediction mode information. Also, the motion vector information is also supplied to the motion vector buffer 134 and stored.

In step S179 the motion compensation unit 135 subjects the reference image from the frame memory 119 to compensation processing in the prediction mode which the prediction mode information indicates, using the motion vector information from the motion vector generating unit 133. The generated prediction image is supplied to the switch 125.

As described above, with the image encoding device 51 and image decoding device 101, a variable mode is provided in which the code number assignment as to the prediction motion vector information is changeable, so code number assignment as to the prediction motion vector information can be changed.

Accordingly, the code number assignment as to the prediction motion vector information can be changed by the user or an application, such that encoding efficiency or subjective image quality is improved. As a result, encoding efficiency and subjective image quality can be improved, thereby achieving higher encoding efficiency.

[Another Configuration Example of Image Encoding Device]

Figure 24:
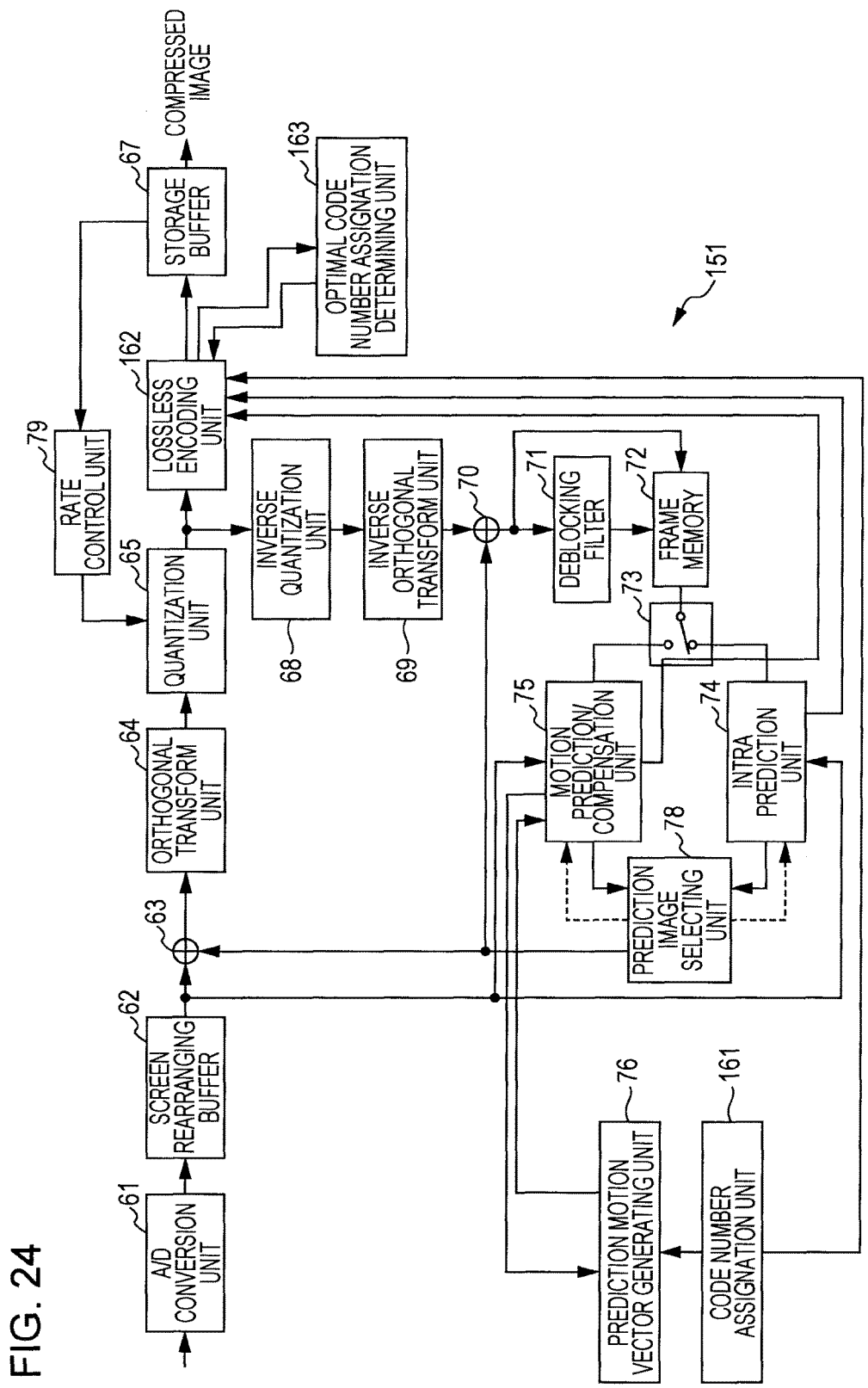
FIG. 24 is a block diagram illustrating another embodiment of an image encoding device.

FIG. 24 illustrates the configuration of another embodiment of an image encoding device serving as an image processing device.

The image encoding device 151 in FIG. 24 is common with the image encoding device 51 in FIG. 7 regarding the point of having an A/D conversion unit 61, the screen rearranging buffer 62, the computing unit 63, the orthogonal transform unit 64, the quantization unit 65, the storing buffer 67, the inverse quantization unit 68, the inverse orthogonal transform unit 69, the computing unit 70, the deblocking filter 71, frame memory 72, the switch 73, the intra prediction unit 74, the motion prediction/compensation unit 75, the prediction motion vector generating unit 76, the prediction image selecting unit 78, and the rate control unit 79. Also, the image encoding device 151 in FIG. 24 differs from the image encoding device 51 in FIG. 7 regarding the point of the code number assigning unit 77 and lossless encoding unit 66 having been replaced by a code number assigning unit 161 and lossless encoding unit 162 respectively, and the point of an optimal code number assignment determining unit 163 having been added.

That is to say, with the image encoding device 51 in FIG. 7, assignation of code numbers as to each prediction motion vector information, which is the correlation between the prediction motion vector information and code numbers, was set by the user or an application. Conversely, with the image encoding device 151 in FIG. 24, every code number assignment information that is possible for the current picture or slice is generated. All encoding information (compressed image) relating the current picture or slice is generated using every code number assignment information, and these are temporarily stored in the lossless encoding unit 162.

These encoding information are all supplied to the optimal code number assignment determining unit 163. The optimal code number assignment determining unit 163 generates a cost function value to each assignation, takes a code number assignation of which the value is smallest as optimal assignation as to the current picture or slice, and supplies that information to the lossless encoding unit 162.

Of the encoding information (compressed image) relating to every code number assignation that is stored, the lossless encoding unit 162 only outputs to the storage buffer 67 that relating to the optimal assignation.

The decoding side device corresponding to this image encoding device 151 is basically of the same configuration as the image decoding device 101 in FIG. 20, and accordingly description thereof will be omitted.

As described above, code assignation as to prediction motion vector information is not restricted to being set by user or application, and an arrangement may be made where optimal code assignation is decoded from code assignation as to prediction motion vector information at the image encoding device, so as to improve encoding efficiency and subjective image quality.

Note that description has been made above regarding using temporal prediction motion vector information, spatial prediction motion vector information, and spatio-temporal prediction motion vector information, as candidate prediction motion vector information, but other prediction motion vector information may be used as candidates as well, as a matter of course.

[Prediction Motion Vector Information]

While description has been made above using the method described in NPL 1 as an example of a prediction motion vector information generating method, the following method, for example, may be applied, unrestricted to this.

For example, in the case of the method illustrated in the above-described NPL 1, the greater the number of candidate prediction motion vector information which is prediction motion vector information serving as candidates, the greater the amount of processing the amount of computation is. Also, with a current GOP, improving the image quality of a referenced picture such as a P picture for example also improves the image quality of a B picture making reference thereto.

Accordingly, an arrangement may be made where the motion prediction/compensation unit 75 performs motion prediction/compensation (encoding processing) using a greater number of candidate motion vector information with regard to a referenced picture (e.g., P picture, etc.). Also, an arrangement may be made where the motion prediction/compensation unit 75 performs motion prediction/compensation (encoding processing) using a smaller number of candidate motion vector information with regard to picture which is not referenced (e.g., B picture, etc.), or motion vector encoding as with AVC is performed instead of performing processing such as illustrated in NPL 1.

For example, in a case of encoding a referenced picture when processing another picture, the prediction motion vector generating unit 76 is made to generate more candidate motion vector information than with a case of encoding a picture not referenced when processing another picture. That is to say, in this case, the optimal prediction motion vector selecting unit 93 selects optimal prediction motion vector information from a greater number of candidate motion vector information.

Also, in a case of encoding a picture not referenced when processing another picture, the prediction motion vector generating unit 76 is made to generate fewer candidate motion vector information than with a case of encoding a picture referenced when processing another picture, or alternatively, generate a single prediction motion vector information as with AVC. That is to say, in this case, the optimal prediction motion vector selecting unit 93 selects optimal prediction motion vector information from a smaller number of candidate motion vector information, or takes a single generated prediction motion vector information as optimal prediction motion vector information.

Thus, the image encoding device can improve encoding efficiency with a smaller amount of computation.

In this case as well, the image encoding device stores information relating to which candidate prediction motion vector to use, in each slice header or picture parameter set (e.g., these information are transmitted to the decoding device side).

[Macroblocks]

Also, in the above description, the macroblock size has been described regarding a case of 16×16 pixels, but the present technology can be applied to extended macroblock sizes as well.

Figure 25:
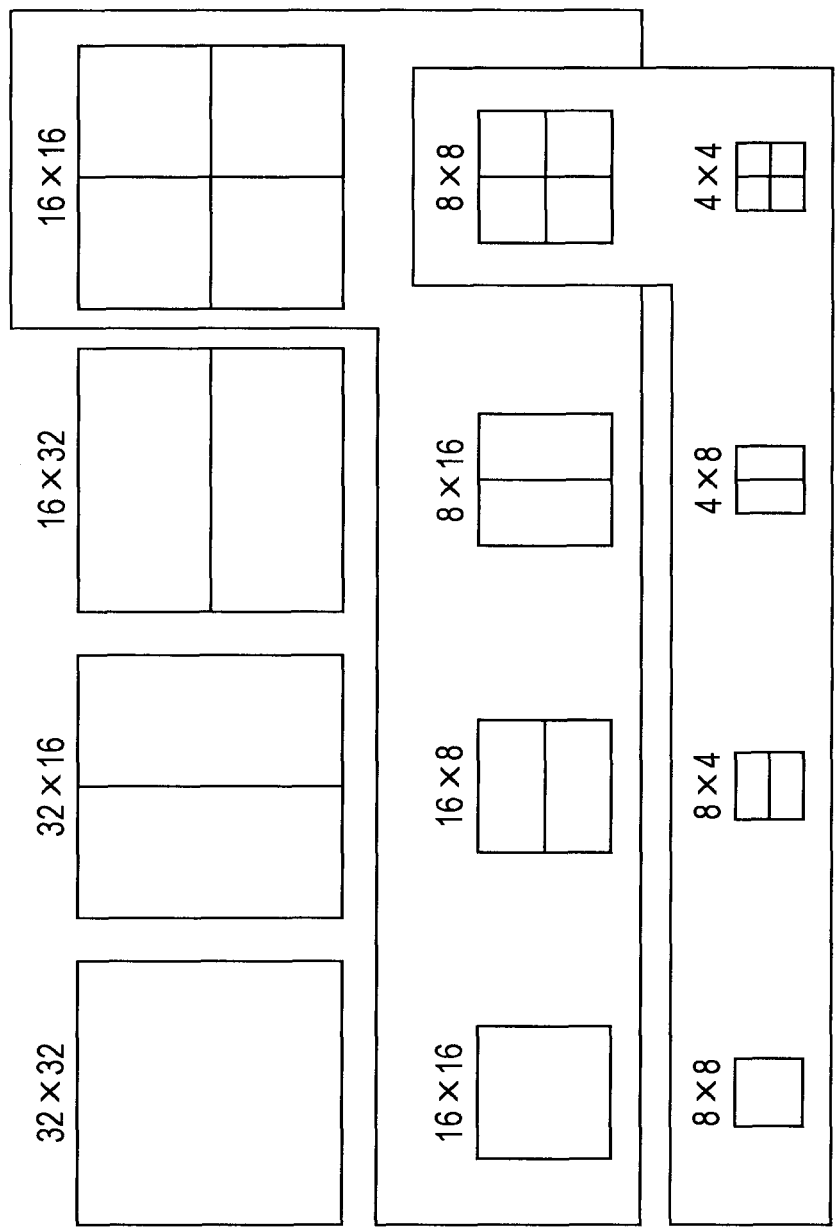
FIG. 25 is a diagram illustrating an example of an extended macroblock size.

FIG. 25 is a diagram illustrating an example of an extended macroblock size.

Macroblocks made up of 32×32 pixels divided into blocks (partitions) of 32×32 pixels, 32×16 pixels, 16×32 pixels, and 16×16 pixels are shown from the left in order on the upper tier in FIG. 25. Blocks made up of 16×16 pixels divided into blocks of 16×16 pixels, 16×8 pixels, 8×16 pixels, and 8×8 pixels are shown from the left in order on the middle tier in FIG. 25. Also, blocks made up of 8×8 pixels divided into blocks of 8×8 pixels, 8×4 pixels, 4×8 pixels, and 4×4 pixels are shown from the left in order on the lower tier in FIG. 25.

In other words, the macroblocks of 32×32 pixels may be processed with blocks of 32×32 pixels, 32×16 pixels, 16×32 pixels, and 16×16 pixels shown on the upper tier in FIG. 25.

Also, the blocks of 16×16 pixels shown on the right side on the upper tier may be processed with blocks of 16×16 pixels, 16×8 pixels, 8×16 pixels, and 8×8 pixels shown on the middle tier in the same way as with the H.264/AVC format.

Further, the blocks of 8×8 pixels shown on the right side on the middle tier may be processed with blocks of 8×8 pixels, 8×4 pixels, 4×8 pixels, and 4×4 pixels shown on the lower tier in the same way as with the H.264/AVC format.

With the extended macroblock sizes, by employing such a hierarchical structure, regarding a 16×16-pixel block or less, a greater block is defined as a superset thereof while maintaining compatibility with the H.264/AVC format.

The present technology may also be applied to the extended macroblock sizes proposed as described above. In the event of the present technology being applied to extended macroblock sizes as well, a different code numbers are assigned to prediction motion vector information between normal macroblocks and extended macroblocks, for example, for example, a normal macroblock is configured of 16×16 pixels, and an extended macroblock is configured of 32×32 pixels.

Description has been made so far using the H.264/AVC format as a base as a coding format, but is not restricted to this. That is to say, the present technology can be applied to other encoding formats/decoding formats which perform motion prediction/compensation and further use multiple prediction motion vector information for encoding of motion vector information.

[Coding Unit]

Now, the macroblock size of 16×16 pixels is not optimal for large image frames such as UHD (Ultra High Definition; 4000×2000 pixels) which will be handled by next-generation encoding formats.

Accordingly, standardization of an encoding format called HEVC (High Efficiency Video Coding) has currently been advanced by JCTVC (Joint Collaboration Team-Video Coding) serving as a standardization organization of collaboration between ITU-T (International Telecommunication Union Telecommunication Standardization Sector) and ISO (International Organization for Standardization)/IEC with further improvement in encoding efficiency.

Figures 1, 2:
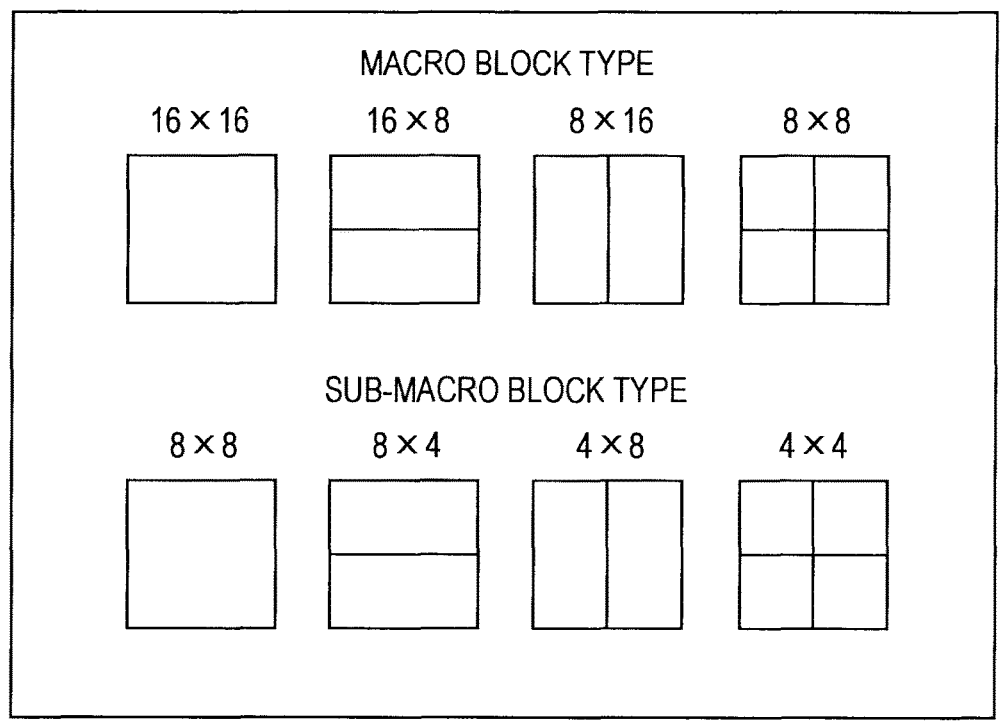
FIG. 1 is a diagram for describing motion prediction/compensation processing with ¼ pixel precision.
FIG. 2 is a diagram for describing motion prediction/compensation processing with variable block size.
Figure 3:
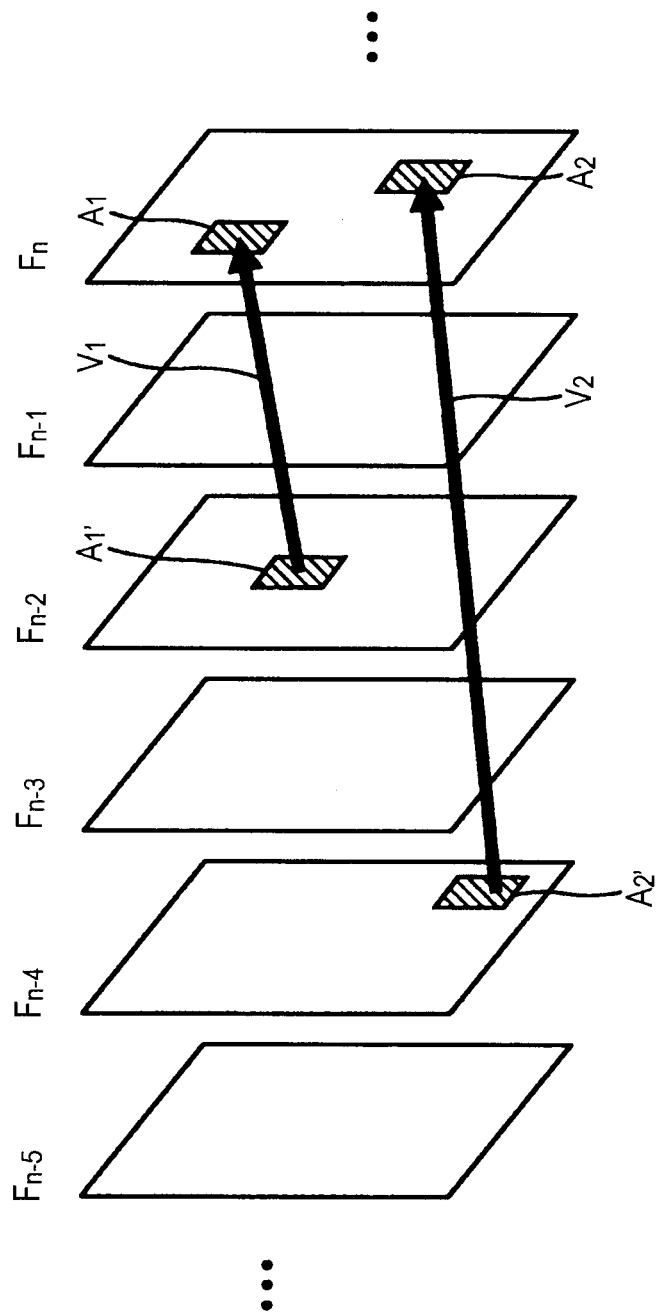
FIG. 3 is a diagram for describing a motion prediction/compensation method of multi-reference frames.
Figure 4:
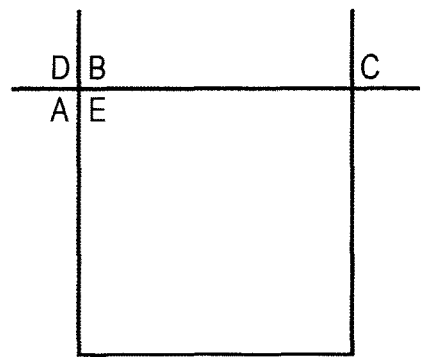
FIG. 4 is a diagram for describing an example of a motion vector information generating method.
Figure 5:
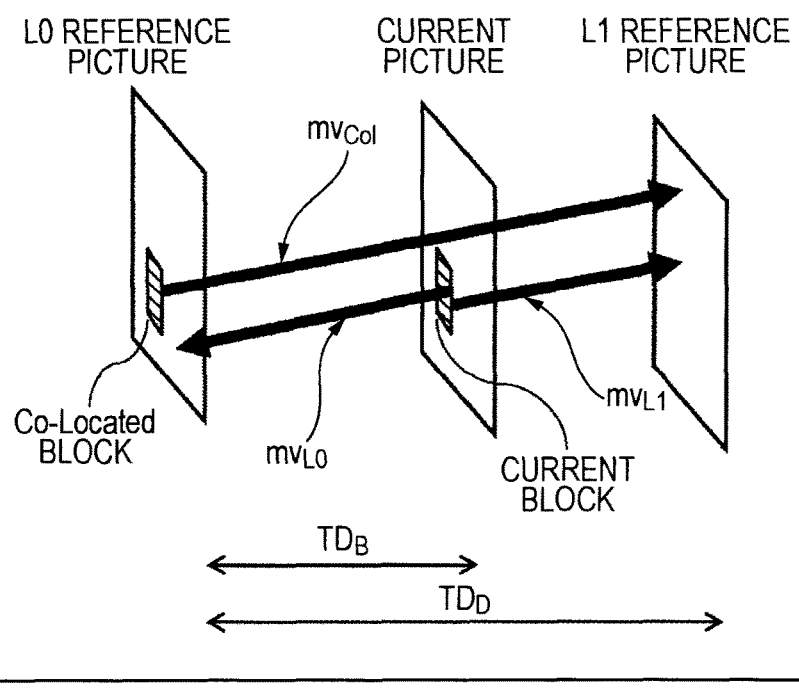
FIG. 5 is a diagram for describing a time direct mode.
Figure 31:
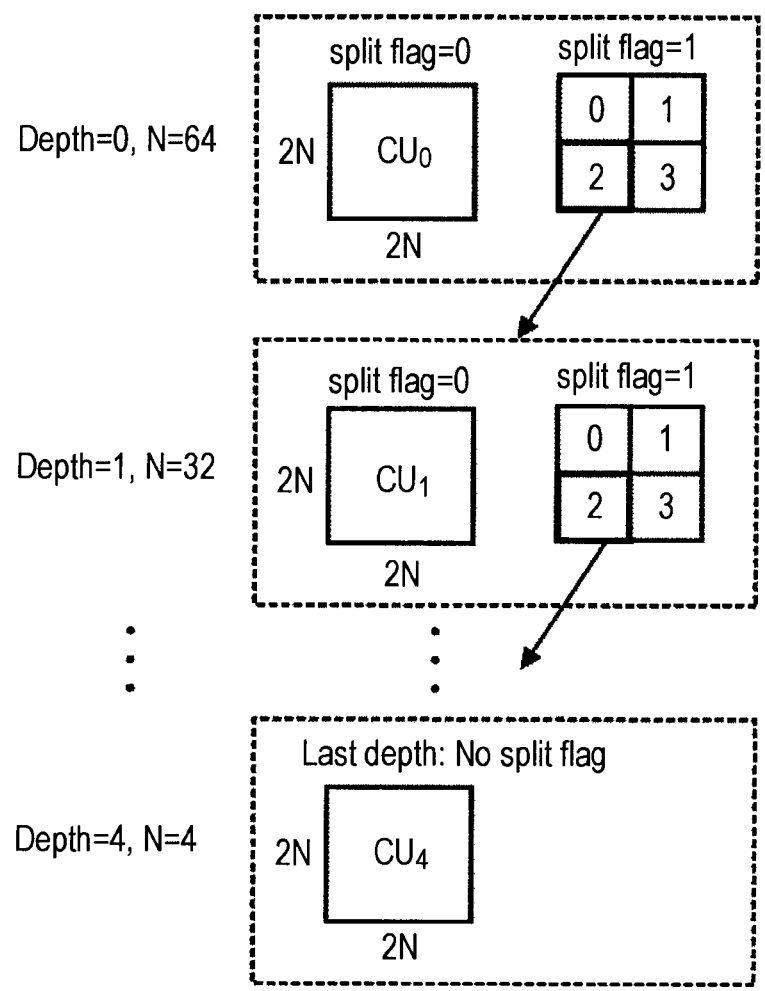
FIG. 31 is a diagram illustrating a configuration example of a coding unit.

With AVC, a hierarchical structure is stipulated of macroblocks and sub-macroblocks, as shown in FIG. 2, coding unit (CU (Coding Unit)) is stipulated with HEVC, as shown in FIG. 31.

A (CU) is also referred to as Coding Tree Block (CTB), and is a partial region of an image in picture increments, serving as the same role as a macroblock in AVC. Whereas the latter is fixed to the size of 16×16 pixels, the size of the former is not fixed, and is specified within image compressed information in the respective sequence.

For example, CUs having the maximum size (LCU (Large Coding Unit)), and the minimum size (SCU (Smallest Coding Unit)) are stipulated in a sequence parameter set (SPS (Sequence Parameter Set)) included in encoded data to be output.

Within each LCU, division can be made into CUs of smaller sizes by setting split-flag=1 within a range of not being smaller than the size of an SCU. In the example in FIG. 31, the size of the LCU is 128, and the maximum hierarchical depth is 5. A CU having a size of 2N×2N is divided into a CU having a size of N×N which becomes one lower hierarchical level when the value of split_flag is "1".

Further, a CU is divided into prediction units (Prediction Unit (PU)) which are regions (partial regions of an image in picture increments) serving as intra or inter prediction increments, and also divided into transform units (Transform Unit (TU)) serving as regions (partial regions of an image in picture increments) which are processing increments of orthogonal transform. Currently, with the HEVC encoding format, in addition to 4×4 and 8×8, 16×16 and 32×32 orthogonal transform can be employed.

In a case of an encoding format where CUs are defined and the CUs are used as increments to perform various types of processing, as with HEVC described above, macroblocks in AVC can be considered to be equivalent to LCUs. Note however, a CU has a hierarchical structure as shown in FIG. 31, so the size of the highest hierarchical level LCU generally is set larger than an AVC macroblock, such as 128× 128 pixels, for example.

The present technology can also be applied to encoding formats using such CUs, PUs, TUs, and so forth, instead of macroblocks. That is to say, the processing increments for prediction processing may be optional regions.

Also, switching control of code numbers may be arranged to be performed in optional processing increments, and may be performed every region of prediction processing units, such as CUs, PUs, and so forth, not just sequences, pictures, and slices. In this case, the way of code number assignment as to prediction motion vector information in that region is controlled in accordance with the motion features of the region to be processed, more specifically, whether the region to be processed (current region) is a region configured of a still image (still region) or is a region configured of an image of a moving object (moving region). That is to say, in this case, whether or not the region is a still region is distinguished for each region.

[Image Encoding Device]

Figure 32:
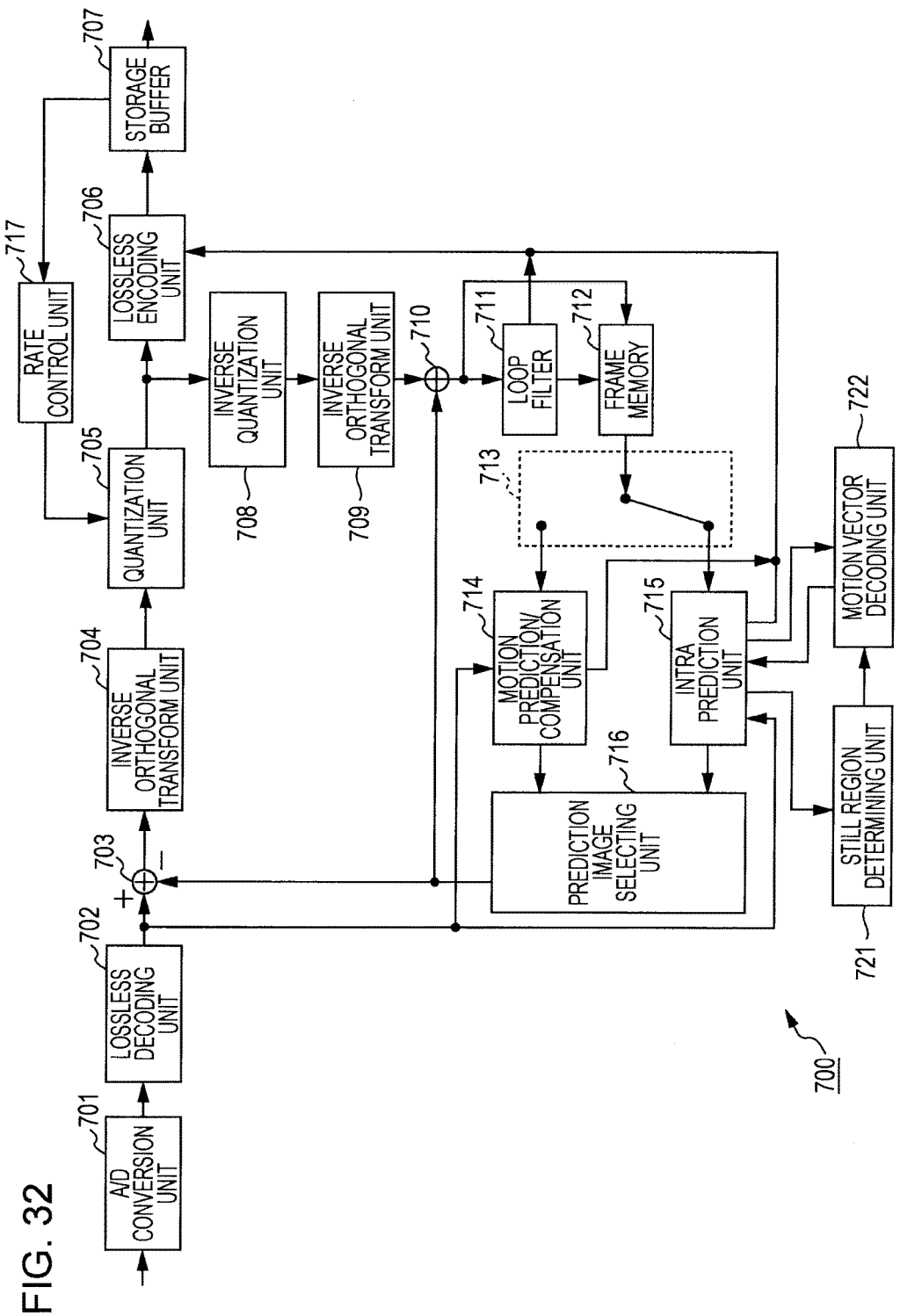
FIG. 32 is a block diagram illustrating another configuration example of an image encoding device.

FIG. 32 is a block diagram illustrating a primary configuration example of an image encoding device in this case.

The image encoding device 700 shown in FIG. 32 is of basically the same configuration as the image encoding device 51 in FIG. 7, and encodes image data. We will say that the image encoding device 700 performs inter processing every prediction unit (PU), as described with reference to FIG. 31.

As shown in FIG. 32, the image encoding device 700 is configured of an A/D conversion unit 701, a screen rearranging buffer 702, a computing unit 703, an orthogonal transform unit 704, a quantization unit 705, a lossless encoding unit 706, and a storage buffer 707. Also, the image encoding device 700 has an inverse quantization unit 708, an inverse orthogonal transform unit 709, a computing unit 710, a deblocking filter 711, frame memory 712, a switch 713, an intra prediction unit 714, a motion prediction/compensation unit 715, a prediction image selecting unit 716, and a rate control unit 717.

The image encoding device 700 further has a still region determining unit 721 and a motion vector encoding unit 722.

The A/D conversion unit 701 performs A/D conversion of an input image, and supplies the image data following conversion (digital data) to the screen rearranging buffer 702 for storing. The screen rearranging buffer 702 rearranges the images of frames in the stored order for display into the order of frames for encoding according to GOP, and supplies the images of which the frame order has been rearranged to the computing unit 703. Also, the screen rearranging buffer 702 supplies the images of which the frame order has been rearranged to the intra prediction unit 714 and motion prediction/compensation unit 715.

The computing unit 703 subtracts, from the image read out from the screen rearranging buffer 702, the prediction image supplied from the intra prediction unit 714 or motion compensation/compensation unit 715 via the prediction image selecting unit 716 from the image read out from the screen rearranging buffer 702, and outputs the difference information thereof to the orthogonal transform unit 704.

For example, in the case of an image on which inter encoding is to be performed, the computing unit 703 subtracts the prediction image subtracted from the motion compensation/compensation unit 715, from the image read out from the screen rearranging buffer 702.

The orthogonal transform unit 704 subjects the difference information from the computing unit 703 to orthogonal transform, such as discrete cosine transform, Karhunen-Loéve transform, or the like. The orthogonal transform method here is optional. The orthogonal transform unit 704 outputs the transform coefficient thereof to the quantization unit 705.

The quantization unit 705 quantizes the transform coefficient supplied from the orthogonal transform unit 704. The quantization unit 705 sets quantization parameters regarding target values of code amount supplied from the rate control unit 717, and performs the quantization. Note that the method for this quantization is optional. The quantization unit 705 supplies the quantized transform coefficient to the lossless encoding unit 706.

The lossless encoding unit 706 encodes the transform coefficient quantized at the quantization unit 705 by an optional encoding method. The coefficient data is quantized under the control of the rate control unit 717, and accordingly the code amount thereof is the target value set by the rate control unit 717 (or approximates the target value).

Also, the lossless encoding unit 706 obtains information indicating intra prediction from the intra prediction unit 714, and obtains information indicating an intra inter prediction mode, and so forth from the motion prediction/compensation unit 715. Further, the lossless encoding unit 706 obtains filter coefficients and the like used at the loop filter 711.

The lossless encoding unit 706 encodes these various types of information, and takes these as part of header information of the encoded data (multiplexes). The lossless encoding unit 706 supplies the encoded data to the storage buffer 707 for storage.

With the lossless encoding unit 706, examples of lossless encoding processing include such as variable length coding, arithmetic coding, and so forth. Examples of the variable length coding include CAVLC (Context-Adaptive Variable Length Coding) stipulated by the H.264/AVC format, and so forth. Examples of the arithmetic coding include CABAC (Context-Adaptive Binary Arithmetic Coding) and so forth.

The storage buffer 707 temporarily holds the encoded data supplied from the lossless encoding unit 706. The storage buffer 707 outputs the data held therein to, for example, a downstream storage device (recording medium) or transmission path or the like, not shown in the drawing.

Also, the quantized transform coefficient output from the quantization unit 705 is also input to the inverse quantization unit 708. The inverse quantization unit 708 performs inverse quantization of the quantized transform coefficient with a method corresponding to the quantization by the quantization unit 705. Any method will suffice for this inverse quantization method, as long as corresponding to the quantization processing by the quantization unit 705. The inverse quantization unit 708 supplies the obtained transform coefficient to the inverse orthogonal transform unit 709.

The inverse orthogonal transform unit 709 performs inverse orthogonal transform of the transform coefficient supplied from the inverse quantization unit 708 with a method corresponding to the orthogonal transform processing by the orthogonal transform unit 704. Any method will suffice for this inverse orthogonal transform method, as long as corresponding to the orthogonal transform processing by the orthogonal transform unit 704. The output subjected to inverse orthogonal transform (restored difference information) is supplied to the computing unit 710.

The computing unit 710 adds the inverse orthogonal transform results supplied from the inverse orthogonal transform unit 709, i.e., the restored difference information, to the prediction image supplied from the intra prediction unit 714 or motion compensation/compensation unit 715 via the prediction image selecting unit 716, so as to obtain a locally decoded image (decoded image). The decoded image is supplied to the loop filter 711 or frame memory 712.

The loop filter 711 includes a deblocking filter and adaptive loop filter and the like, and performs filtering processing as appropriate on the decoded image supplied from the computing unit 710. For example, the loop filter 711 removes block noise of the decoded image by performing deblocking filter processing on the decoded image. Also, for example, the loop filter 711 performs image quality improvement on the deblocking filter processing results (decoded image subjected to block noise removal) by performing loop filter processing using a wiener filter (Wiener Filter).

Note that an arrangement may be made where the loop filter 711 performs optional filter processing on the decoded image. Also, an arrangement may be made where the loop filter 711 supplies information such as filter coefficients and the like used in filter processing to the lossless encoding unit 706 as necessary, so as to have these encoded.

The loop filter 711 supplies the filter processing results (decoded image after filter processing) to the frame memory 712. Note that as described above, the decoded image output from the computing unit 710 may be supplied to the frame memory 712 without going through the loop filter 711. That is to say, the filter processing by the loop filter 711 can be omitted.

The frame memory 712 stores the image supplied thereto, and supplies the stored decoded image to the selecting unit 713 at a predetermined timing, as a reference image.

The selecting unit 713 selects the supplying destination of the reference image supplied from the frame memory 712. For example, in the case of inter prediction, the selecting unit 713 supplies the reference image supplied from the frame memory 712 to the motion compensation/compensation unit 715.

The intra prediction unit 714 uses the pixel values within the picture to be processed, which is the reference image supplied from the frame memory 712 via the selecting unit 713, to perform intra prediction (intra-screen prediction) to generate a prediction image, basically in processing increments of PUs. The intra prediction unit 714 performs this intra prediction in multiple modes (intra prediction modes) prepared beforehand. The intra prediction unit 714 is not restricted to modes stipulated by the AVC encoding format, and can perform this intra prediction with other optional modes as well.

The intra prediction unit 714 generates prediction images in all candidate intra prediction modes, evaluates cost function values of the prediction images using the input image supplied from the screen rearranging buffer 702, and selects an optimal mode. Upon selecting the optimal intra prediction mode, the intra prediction unit 714 supplies a prediction image generated with that optimal mode to the prediction image selecting unit 716.

Also, as described above, the intra prediction unit 714 supplies intra prediction mode information indicating the intra prediction mode that has been employed, and so forth, to the lossless encoding unit 706 as appropriate.

The motion prediction/compensation unit 715 uses the input image supplied from the screen rearranging buffer 702, and the reference image supplied from the frame memory 712 via the selecting unit 713, to perform motion prediction (inter prediction) basically in processing increments of PUs, and perform motion compensation processing in accordance with detected motion vectors, thereby generating a prediction image (inter prediction image information). The motion prediction/compensation unit 715 performs this inter prediction in multiple modes (inter prediction modes) prepared beforehand. The motion prediction/compensation unit 715 is not restricted to modes stipulated by the AVC encoding format, and can perform this intra prediction with other optional modes as well.

The motion prediction/compensation unit 715 generates prediction images in all candidate inter prediction modes, evaluates cost function values of the prediction images, and selects an optimal mode. Upon selecting an optimal inter prediction mode, the motion prediction/compensation unit 715 supplies the prediction image generated in this optimal mode to the prediction image selecting unit 716.

The motion prediction/compensation unit 715 supplies the lossless encoding unit 706 with information indicating the inter prediction mode that has been employed, and information necessary for performing processing in that inter prediction mode at the time of decoding encoded data, and so forth to the lossless encoding unit 706, so as to be encoded.

The prediction image selecting unit 716 selects the supply source of the prediction image to be supplied to the computing units 703 and 710. For example, in the case of inter encoding, the prediction image selecting unit 716 selects the motion prediction/compensation unit 715 as the supply source of the prediction image, and supplies the prediction image supplied from the motion prediction/compensation unit 715 to the computing units 703 and 710.

The rate control unit 717 controls the rate of the quantization operations of the quantization unit 705, based on the code amount of the encoded data stored in the storage buffer 707, such that overflow or underflow does not occur.

The still region determining unit 721 distinguishes whether or not the current region is a still region (still region determination). The still region determining unit 721 supplies the determination results regarding whether or not a still region, to the motion vector encoding unit 722.

The motion vector encoding unit 722 controls code number assignation as to prediction motion vector information in an MV competition mode, based on the determination results regarding whether or not a still region, supplied from the still region determining unit 721.

More specifically, the motion vector encoding unit 722 generates all prediction motion vector information regarding all inter prediction modes using motion information of the peripheral region of the current region, and assigns code numbers for each generated prediction motion vector information with a method based on the still region determination results. Further, the motion vector encoding unit 722 determines an optimal prediction motion vector information, and generates difference between the optimal prediction motion vector information and the motion information (motion vector) of the current region (difference motion information). The motion vector encoding unit 722 supplies the generated difference motion information and code number of prediction motion vector information to the motion prediction/compensation unit 715.

[Still Region Determination and Code Number Assignment]

First, determination of still region by the still region determining unit 721 will be described in further detail.

Figure 33:
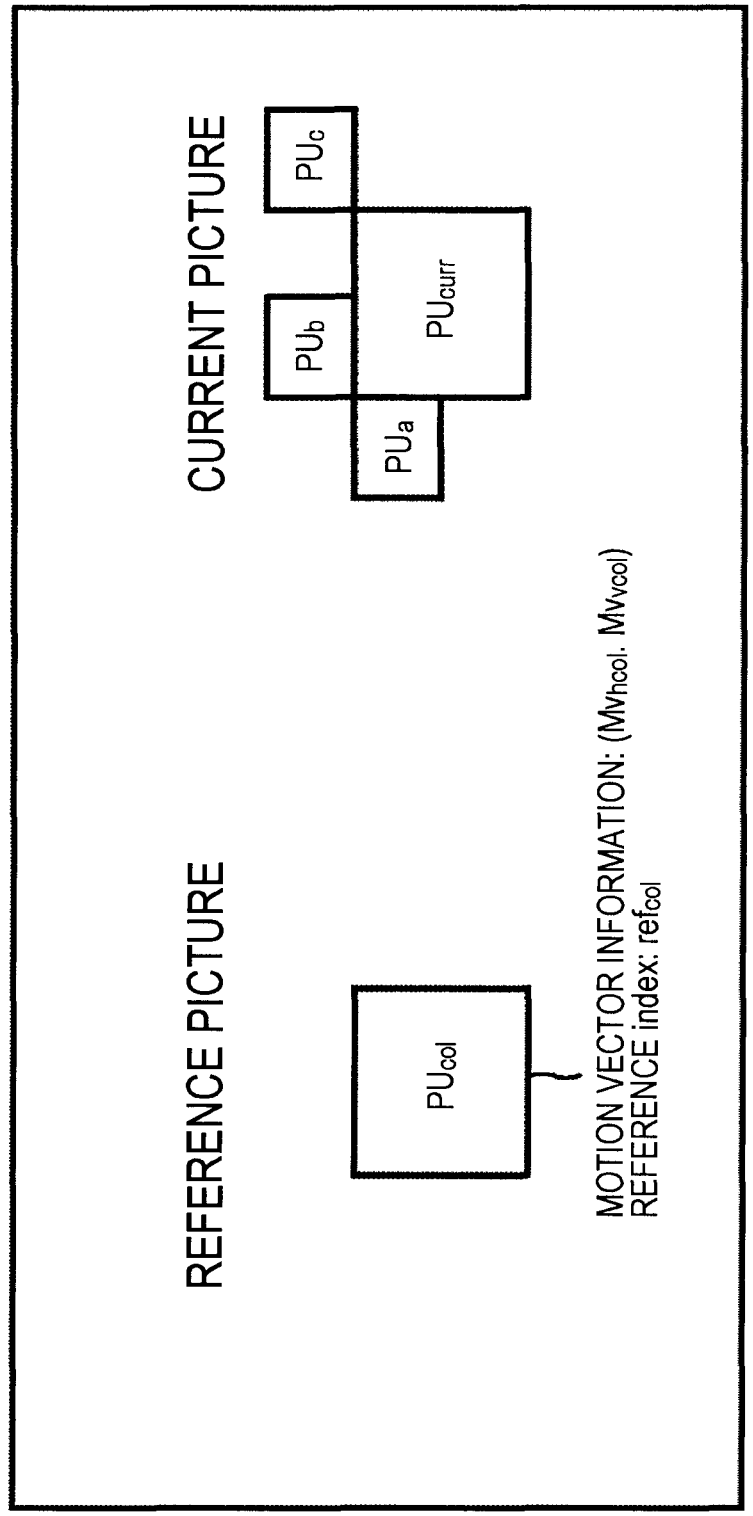
FIG. 33 is a diagram for describing an example of an adjacent region.

As shown in FIG. 33 for example, the still region determination by the still region determining unit 721 is performed using motion information as to the Co-Located region on a reference picture that has already been processed (motion information has already been calculated) at the point that the current region is processed. In the case of FIG. 33, the current region is the $PU_{curr}$ shown to the right side in FIG. 33, and the Co-Located region thereof is the $PU_{col}$ of the reference picture shown to the left side in FIG. 33. The still region determining unit 721 uses ($MV_{hco}l$, $MV_{vcol}$) which are the horizontal component and vertical component of the motion vector information of this Co-Located region $PU_{curr}$, and reference index $Ref_{col}$, to perform still region determination of the current region $PU_{curr}$.

That is to say, in a case where the following Expression (17) and Expression (18) hold, and also Expression (19) holds, with 0 as a threshold, a case where Ref_PicR_reordering is applied, or a case where the reference index $Ref_{col}$ has a POC value indicating a picture immediately before, the still region determining unit 721 determines the current region $PU_{curr}$ to be a still region.

$$|MV_{hcol}| \leq \theta \quad (17)$$

$$|MV_{vcol}| \leq \theta \quad (18)$$

$$Ref_{col} = 0 \quad (19)$$

By the value of the reference index $Ref_{col}$ being 0 in Expression (19), the still region determining unit 721 determines that the reference region $Pu_{col}$ of the Co-Located region in the reference picture is almost unmistakably configured of a still image. Also, the value of θ in Expression (17) and Expression (18) should be 0 if both the input image and reference image are original images themselves with no encoding distortion. However, in reality, though the input image is the original itself, the reference image is a decoded image and generally includes encoding distortion. Accordingly, even in the case of a still image, the 0 as the value of θ is not necessarily appropriate.

Accordingly, in the event that the value of the motion vector has ¼ pixel precision, the still region determining unit 721 sets θ=4. That is to say, in the event that the precision of the motion vector is within 1.0 in integer-pixel precision, the still region determining unit 721 determines this to be a still region.

Next, assignation of code numbers to prediction motion vector information by the motion vector encoding unit 722 will be described in further detail. In the following, we will say that motion vector information of prediction unit $PU_x$ is $MV_{PUx}$.

Figure 6:
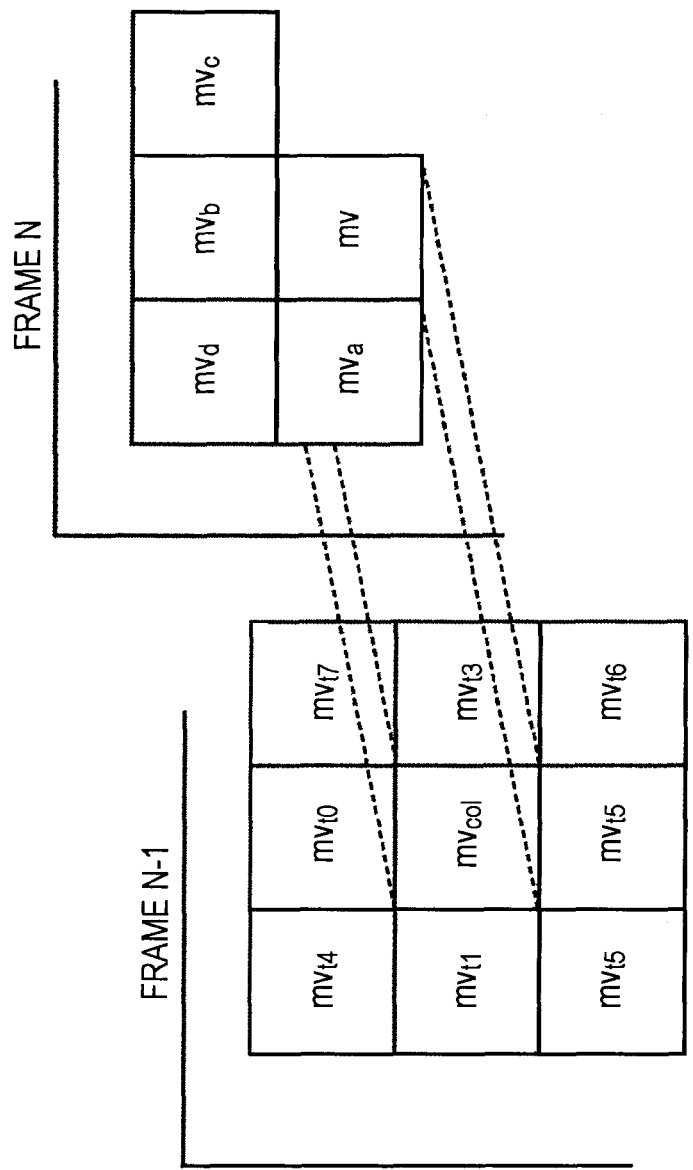
FIG. 6 is a diagram describing an example of a method for generating prediction motion vector information.

NPL 1 and Joel Jung, Guillaume Laroche, "Competition-Based Scheme for Motion Vector Selection and Coding", VCEG-AC06, ITU—Telecommunications Standardization Sector STUDY GROUP 16 Question 6 Video Coding Experts Group (VCEG) 29th Meeting: Klagenfurt, Austria, 17-18 Jul. 2006 (hereinafter referred to as NPL 2) propose a method of adaptively using, as prediction motion vector information, one of the temporal prediction motion vector information (Temporal Predictor) and spatio-temporal prediction motion vector information (Spatio-Temporal Predictor) described with reference to FIG. 6, in addition to the spatial prediction motion vector information (Spatial Predictor) obtained by the above-described Expression (5).

With NPL 2, the largest code number is assigned to temporal prediction motion vector information (temporal predictor). That is to say, in the case of this method, with the prediction motion vector information to which code number (code number) "y" as $PMV_y$, in the case of the example in FIG. 33, code numbers are assigned as with the following Expressions (20) through (23).

$$PMV_0 = MV_{PUa} \quad (20)$$

$$PMV_1 = MV_{PUb} \quad (21)$$

$$PMV_2 = MV_{PUc} \quad (22)$$

$$PMV_3 = MV_{PUcol} \quad (23)$$

As described above, in a case of performing mode determination by RD optimization, a mode with a smaller code number assigned thereto is more readily selected, with a lower bit rate in particular, and accordingly, with the method described in NPL 2, deterioration will be readily observed between moving regions and still regions.

That is to say, as described above with reference to FIG. 13, there is concern that using motion correlation in the spatial direction in a still region adjacent to a moving region will result in motion vector information of the moving region propagating to the still region and causing image quality deterioration. However, with the method described in NPL 2, a small code number that is readily selected is always assigned to the spatial prediction motion vector information (Spatial Predictor), so deterioration is readily observed between moving regions and still regions.

As described above, the motion vector encoding unit 722 also generates prediction motion vector information using motion information of peripheral regions of the current region which is to be processed. In the case of the example in FIG. 33, $PU_{curr}$ of the current picture is the current region, $PU_a$, $PU_b$, and $PU_c$ are regions situated spatially peripheral as to the current region, and $PU_{col}$ is a region situated temporally peripheral as to the current region.

In the following, a region which is thus spatially or temporally (spatio-temporally) peripheral will be referred to as a peripheral region. That is to say, we will refer to $PU_a$, $PU_b$, and $PU_c$ as being spatial peripheral regions of $PU_{curr}$, and will refer to $PU_{col}$ as being a temporal peripheral region of $PU_{curr}$.

The motion vector encoding unit 722 assigns code numbers to these motion information of peripheral regions, and at this time, controls the way in which code numbers as assigned in accordance to the still region determination results. More specifically, in a case where the above-described Expression (17) and Expression (18) hold, and also Expression (19) holds, a case where Ref_PicR_reordering is applied, or a case where the reference index $Ref_{col}$ has a POC value indicating a picture immediately before, in the still region determination the motion vector encoding unit 722 changes code number assignment as in the following Expressions (24) through (27).

$$PMV_0 = MV_{PUcol} \quad (24)$$

$$PMV_1 = MV_{PUa} \quad (25)$$

$$PMV_2 = MV_{PUb} \quad (26)$$

$$PMV_2 = MV_{PUc} \quad (27)$$

That is to say, with regard to a still region, the smallest code number is assigned to the temporal prediction motion vector information (temporal predictor), in order to suppress propagation of motion vectors in a moving region. Thus, the motion vector encoding unit 722 can improve the prediction precision of the prediction motion vector information, and can improve encoding efficiency.

Note that the still region determining unit 721 performs still region determination for each prediction unit, so the motion vector encoding unit 722 performing code number assignment following the determination of the still region determining unit 721 enables further improvement of the prediction precision of prediction motion vector information, and enables further improvement of encoding efficiency.

Note that the way of assigning code numbers in a case of determination being made as a still region may be other than the Expressions (24) through (27). That is to say, in a case of determination being made that a still region, it is sufficient to assign code numbers to the temporal prediction motion vector information (temporal predictor) that are smaller than a case of determination being made that a moving region configured of an image of a moving object, at the least. For example, the motion vector encoding unit 722 may assign $PMV_1$ or $PMV_2$ to $MV_{PUcol}$.

Also, an arrangement may be made wherein the motion vector encoding unit 722 can change the code number to be assigned, in accordance with the precision (accuracy) of the still region determination. For example, an arrangement may be made wherein the still region determination is a soft decision, and the higher the accuracy, the smaller a code number the motion vector encoding unit 722 assigns.

Further, description has been made above regarding an example of $PU_a$, $PU_b$, $PU_c$, and $PU_{col}$ as peripheral regions to assign code numbers to, but an arrangement may be made where other optional regions are peripheral regions, and code number assignment is performed as to the motion vector information of those peripheral regions as well. That is to say, not only is the position of peripheral regions to which code number assignment is to be performed optional, but also the number thereof (i.e., the number of code numbers to be assigned) is optional.

Also, description has been made above that the way of assigning smaller code numbers to spatial prediction motion vector information (spatial predictor) is an initial state, and in the event that the still region determining unit 721 determines that the current region is a still region, the way of assigning is changed so as to assign smaller code numbers to temporal prediction motion vector information (temporal predictor), however, unrestricted to this, an arrangement may be made wherein the way of assigning smaller code numbers to temporal prediction motion vector information (temporal predictor) is an initial state, and in the event that the still region determining unit 721 determines that the current region is a still region, the way of assigning is changed so as to assign smaller code numbers to spatial prediction motion vector information (spatial predictor).

Also, description has been made above that in the event that the still region determining unit 721 determines that the current region is a still region, motion vector encoding unit 722 assigns smaller code numbers to temporal prediction motion vector information (temporal predictor), but an arrangement may be made where further, the temporal prediction motion vector information (temporal predictor) is forcibly selected as prediction motion vector information (only temporal prediction motion vector information ($MV_{PUcol}$) is generated as candidate prediction motion vector information).

Accordingly, the motion vector encoding unit 722 can select the temporal prediction motion vector information (temporal predictor) as the prediction motion vector information of the still region in a more sure manner. Accordingly, the motion vector encoding unit 722 can suppress motion vectors in the moving region from propagating to the still region in a more sure manner. However, in the event that there is the possibility of erroneous termination occurring in the still region determination, prediction motion vector information is preferably selected in the conventional manner using cost function values and the like.

Also, description has been made above with $PU_a$, $PU_b$, and $PU_c$ as spatial peripheral regions of $PU_{curr}$, and $PU_{col}$ as a temporal peripheral region of $PU_{curr}$, but spatial peripheral regions and temporal peripheral regions are not restricted to this, and may be any region as long as motion information has already been generated at the point in time of taking the current region as an object of processing.

[Motion Prediction/Compensation Unit, Still Region Determining Unit, and Motion Vector Encoding Unit]

Figure 34:
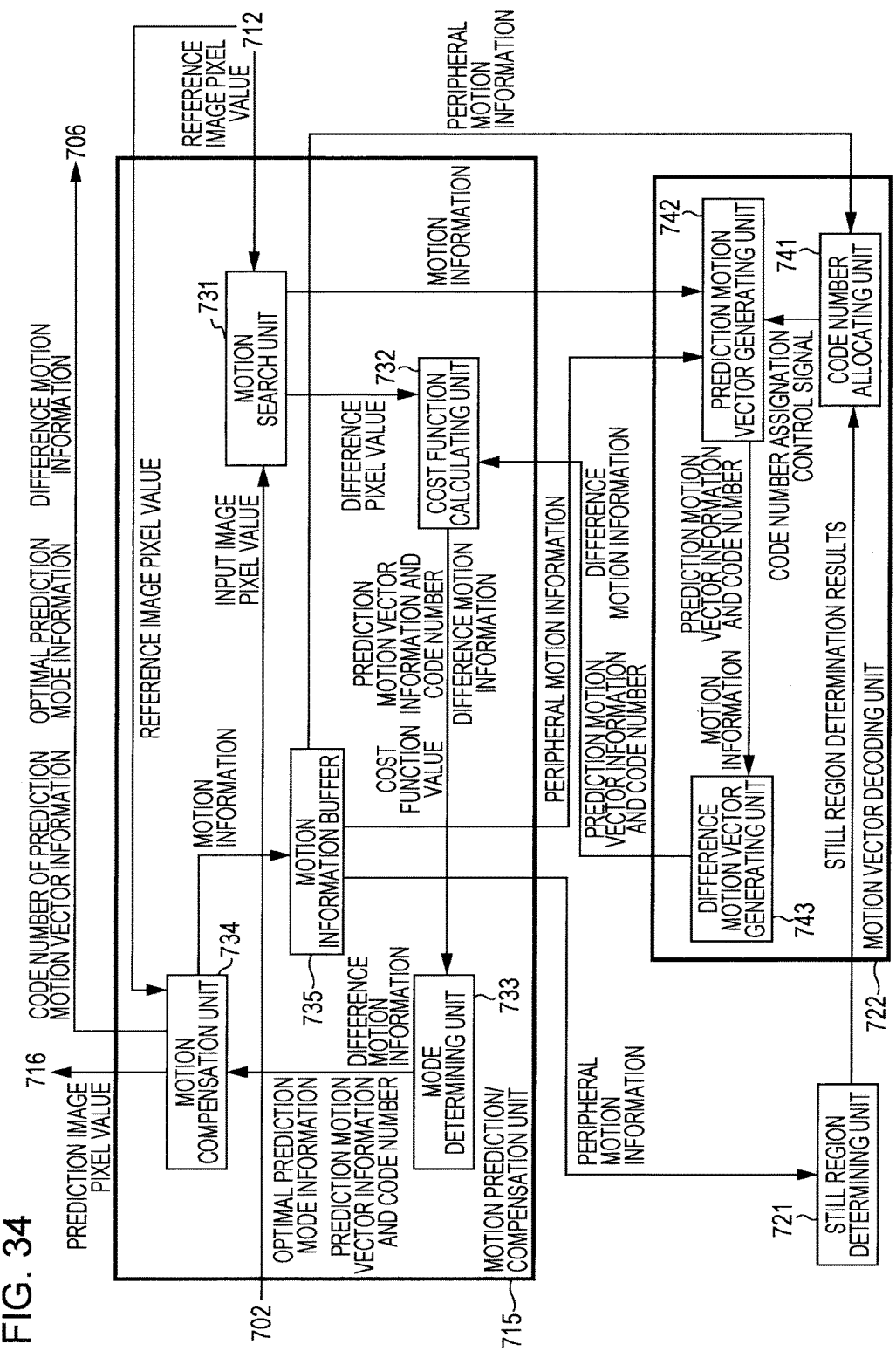
FIG. 34 is a block diagram illustrating a principal configuration example of a motion prediction/compensation unit and motion vector encoding unit.

FIG. 34 is a block diagram illustrating a primary configuration example of the motion prediction/compensation unit 715, still region determining unit 721, and motion vector encoding unit 722.

As shown in FIG. 34, the motion prediction/compensation unit 715 has a motion search unit 731, a cost function calculating unit 732, a mode determining unit 733, a motion compensating unit 734, and a motion information buffer 735.

Also, the motion vector encoding unit 722 has a code number assigning unit 741, a prediction motion vector generating unit 742, and a difference motion vector generating unit 743.

The motion search unit 731 receives input of input image pixel values from the screen rearranging buffer 702 and reference image pixel values from the frame memory 712.

The motion search unit 731 performs motion search processing on all inter prediction modes, and generates motion information including a motion vector and reference index. The motion search unit 731 supplies the motion information to the prediction motion vector generating unit 742 of the motion vector encoding unit 722.

Also, the still region determining unit 721 obtains peripheral information which is motion information of peripheral regions stored in the motion information buffer 735 of the motion prediction/compensation unit 715, and determines whether or not the region to be processed (current region) is a still region or not, from the peripheral motion information.

For example, with regard to a temporal peripheral region $PU_{col}$, in a case where Expression (17) and Expression (18) hold, and also Expression (19) holds, a case where Ref_PicR_reordering is applied, or a case where the reference index $Ref_{col}$ has a POC value, the still region determining unit 721 determines that the current region $PU_{curr}$ is a still region. The still region determining unit 721 supplies such still region determination results to the code number assigning unit 741 of the motion vector encoding unit 722.

The code number assigning unit 741 of the motion vector encoding unit 722 obtains peripheral motion information from the motion information buffer 735 of the motion prediction/compensation unit 715, and also obtains still region determination results from the still region determining unit 721. The code number assigning unit 741 determines the way to assign code numbers to each adjacent motion information, and supplies this way to assign to the prediction motion vector generating unit 742 which controls code number assignation control signals.

Upon obtaining motion information of each inter prediction mode for the current PU from the motion search unit 731, the prediction motion vector generating unit 742 obtains peripheral motion information corresponding to each motion information from the motion information buffer 735. The prediction motion vector generating unit 742 uses this peripheral motion information to generate multiple candidate prediction motion vector information as described in NPL 2. Note however, than unlike the method described in NPL 2, code numbers set by the code number assigning unit 741 are assigned to each prediction motion vector information.

That is to say, the prediction motion vector generating unit 742 generates spatial prediction motion vector information (Spatial Predictor) according to the above-described Expression (5) as to the current PU. Also, the prediction motion vector generating unit 742 generates temporal prediction motion vector information (Temporal Predictor) according to the above-described Expression (9) as to the current PU. Further, the prediction motion vector generating unit 742 generates spatio-temporal prediction motion vector information (Spatio-Temporal Predictor) according to the above-described Expression (10) as to the current PU. The prediction motion vector generating unit 742 assigns the code numbers set by the code number assigning unit 741 to each of the obtained prediction motion vector information.

The prediction motion vector generating unit 742 then supplies the motion information obtained from the motion search unit 731, each generated candidate prediction motion vector information, and code numbers respectively assigned to each, to the difference motion vector generating unit 743.

The difference motion vector generating unit 743 selects an optimal one from the prediction motion vector information supplied thereto, for each inter prediction mode, and generates difference motion vector information including the difference value between the motion information and the prediction motion vector information thereof. The difference motion vector generating unit 743 supplies the generated difference motion vector information in each inter prediction mode, the prediction motion vector information of the selected inter prediction mode, and the code number thereof, to the cost function calculating unit 732 or the motion prediction/compensation unit 715.

Also, the motion search unit 731 uses the searched motion vector information to perform compensation processing on the reference image, and thus generates a prediction image. Further, the motion search unit 731 calculates the difference between the prediction image and the input image (difference pixel values), and supplies the difference pixel values to the cost function calculating unit 732.

The cost function calculating unit 732 uses the difference pixel values of each inter prediction mode, supplied from the motion search unit 731, and calculates the cost function values in each inter prediction mode. The cost function calculating unit 732 supplies the cost function value in each inter prediction mode that have been calculated, the difference motion information in each inter prediction mode, the prediction motion vector information in each inter prediction mode, and the code numbers thereof, to the mode determining unit 733.

The mode determining unit 733 determines which of the inter prediction modes to use, using the cost function values as to the inter prediction modes, and takes the inter prediction mode with the smallest cost function value as being an optimal prediction mode. The mode determining unit 733 supplies the optimal mode information which is information relating to the optimal prediction mode thereof, and the difference motion information, prediction vector information, and code number, of the inter prediction mode selected to be the optimal prediction mode, to the motion compensating unit 734.

The motion compensating unit 734 obtains a motion vector from the supplied optimal prediction mode's difference emotion information and prediction motion vector information, and performs compensation of the reference image from the frame memory 712 using the obtained motion vector, thereby generating a prediction image for the optimal prediction mode.

In the event that inter prediction has been selected by the prediction image selecting unit 716, a signal indicating this is supplied from the prediction image selecting unit 716. In response to this, the motion compensating unit 734 supplies the optimal prediction information, and the difference motion vector information of that mode, and also the code number of the prediction motion vector information of that mode, to the lossless encoding unit 706.

Also, the motion compensating unit 734 stores in the motion information buffer 735 information obtained from the difference motion vector information of the mode selected to be the optimal prediction mode and the prediction motion vector information, i.e., the motion information of the optimal prediction mode. Note that in the event that inter prediction is not selected by the prediction image selecting unit 716 (i.e., in the event that an intra prediction image is selected), a 0 vector is stored in the motion information buffer 735 as motion vector information.

The motion information buffer 735 stores motion information of the optimal prediction mode of regions processed in the past. The stored motion information is supplied to the still region determining unit 721, code number assigning unit 741, and prediction motion vector generating unit 742, as peripheral motion information, in processing as to regions processed later in time than that region.

As described above, the still region determining unit 721 performs determination regarding whether or not a still region, for every prediction processing unit. The motion vector encoding unit 722 then controls assigning of code numbers based on the still region determination results, and in the event of a still region, assigns the smallest code number to temporal prediction motion vector information (temporal predictor). The motion prediction/compensation unit 715 then encodes the difference motion information and code number of prediction motion vector information generated by the motion vector encoding unit 722. Accordingly, the image encoding device 700 can improve prediction precision of prediction motion vector information, and can improve encoding efficiency.

[Flow of Processing]

Next, the flow processing executed at the image encoding device 700 will be described. The encoding processing and intra prediction processing are executed basically in the same way as with the flowcharts described with reference to FIG. 16 and FIG. 17. That is to say, the same processing as with the case of the image encoding device 51 executing is performed. Accordingly, description of these will be omitted.

Figure 35:
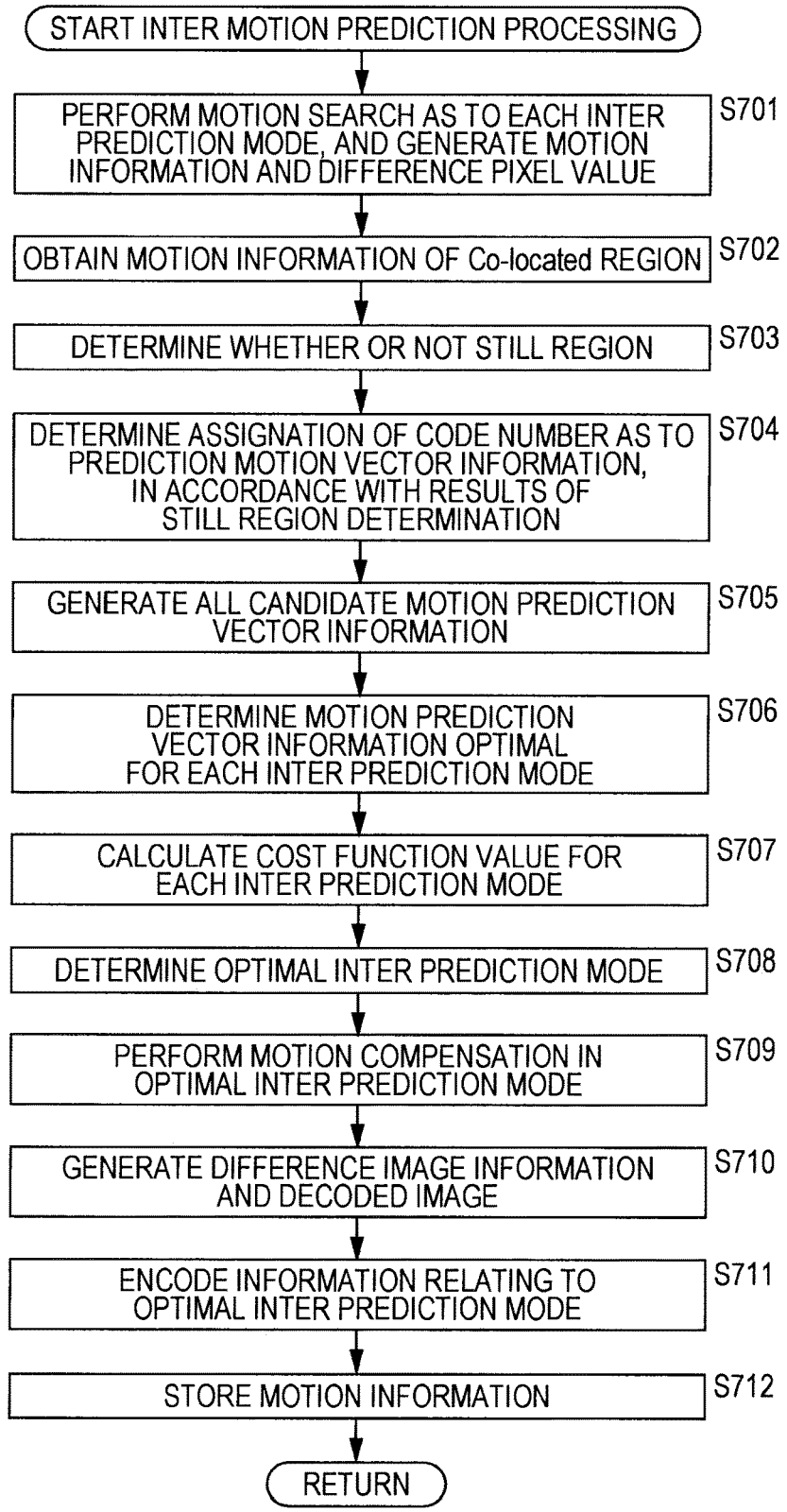
FIG. 35 is a flowchart for describing an example of the flow of inter motion prediction processing.

Next, an example of inter motion prediction processing executed in step S22 of FIG. 16 will be described with reference to the flowchart in FIG. 35.

Upon inter motion prediction processing starting in step S701, in this case, the motion search unit 731 performs motion searching as to each inter prediction mode, and generates motion information and difference pixel values.

In step S702, the still region determining unit 721 obtains motion information of the Co-Located region which is a temporal peripheral region. In step S703, the still region determining unit 721 determines whether or not the current region is a still region, based on the motion information of the Co-Located region.

In step S704, the code number assigning unit 741 determines code number assignation to the prediction motion vector information in accordance with the still region determination results.

In step S705, the prediction motion vector generating unit 742 generates all candidate prediction motion vector information.

In step S706, the difference motion vector generating unit 743 determines the optimal prediction motion vector information as to each inter prediction mode. Also, the difference motion vector generating unit 743 generates difference motion information including a difference motion vector, which is the difference between the prediction motion vector information and motion vector of motion information.

In step S707, the cost function calculating unit 732 calculates a cost function value for each inter prediction mode.

In step S708, the mode determining unit 733 determines the optimal inter prediction mode (also called optimal prediction mode) which is the optimal inter prediction mode, using the cost function values calculated in step S707.

In step S709, the motion compensating unit 734 performs motion compensation in the optimal inter prediction mode. In step S710, the motion compensating unit 734 supplies the prediction image obtained by motion compensation in step S709 to the computing unit 703 and computing unit 710 via the prediction image selecting unit 716, and generates difference image information and a decoded image. Also, in step S711, the motion compensating unit 734 supplies information relating to the optimal inter prediction mode, such as the optimal prediction mode information, difference motion information, and code number of the prediction motion vector information, and so forth, to the lossless encoding unit 706, so as to be encoded.

In step S712, the motion information buffer 735 stores the motion information selected in the optimal inter prediction mode. Upon storing the motion information, the motion information buffer 735 ends the inter motion prediction processing.

By performing processing as described above, the image encoding device 700 can improve prediction precision of prediction motion vector information, and can improve encoding efficiency.

[Image Decoding Device]

Figure 36:
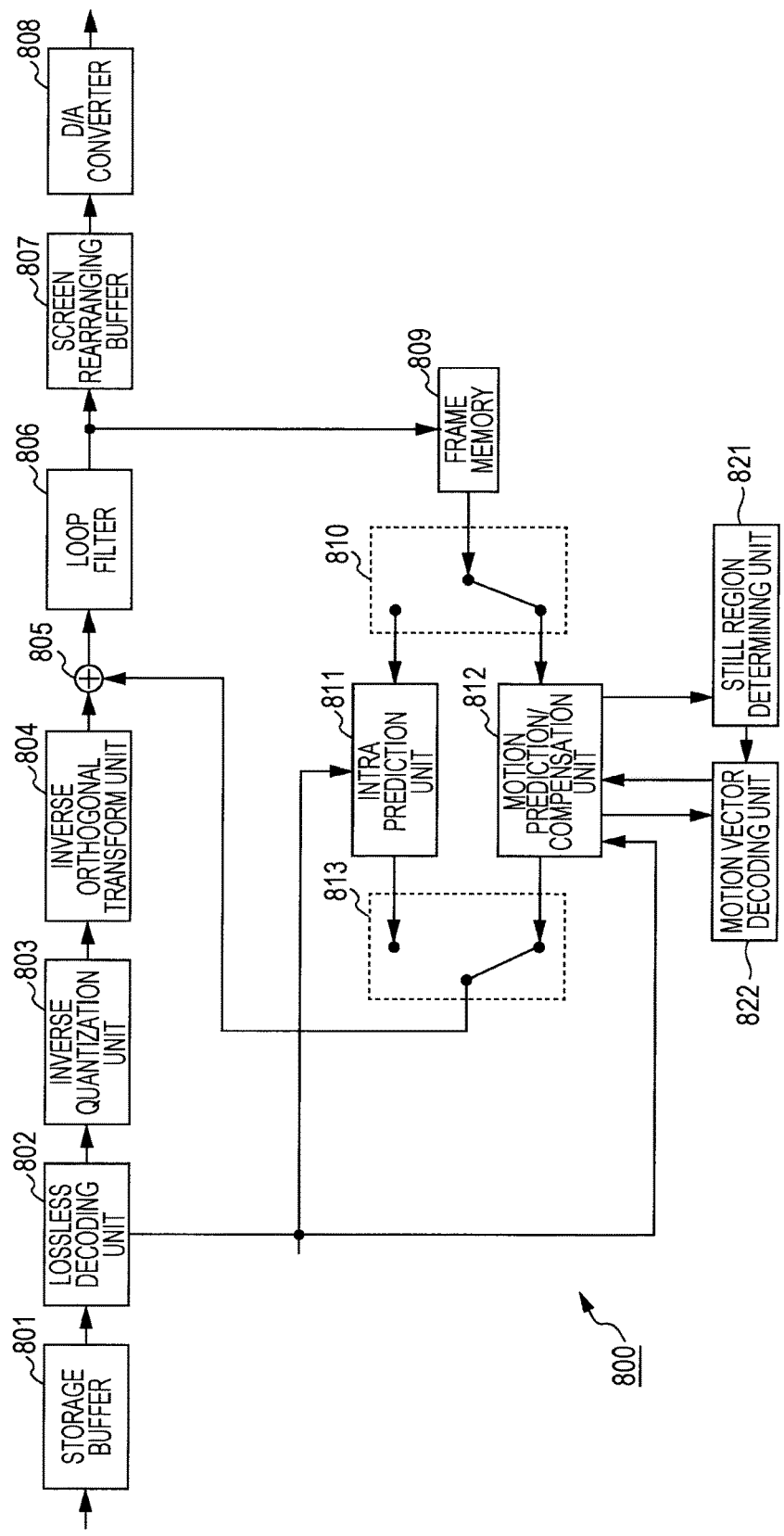
FIG. 36 is a block diagram illustrating another configuration example of an image decoding device.

FIG. 36 is a block diagram illustrating a primary configuration example of an image decoding device corresponding to the image encoding device 700 in FIG. 32.

The image decoding device 800 shown in FIG. 36 is of basically of the same configuration as the image decoding device 101 in FIG. 20. The image decoding device 800 decodes encoded data generated by the image encoding device 700, with a decoding method corresponding to the encoding method thereof. Also, we will say that the image decoding device 800 performs inter prediction every prediction unit (PU), in the same way as with the image encoding device 700.

As shown in FIG. 36, the image decoding device 800 includes a storage buffer 801, a lossless decoding unit 802, an inverse quantization unit 803, an inverse orthogonal transform unit 804, a computing unit 805, a loop filter 806, a screen rearranging buffer 807, and a D/A conversion unit 808. Also, the image decoding device 800 includes frame memory 809, a selecting unit 810, an intra prediction unit 811, a motion prediction/compensation unit 812, and a selecting unit 813.

Further, the image decoding device 800 includes a still region determining unit 821 and a motion vector decoding unit 822.

The storage buffer 801 stores encoded data transmitted thereto, and supplies the encoded data to the lossless decoding unit 802 at a predetermined timing. The lossless decoding unit 802 decodes the information that has been encoded by the lossless encoding unit 706 in FIG. 32, supplied by the storage buffer 801, by a format corresponding to the encoding format of the lossless encoding unit 706. The lossless decoding unit 802 supplies the quantized coefficient data of the difference image obtained by decoding to the inverse quantization unit 803. Also, the lossless decoding unit 802 determines whether an intra prediction mode has been selected or inter prediction mode has been selected for the optimal prediction mode, and supplies the information relating to that optimal mode to the one of the intra prediction unit 811 and motion prediction/compensation unit 812 of the mode that has been determined to have been selected.

That is to say, for example, in the event that inter prediction mode has been selected as the optimal prediction mode at the image encoding unit 700, information relating to that optimal prediction mode is supplied to the motion prediction/compensation unit 812.

The inverse quantization unit 803 performs inverse quantization of the quantized coefficient data obtained by being decoded by the lossless decoding unit 802 with a format corresponding to the quantization format of the quantization unit 705 in FIG. 32, and supplies the obtained coefficient data to the inverse orthogonal transform unit 804.

The inverse orthogonal transform unit 804 performs inverse orthogonal transform of the coefficient data supplied form the inverse quantization unit 803 with a format corresponding to the orthogonal transform format of the orthogonal transform unit 704 in FIG. 32. The inverse orthogonal transform unit 804 obtains decoded residual data corresponding to the residual data before being subjected to orthogonal transform at the image encoding unit 700, by this inverse orthogonal transform processing.

The residual data obtained by being subjected to orthogonal transform is supplied to the computing unit 805. Also, prediction image is supplied from the intra prediction unit 811 or motion prediction/compensation unit 812 to the computing unit 805, via the selecting unit 813.

The computing unit 805 adds the decoded residual data and prediction image, so as to obtain decoded image data corresponding to the image data before the prediction image was subtracted by the computing unit 703 of the image encoding device 700. The computing unit 805 supplies the decoded image data to the loop filter 806.

The loop filter 806 subjects the supplied decoded image to deblocking filter processing and loop filter processing including adaptive loop filter processing and the like as appropriate and supplies these to the screen rearranging buffer 807.

The loop filter 806 includes a deblocking filter and adaptive loop filter and the like, and performs filtering processing as appropriate on the decoded image supplied from the computing unit 705. For example, the loop filter 806 removes block noise of the decoded image by performing deblocking filter processing on the decoded image. Also, for example, the loop filter 806 performs image quality improvement on the deblocking filter processing results (decoded image subjected to block noise removal) by performing loop filter processing using a wiener filter (Wiener Filter).

Note that an arrangement may be made where the loop filter 806 performs optional filter processing on the decoded image. Also, an arrangement may be made where the loop filter 806 uses filter coefficients supplied from the image encoding device 700 in FIG. 32 to perform filter processing.

The loop filter 806 supplies the filter processing results (decoded image after filter processing) to the screen rearranging buffer 807 and frame memory 809. Note that the decoded image output from the computing unit 805 may be supplied to the screen rearranging buffer 807 and frame memory 809 without going through the loop filter 806. That is to say, the filter processing by the loop filter 806 can be omitted.

The screen rearranging buffer 807 rearranges images. That is to say, the sequence of frames rearranged for the encoding sequence by the screen rearranging buffer 702 in FIG. 32 is rearranged in the original display sequence. The D/A conversion unit 808 performs D/A conversion of the image supplied from the screen rearranging buffer 807, and outputs to an unshown display for display.

The frame memory 809 stores the decoded image supplied thereto, and supplies the stored decoded image to the selecting unit 810 as a reference image, either at a predetermined timing or based on an external request from the intra prediction unit 811 or motion prediction/compensation unit 812 or the like.

The selecting unit 810 selects the supply destination of the reference image supplied from the frame memory 809. In the event of decoding an image subjected to intra encoding, the selecting unit 810 supplies the reference image supplied from the frame memory 809 to the intra prediction unit 811. Also, in the event of decoding an image subjected to inter encoding, the selecting unit 810 supplies the reference image supplied from the frame memory 809 to the motion prediction/compensation unit 812.

The intra prediction unit 811 is supplied with information indicating the intra prediction mode, obtained by decoding the header information, and so forth, from the lossless decoding unit 802. The intra prediction unit 811 performs intra prediction using the reference image obtained from the frame memory 809 in the intra prediction mode used at the intra prediction unit 714 in FIG. 32, thereby generating a prediction image. The intra prediction unit 811 supplies the generated prediction image to the selecting unit 813.

The motion prediction/compensation unit 812 obtains information obtained by decoding the header information (optimal prediction mode information, difference information, and code number of prediction motion vector information and so forth) from the lossless decoding unit 802.

The motion prediction/compensation unit 812 performs inter prediction using the reference image obtained from the frame memory 809, in the same inter prediction mode used by the motion prediction/compensation unit 715 in FIG. 32, thus generating a prediction image. That is to say, the motion prediction/compensation unit 812 can perform this inter prediction in an optional mode other than the modes stipulated by the AVC encoding format, in the same way as with the motion prediction/compensation unit 715 in FIG. 32.

The still region determining unit 821 performs basically the same processing as with the still region determining unit 721, and determines whether or not the current region is a still region. That is to say, in a case where Expression (17) and Expression (18) hold, and also Expression (19) holds, a case where Ref_PicR_reordering is applied, or a case where the reference index $Ref_{col}$ has a POC value, from the motion information of the Co-Located region of the current region, the still region determining unit 821 determines that the current region $PU_{curr}$ is a still region.

The still region determining unit 821 performs such still region determination in prediction processing units, and supplies the still region determination results to the motion vector decoding unit 822.

The motion vector decoding unit 822 controls the way in which code numbers are assigned to prediction motion vector information following the still region determination results supplied from the still region determining unit 821, analyzes the code numbers of the prediction motion vector information supplied from the motion prediction/compensation unit 812 under this control, and reconstructs the prediction motion vector information.

That is to say, by controlling the way of assigning code numbers following the still region determination results determined by the still region determining unit 821 with the same method as with the still region determining unit 721 in FIG. 32, the motion vector decoding unit 822 can correctly replicate the way of assigning code numbers by the motion vector encoding unit 722 in FIG. 32. Thus, by correctly replicating the way of assigning code numbers by the motion vector encoding unit 722, the motion vector decoding unit 822 can correctly analyze the code numbers of the prediction motion vector information supplied from the image encoding device 700, and correctly reconstruct the prediction motion vector information.

The motion vector decoding unit 822 supplies the reconstructed prediction motion vector information to the motion prediction/compensation unit 812. The motion prediction/compensation unit 812 uses this prediction motion vector information to reconstruct the motion vector information, uses this motion vector information to perform motion compensation, and thus generates a prediction image. The motion prediction/compensation unit 812 supplies the generated prediction image to the selecting unit 813.

The selecting unit 813 selects the supply source of the prediction image for supply to the computing unit 805. That is to say, the selecting unit 813 supplies the prediction image generated by the motion prediction/compensation unit 812 or the intra prediction unit 811 to the computing unit 805.

Thus, by controlling the code numbers to be assigned to the prediction motion vector information based on the determination results of the still region determination in prediction processing units by the still region determining unit 821, the motion vector decoding unit 822 can correctly replicate the way of assigning code numbers at the image encoding device 700. Accordingly, the motion vector decoding unit 822 can correctly analyze the code numbers of the prediction motion vector information supplied from the image encoding device 700, and correctly reconstruct the prediction motion vector information.

Accordingly, the image decoding device 800 can correctly decode the encoded data which the image encoding device 700 has encoded, and realize improvement in encoding efficiency.

[Motion Prediction/Compensation Unit, Still Region Determining Unit, and Motion Vector Decoding Unit]

Figure 37:
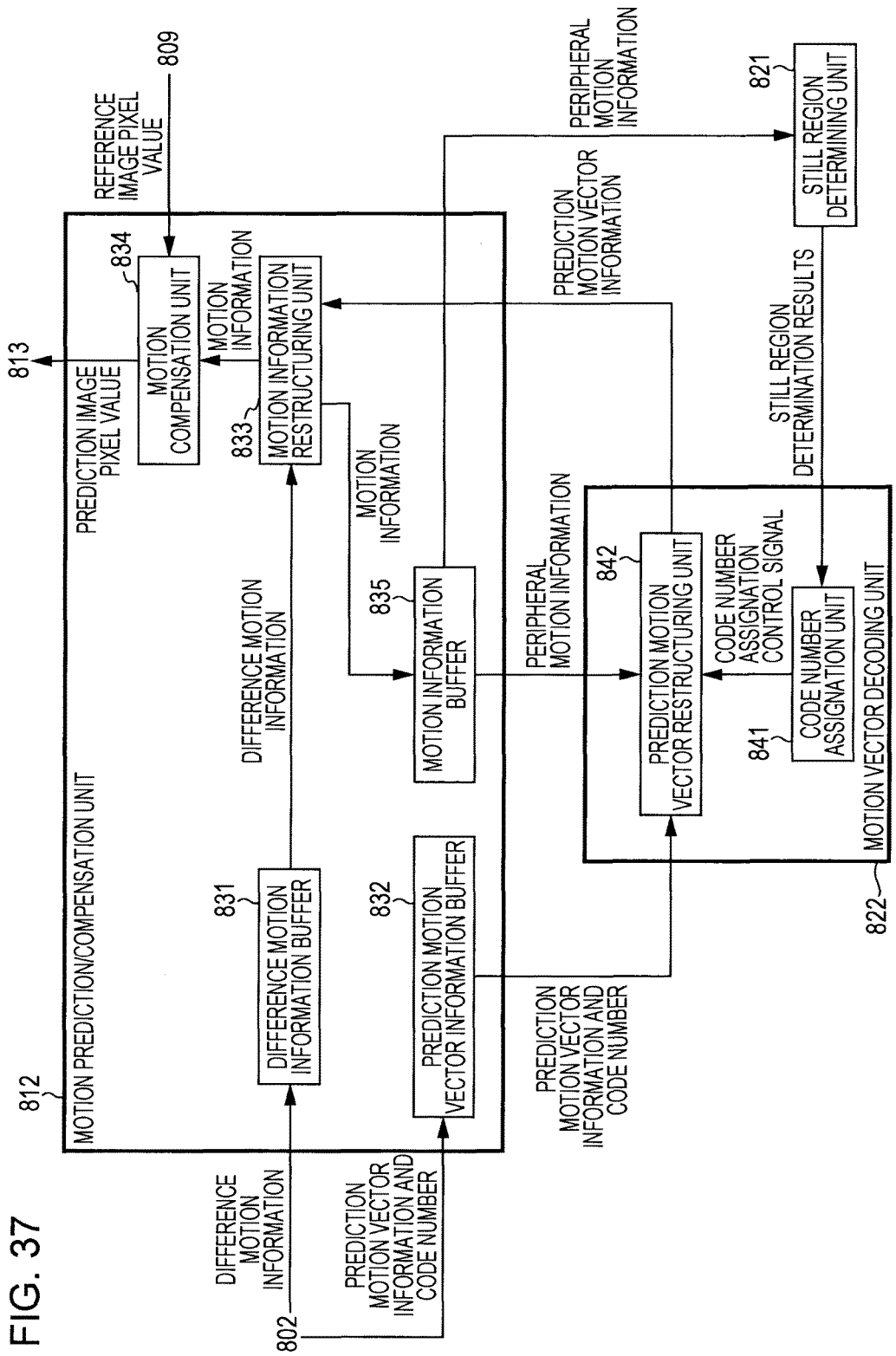
FIG. 37 is a block diagram illustrating a principal configuration example of a motion prediction/compensation unit and motion vector decoding unit.

FIG. 37 is a block diagram illustrating a primary configuration example of the motion prediction/compensation unit 812, still region determining unit 821, and motion vector decoding unit 822.

As shown in FIG. 37, the motion prediction/compensation unit 812 has a difference motion information buffer 831, a prediction motion vector information buffer 832, a motion information reconstructing unit 833, a motion compensation unit 834, and a motion information buffer 835.

Also, the motion vector decoding unit 822 has a code number assigning unit 841 and a prediction motion vector reconstructing unit 842.

The difference motion information buffer 831 stores the difference motion information supplied from the lossless decoding unit 802. This difference motion information is difference motion information of the inter prediction mode selected as the optimal prediction mode, supplied from the image encoding device 700. The difference motion information buffer 831 supplies the stored difference motion information to the motion information reconstructing unit 833, either at a predetermined timing or based on an external request from the motion information reconstructing unit 833.

The prediction motion vector information buffer 832 stores the prediction motion vector information supplied from the lossless decoding unit 802. The code number of this prediction motion vector information has been supplied from the image encoding unit 700, and is a code number assigned to the prediction motion vector information of the inter prediction mode selected as being the optimal prediction mode. The prediction motion vector information buffer 832 supplies the stored a code number of the prediction motion vector information to the prediction motion vector reconstructing unit 842 of the motion vector decoding unit 822, either at a predetermined timing or based on an external request from the prediction motion vector reconstructing unit 842.

Also, the still region determining unit 821 obtains motion information of the Co-Located region from the motion information buffer 835, for each region in prediction processing units, and performs still region determination. The still region determining unit 821 supplies the determination results (still region determination results) to the code number assigning unit 841 of the motion vector decoding unit 822.

The code number assigning unit 841 of the motion vector decoding unit 822 follows the still region determination results supplied from the still region determining unit 821 to control the way of code number assignation, each region in prediction processing units, and supplies code number assignation control signals to the prediction motion vector reconstructing unit 842.

The prediction motion vector reconstructing unit 842 analyzes the code number of the prediction motion vector information obtained from the prediction motion vector information buffer 832, using the way of assigning code numbers, specified for each region in prediction processing units, from the code number assigning unit 841. The prediction motion vector reconstructing unit 842 identifies prediction motion vector information corresponding to the analyzed code number, and reconstructs that prediction motion vector information. That is to say, the prediction motion vector reconstructing unit 842 obtains peripheral motion information of a peripheral region corresponding to the code number from the motion information buffer 835, and takes the peripheral motion information as being prediction motion vector information.

The prediction motion vector reconstructing unit 842 supplies the reconstructed prediction motion vector information to the motion information reconstructing unit 833 of the motion prediction/compensation unit 812.

The motion information reconstructing unit 833 of the motion prediction/compensation unit 812 adds the prediction motion vector information obtained from the prediction motion vector reconstructing unit 842 to the difference motion information obtained from the difference motion information buffer 831, and reconstructs the motion information of the current region (current PU). The motion information reconstructing unit 833 supplies the motion information of the reconstructed current region to the motion compensation unit 834.

The motion compensation unit 834 performs motion compensation on reference image pixel values obtained from the frame memory 809, using the motion information of the current region, and generates a prediction image. The motion compensation unit 834 supplies the reference image pixel values to the computing unit 805 via the selecting unit 813.

Also, the motion information reconstructing unit 833 supplies the motion information of the current region that has been reconstructed to the motion information buffer 835 as well.

The motion information buffer 835 stores the motion information of the current region supplied from the motion information reconstructing unit 833. The motion information buffer 835 supplies that motion information to the still region determining unit 821 and prediction motion vector reconstructing unit 842 as peripheral motion information, in processing as to other regions processed later in time from the current region.

By each part performing processing as described above, the image decoding device 800 can correctly decode encoded data encoded by the image encoding device 700, and improved encoding efficiency can be achieved.

[Flow of Processing]

Next, the flow of processing executed by this image decoding device 800 will be described. The image decoding device 800 performs decoding processing to decode encoded data in the same way as with that described with reference to the flowchart in FIG. 22. That is to say, the image decoding device 800 performs decoding processing basically in the same way as with the case of the image decoding device 101. Note however, the prediction processing in step S138 in FIG. 22 is executed as follows.

An example of the flow of prediction processing executed in step S138 in FIG. 22 with the case of the image decoding device 800 will be described with reference to the flowchart in FIG. 38.

Upon prediction processing being started, in step S801 the lossless decoding unit 802 determines whether or not the encoded data to be processed has been intra encoded, based on information relating to the optimal prediction mode supplied form the image encoding device 700. In the event that determination is made that this has been intra encoded, the lossless decoding unit 802 advances the processing to step S802.

In step S802, the intra prediction unit 811 obtains the intra prediction mode information. In step S803, the intra prediction unit 811 performs intra prediction using the intra prediction mode information obtained in step S8002 to generate a prediction image. Upon generating the prediction image, the intra prediction unit 811 ends the prediction processing, and returns the processing to FIG. 22.

Also, in the event that determination is made in step S801 that inter encoding has been performed, the lossless decoding unit 802 advances the processing to step S804.

In step S804, the motion prediction/compensation unit 812 performs inter motion prediction processing. Upon the inter motion prediction processing ending, the motion prediction/compensation unit 812 ends the prediction processing, and returns the processing to FIG. 22.

Next, an example of the flow of inter motion prediction processing executed in step S804 in FIG. 38 will be described with reference to the flowchart in FIG. 39.

Upon inter motion prediction processing being started, in step S821, the motion prediction/compensation unit 812 obtains information relating to the motion prediction as to the current region. For example, the prediction motion vector information buffer 832 obtains the code number of prediction motion vector information, and the difference motion information buffer 831 obtains difference motion information.

In step S822, the still region determining unit 821 obtains motion information of a Co-Located region from the motion information buffer 835. In step S823, the still region determining unit 821 determines whether or not the current region is a still region, based on that information, as described above.

In step S824, the code number assigning unit 841 decides a code number as to the prediction motion vector information in accordance with the still region determination results in step S823. In step S825, the prediction motion vector reconstructing unit 842 analyzes the code number of the prediction motion vector information following the assignment decided in step S824, and reconstructs the prediction motion vector information.

In step S826, the motion information reconstructing unit 833 reconstructs the motion information of the current region, using the prediction motion vector information reconstructed in step S825, and the difference motion information obtained in step S821.

In step S827, the motion compensation unit 834 performs motion compensation on the reference image obtained by the frame memory 809, with the motion information reconstructed in step S826.

In step S828, the motion compensation unit 834 supplies the prediction image generated by the processing in step S827 to the computing unit 805 via the selecting unit 813, so as to generate a prediction image. In step S829, the motion information buffer 835 stores the motion information reconstructed in step S826. This motion information is used as peripheral information in processing as to other regions performed later in time.

Figure 38:
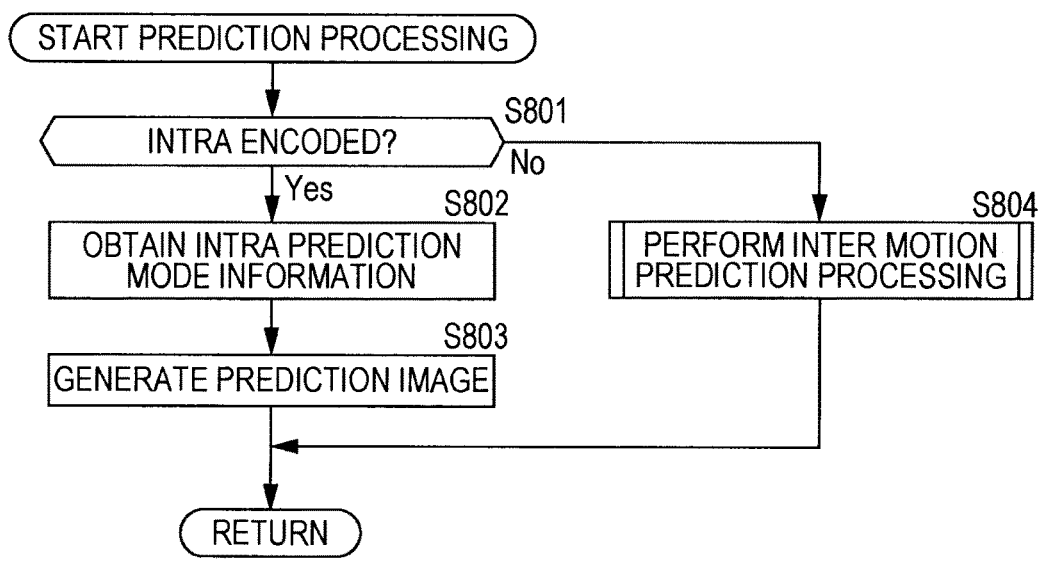
FIG. 38 is a flowchart for describing an example of the flow of prediction processing.
Figure 39:
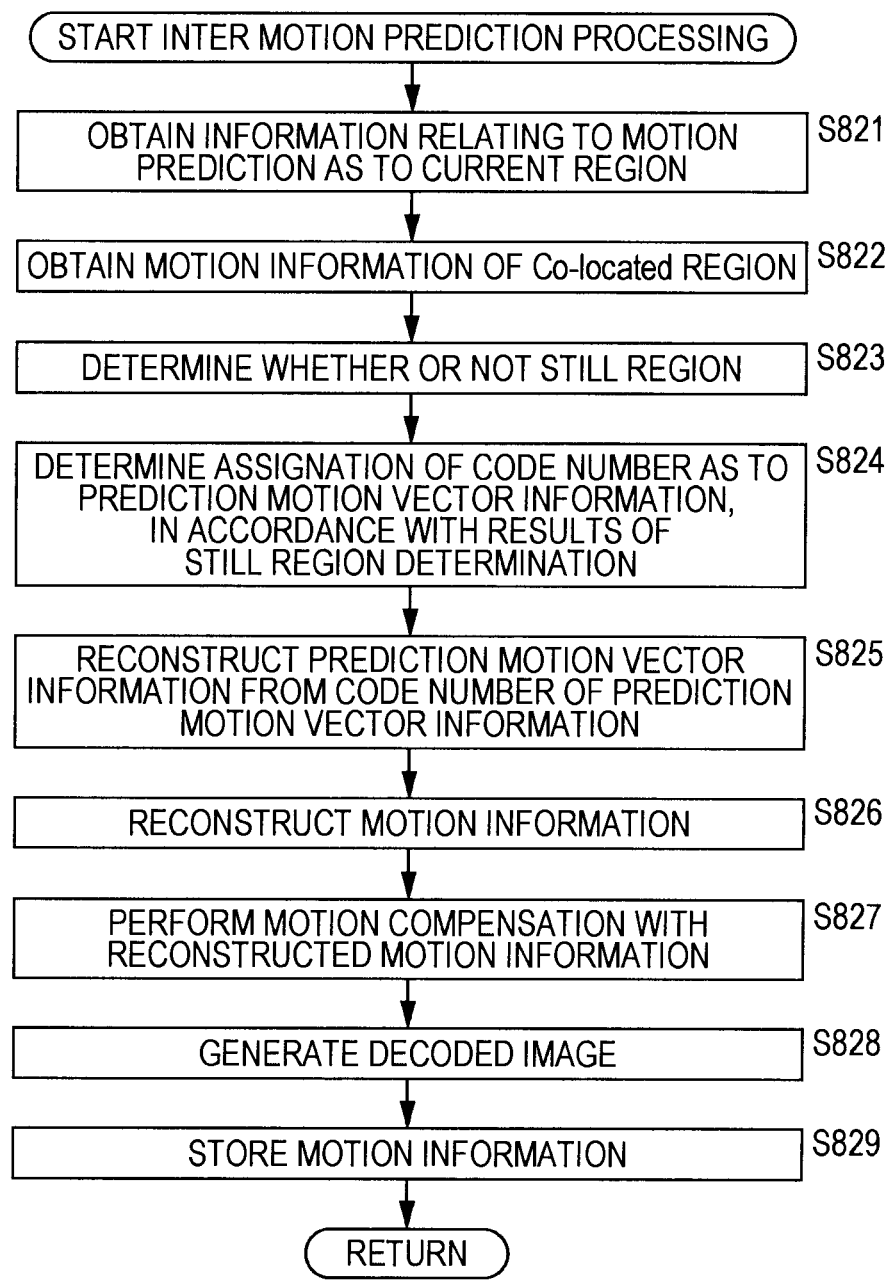
FIG. 39 is a flowchart for describing an example of the flow of inter motion prediction processing.

Upon the motion information being stored, the motion information buffer 835 ends the inter motion prediction processing, and returns the processing to FIG. 38.

By performing each processing as described above, the image decoding device 800 can correctly decode the encoded data encoded by the image encoding device 700, and can realize improved encoding efficiency.

Note that the present technology can be applied to image encoding devices and image decoding devices used for receiving image information (bit stream) compressed by orthogonal transform such as discrete cosine transform or the like, and motion compensation, as with MPEG, H.26x, or the like, via network media such as satellite broadcasting, cable television, the Internet, cellular phones, or the like. Also, the present technology can be applied to image encoding devices and image decoding devices used for processing on storage media such as optical discs, magnetic disks, flash memory, and so forth. Further, the present technology can be applied to motion prediction/compensation devices included in these image encoding devices and image decoding devices and so forth.

The above-described series of processing may be executed by hardware, or may be executed by software. In the event of executing the series of processing by software, a program making up the software thereof is installed in a computer. Here, examples of the computer include a computer built into dedicated hardware, a general-purpose personal computer whereby various functions can be executed by various types of programs being installed thereto, and so forth.

[Configuration Example of Personal Computer]

Figure 26:
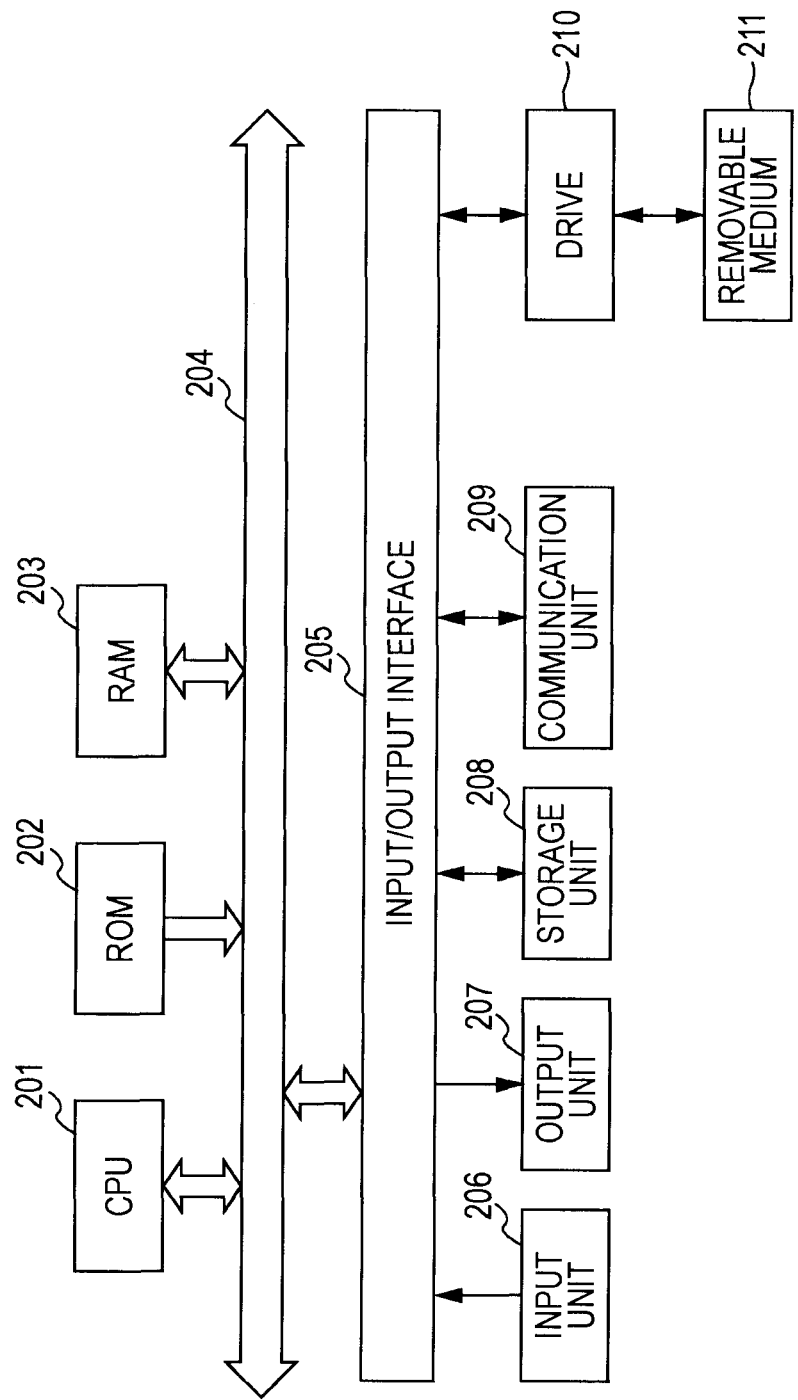
FIG. 26 is a block diagram illustrating a configuration example of the hardware of a computer.

FIG. 26 is a block diagram illustrating a configuration example of the hardware of a computer which executes the above-described series of processing using a program.

With the computer, a CPU (Central Processing Unit) 201, ROM (Read Only Memory) 202, and RAM (Random Access Memory) 203 are mutually connected by a bus 204.

Further, an input/output interface 205 is connected to the bus 204. An input unit 206, an output unit 207, a storage unit 208, a communication unit 209, and a drive 210 are connected to the input/output interface 205.

The input unit 206 is made up of a keyboard, a mouse, a microphone, and so forth. The output unit 207 is made up of a display, a speaker, and so forth. The storage unit 208 is made up of a hard disk, nonvolatile memory, and so forth. The communication unit 209 is made up of a network interface and so forth. The drive 210 drives a removable medium 211 such as a magnetic disk, an optical disc, a magneto-optical disk, semiconductor memory, or the like.

With the computer thus configured, for example, the CPU 201 loads a program stored in the storage unit 208 to the RAM 203 via the input/output interface 205 and bus 204, and executes the program, and accordingly, the above-described series of processing is performed.

The program that the computer (CPU 201) executes may be provided by being recorded in the removable medium 211 serving as a package medium or the like, for example. Also, the program may be provided via a cable or wireless transmission medium such as a local area network, the Internet, or digital broadcasting.

With the computer, the program may be installed in the storage unit 208 via the input/output interface 205 by mounting the removable medium 211 on the drive 210. Also, the program may be received by the communication unit 209 via a cable or wireless transmission medium, and installed in the storage unit 208. Additionally, the program may be installed in the ROM 202 or storage unit 208 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-described embodiment, and various modifications may be made without departing from the essence of the present invention.

For example, the above above-described image encoding devices and image decoding devices may be applied to an optional electric device. Hereafter, examples thereof will be described.

[Configuration Example of Television Receiver]

Figure 27:
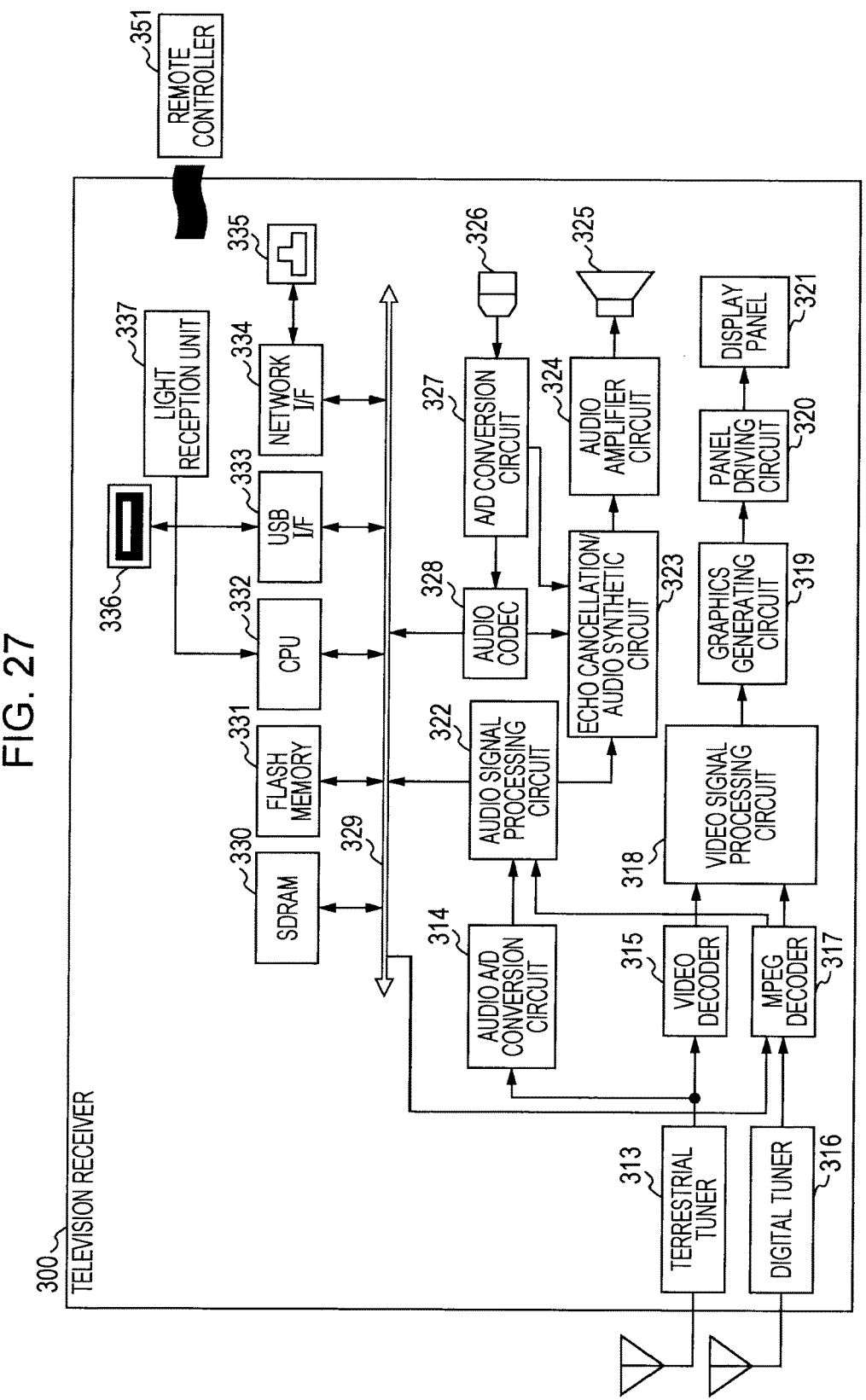
FIG. 27 is a block diagram illustrating a principal configuration example of a television receiver.

FIG. 27 is a block diagram illustrating a principal configuration example of a television receiver using an image decoding device to which the present invention has been applied.

A television receiver 300 shown in FIG. 27 includes a terrestrial tuner 313, a video decoder 315, a video signal processing circuit 318, a graphics generating circuit 319, a panel driving circuit 320, and a display panel 321.

The terrestrial tuner 313 receives the broadcast wave signals of a terrestrial analog broadcast via an antenna, demodulates, obtains video signals, and supplies these to the video decoder 315. The video decoder 315 subjects the video signals supplied from the terrestrial tuner 313 to decoding processing, and supplies the obtained digital component signals to the video signal processing circuit 318.

The video signal processing circuit 318 subjects the video data supplied from the video decoder 315 to predetermined processing such as noise removal or the like, and supplies the obtained video data to the graphics generating circuit 319.

The graphics generating circuit 319 generates the video data of a program to be displayed on a display panel 321, or image data due to processing based on an application to be supplied via a network, or the like, and supplies the generated video data or image data to the panel driving circuit 320. Also, the graphics generating circuit 319 also performs processing such as supplying video data obtained by generating video data (graphics) for the user displaying a screen used for selection of an item or the like, and superimposing this on the video data of a program, to the panel driving circuit 320 as appropriate.

The panel driving circuit 320 drives the display panel 321 based on the data supplied from the graphics generating circuit 319 to display the video of a program, or the above-described various screens on the display panel 321.

The display panel 321 is made up of an LCD (Liquid Crystal Display) and so forth, and displays the video of a program or the like in accordance with the control by the panel driving circuit 320.

Also, the television receiver 300 also includes an audio A/D (Analog/Digital) conversion circuit 314, an audio signal processing circuit 322, an echo cancellation/audio synthesizing circuit 323, an audio amplifier circuit 324, and a speaker 325.

The terrestrial tuner 313 demodulates the received broadcast wave signal, thereby obtaining not only a video signal but also an audio signal. The terrestrial tuner 313 supplies the obtained audio signal to the audio A/D conversion circuit 314.

The audio A/D conversion circuit 314 subjects the audio signal supplied from the terrestrial tuner 313 to A/D conversion processing, and supplies the obtained digital audio signal to the audio signal processing circuit 322.

The audio signal processing circuit 322 subjects the audio data supplied from the audio A/D conversion circuit 314 to predetermined processing such as noise removal or the like, and supplies the obtained audio data to the echo cancellation/audio synthesizing circuit 323.

The echo cancellation/audio synthesizing circuit 323 supplies the audio data supplied from the audio signal processing circuit 322 to the audio amplifier circuit 324.

The audio amplifier circuit 324 subjects the audio data supplied from the echo cancellation/audio synthesizing circuit 323 to D/A conversion processing, subjects to amplifier processing to adjust to predetermined volume, and then outputs the audio from the speaker 325.

Further, the television receiver 300 also includes a digital tuner 316, and an MPEG decoder 317.

The digital tuner 316 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 317.

The MPEG decoder 317 descrambles the scrambling given to the MPEG-TS supplied from the digital tuner 316, and extracts a stream including the data of a program serving as a playing object (viewing object). The MPEG decoder 317 decodes an audio packet making up the extracted stream, supplies the obtained audio data to the audio signal processing circuit 322, and also decodes a video packet making up the stream, and supplies the obtained video data to the video signal processing circuit 318. Also, the MPEG decoder 317 supplies EPG (Electronic Program Guide) data extracted from the MPEG-TS to a CPU 332 via an unshown path.

The television receiver 300 uses the above-described image decoding devices as the MPEG decoder 317 for decoding video packets in this way. Accordingly, the MPEG decoder 317 can achieve higher encoding efficiency, in the same way as with the case of the above-described image decoding devices.

The video data supplied from the MPEG decoder 317 is, in the same way as with the case of the video data supplied from the video decoder 315, subjected to predetermined processing at the video signal processing circuit 318. The video data subjected to predetermined processing is then superimposed on the generated video data and so forth at the graphics generating circuit 319 as appropriate, supplied to the display panel 321 via the panel driving circuit 320, and the image thereof is displayed thereon.

The audio data supplied from the MPEG decoder 317 is, in the same way as with the case of the audio data supplied from the audio A/D conversion circuit 314, subjected to predetermined processing at the audio signal processing circuit 322, supplied to the audio amplifier circuit 324 via the echo cancellation/audio synthesizing circuit 323, and subjected to D/A conversion processing and amplifier processing. As a result thereof, the audio adjusted in predetermined volume is output from the speaker 325.

Also, the television receiver 300 also includes a microphone 326, and an A/D conversion circuit 327.

The A/D conversion circuit 327 receives the user's audio signals collected by the microphone 326 provided to the television receiver 300 serving as for audio conversation, subjects the received audio signal to A/D conversion processing, and supplies the obtained digital audio data to the echo cancellation/audio synthesizing circuit 323.

In the event that the user (user A)'s audio data of the television receiver 300 has been supplied from the A/D conversion circuit 327, the echo cancellation/audio synthesizing circuit 323 performs echo cancellation on the user (user A)'s audio data, and outputs audio data obtained by synthesizing with other audio data, or the like from the speaker 325 via the audio amplifier circuit 324.

Further, the television receiver 300 also includes an audio codec 328, an internal bus 329, SDRAM (Synchronous Dynamic Random Access Memory) 330, flash memory 331, a CPU 332, a USB (Universal Serial Bus) I/F 333, and a network I/F 334.

The A/D conversion circuit 327 receives the user's audio signal collected by the microphone 326 provided to the television receiver 300 serving as for audio conversation, subjects the received audio signal to A/D conversion processing, and supplies the obtained digital audio data to the audio codec 328.

The audio codec 328 converts the audio data supplied from the A/D conversion circuit 327 into the data of a predetermined format for transmission via a network, and supplies to the network I/F 334 via the internal bus 329.

The network I/F 334 is connected to the network via a cable mounted on a network terminal 335. The network I/F 334 transmits the audio data supplied from the audio codec 328 to another device connected to the network thereof, for example. Also, the network I/F 334 receives, via the network terminal 335, the audio data transmitted from another device connected thereto via the network, and supplies this to the audio codec 328 via the internal bus 329, for example.

The audio codec 328 converts the audio data supplied from the network I/F 334 into the data of a predetermined format, and supplies this to the echo cancellation/audio synthesizing circuit 323.

The echo cancellation/audio synthesizing circuit 323 performs echo cancellation with the audio data supplied from the audio codec 328 taken as a object, and outputs the data of audio obtained by synthesizing the audio data and other audio data, or the like, from the speaker 325 via the audio amplifier circuit 324.

The SDRAM 330 stores various types of data necessary for the CPU 332 performing processing.

The flash memory 331 stores a program to be executed by the CPU 332. The program stored in the flash memory 331 is read out by the CPU 332 at predetermined timing such as when activating the television receiver 300, or the like. EPG data obtained via a digital broadcast, data obtained from a predetermined server via the network, and so forth are also stored in the flash memory 331.

For example, MPEG-TS including the content data obtained from a predetermined server via the network by the control of the CPU 332 is stored in the flash memory 331. The flash memory 331 supplies the MPEG-TS thereof to the MPEG decoder 317 via the internal bus 329 by the control of the CPU 332, for example.

The MPEG decoder 317 processes the MPEG-TS thereof in the same way as with the case of the MPEG-TS supplied from the digital tuner 316. In this way, the television receiver 300 receives the content data made up of video, audio, and so forth via the network, decodes using the MPEG decoder 317, whereby video thereof can be displayed, and audio thereof can be output.

Also, the television receiver 300 also includes a light reception unit 337 for receiving the infrared signal transmitted from a remote controller 351.

The light reception unit 337 receives infrared rays from the remote controller 351, and outputs a control code representing the content of the user's operation obtained by demodulation, to the CPU 332.

The CPU 332 executes the program stored in the flash memory 331 to control the entire operation of the television receiver 300 according to the control code supplied from the light reception unit 337, and so forth. The CPU 332, and the units of the television receiver 300 are connected via an unshown path.

The USB I/F 333 performs transmission/reception of data as to an external device of the television receiver 300 which is connected via a USB cable mounted on a USB terminal 336. The network I/F 334 connects to the network via a cable mounted on the network terminal 335, also performs transmission/reception of data other than audio data as to various devices connected to the network.

The television receiver 300 can improve encoding efficiency by using the above-described image decoding devices as the MPEG decoder 317. As a result thereof, the television receiver 300 can obtain and display higher image quality decoded images from broadcast signals received via an antenna or content data obtained via a network.

[Configuration Example of Cellular Telephone]

Figure 28:
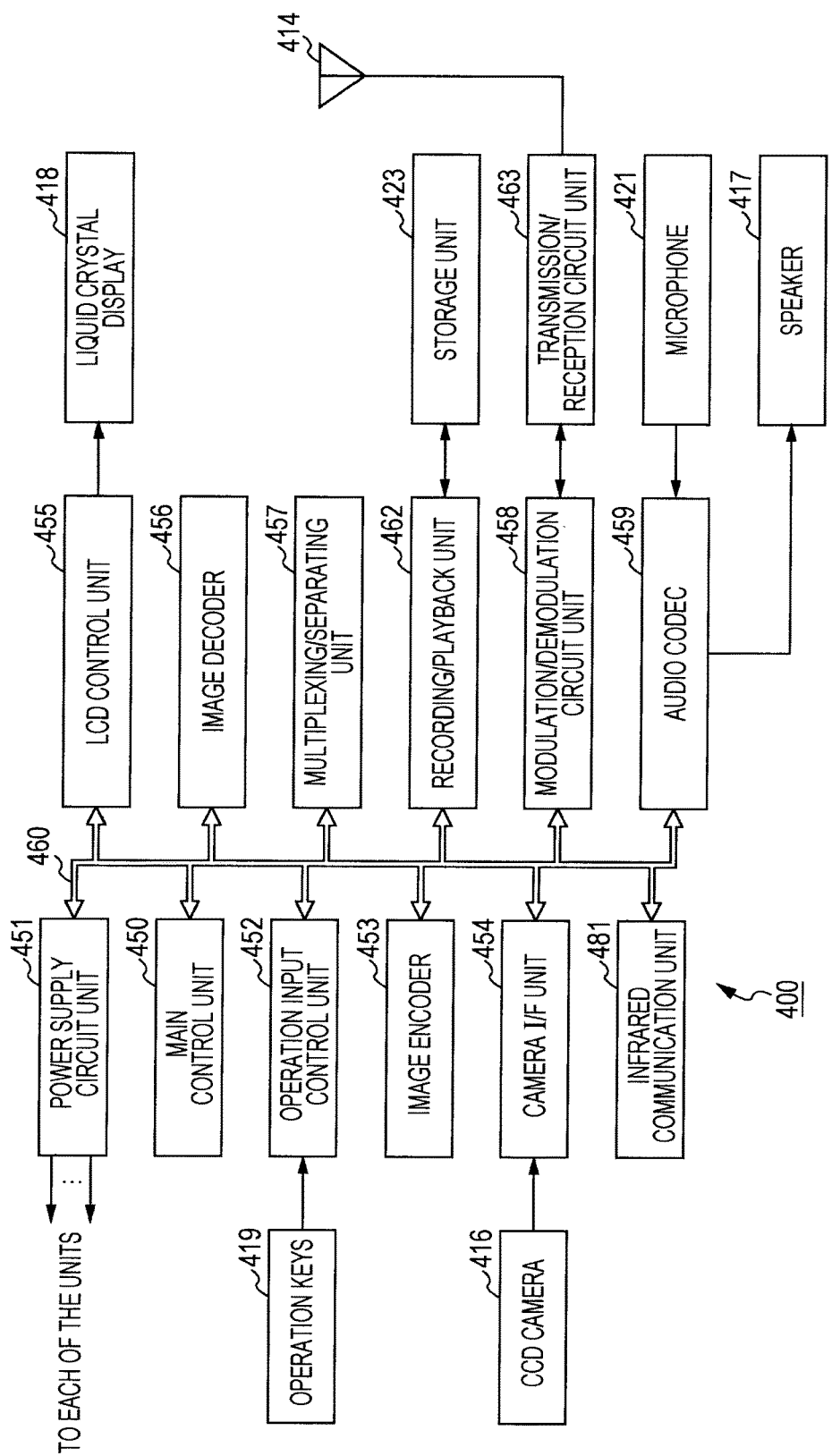
FIG. 28 is a block diagram illustrating a principal configuration example of a cellular phone.

FIG. 28 is a block diagram illustrating a principal configuration example of a cellular telephone using the image encoding device and image decoding device to which the present invention has been applied.

A cellular telephone 400 shown in FIG. 28 includes a main control unit 450 configured so as to integrally control the units, a power supply circuit unit 451, an operation input control unit 452, an image encoder 453, a camera I/F unit 454, an LCD control unit 455, an image decoder 456, a multiplexing/separating unit 457, a recording/playing unit 462, a modulation/demodulation circuit unit 458, and an audio codec 459. These are mutually connected via a bus 460.

Also, the cellular telephone 400 includes operation keys 419, a CCD (Charge Coupled Devices) camera 416, a liquid crystal display 418, a storage unit 423, a transmission/reception circuit unit 463, an antenna 414, a microphone (MIC) 421, and a speaker 417.

Upon a call end and power key being turned on by the user's operation, the power supply circuit unit 451 activates the cellular telephone 400 in an operational state by supplying power to the units from a battery pack.

The cellular telephone 400 performs various operations, such as transmission/reception of an audio signal, transmission/reception of an e-mail and image data, image shooting, data recoding, and so forth, in various modes such as a voice call mode, a data communication mode, and so forth, based on the control of the main control unit 450 made up of a CPU, ROM, RAM, and so forth.

For example, in the voice call mode, the cellular telephone 400 converts the audio signal collected by the microphone (mike) 421 into digital audio data by the audio codec 459, subjects this to spectrum spread processing at the modulation/demodulation circuit unit 458, and subjects this to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (audio signal) transmitted to the base station is supplied to the cellular telephone of the other party via the public telephone network.

Also, for example, in the voice call mode, the cellular telephone 400 amplifies the reception signal received at the antenna 414, at the transmission/reception circuit unit 463, further subjects to frequency conversion processing and analog/digital conversion processing, subjects to spectrum inverse spread processing at the modulation/demodulation circuit unit 458, and converts into an analog audio signal by the audio codec 459. The cellular telephone 400 outputs the converted and obtained analog audio signal thereof from the speaker 417.

Further, for example, in the event of transmitting an e-mail in the data communication mode, the cellular telephone 400 accepts the text data of the e-mail input by the operation of the operation keys 419 at the operation input control unit 452. The cellular telephone 400 processes the text data thereof at the main control unit 450, and displays on the liquid crystal display 418 via the LCD control unit 455 as an image.

Also, the cellular telephone 400 generates e-mail data at the main control unit 450 based on the text data accepted by the operation input control unit 452, the user's instructions, and so forth. The cellular telephone 400 subjects the e-mail data thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (e-mail) transmitted to the base station is supplied to a predetermined destination via the network, mail server, and so forth.

Also, for example, in the event of receiving an e-mail in the data communication mode, the cellular telephone 400 receives the signal transmitted from the base station via the antenna 414 with the transmission/reception circuit unit 463, amplifies, and further subjects to frequency conversion processing and analog/digital conversion processing. The cellular telephone 400 subjects the reception signal thereof to spectrum inverse spread processing at the modulation/demodulation circuit unit 458 to restore the original e-mail data. The cellular telephone 400 displays the restored e-mail data on the liquid crystal display 418 via the LCD control unit 455.

Note that the cellular telephone 400 may record (store) the received e-mail data in the storage unit 423 via the recording/playing unit 462.

This storage unit 423 is an optional rewritable recording medium. The storage unit 423 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 423 may be other than these.

Further, for example, in the event of transmitting image data in the data communication mode, the cellular telephone 400 generates image data by imaging at the CCD camera 416. The CCD camera 416 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 416 performs compression encoding of the image data at the image encoder 453 via the camera I/F unit 454 for example, by predetermined format such as MPEG 2, MPEG 4, and so forth, and converts into encoded image data.

The cellular telephone 400 employs the above-described image encoding devices as the image encoder 453 for performing such processing. Accordingly, in the same way as with the above-described image encoding devices, the image encoder 453 can achieve higher encoding efficiency.

Note that, at this time simultaneously, the cellular telephone 400 converts the audio collected at the microphone (mike) 421, while shooting with the CCD camera 416, from analog to digital at the audio codec 459, and further encodes this.

The cellular telephone 400 multiplexes the encoded image data supplied from the image encoder 453, and the digital audio data supplied from the audio codec 459 at the multiplexing/separating unit 457 using a predetermined method. The cellular telephone 400 subjects the multiplexed data obtained as a result thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (image data) transmitted to the base station is supplied to the other party via the network or the like.

Note that in the event that image data is not transmitted, the cellular telephone 400 may also display the image data generated at the CCD camera 416 on the liquid crystal display 418 via the LCD control unit 455 instead of the image encoder 453.

Also, for example, in the event of receiving the data of a moving image file linked to a simple website or the like in the data communication mode, the cellular telephone 400 receives the signal transmitted from the base station at the transmission/reception circuit unit 463 via the antenna 414, amplifies, and further subjects to frequency conversion processing and analog/digital conversion processing. The cellular telephone 400 subjects the received signal to spectrum inverse spread processing at the modulation/demodulation circuit unit 458 to restore the original multiplexed data. The cellular telephone 400 separates the multiplexed data thereof at the multiplexing/separating unit 457 into encoded image data and audio data.

The cellular telephone 400 decodes the encoded image data at the image decoder 456 by a decoding format corresponding to the predetermined encoding format such as MPEG 2, MPEG 4, and so forth, thereby generating playing moving image data, and displays this on the liquid crystal display 418 via the LCD control unit 455. Thus, moving image data included in a moving image file linked to a simple website is displayed on the liquid crystal display 418, for example.

The cellular telephone 400 employs the above-described image decoding devices as the image decoder 456 for performing such processing. Accordingly, in the same way as with the above-described image decoding devices, the image decoder 456 can achieve higher encoding efficiency.

At this time, simultaneously, the cellular telephone 400 converts the digital audio data into an analog audio signal at the audio codec 459, and outputs this from the speaker 417.

Thus, audio data included in a moving image file linked to a simple website is played, for example.

Note that, in the same way as with the case of e-mail, the cellular telephone 400 may record (store) the received data linked to a simple website or the like in the storage unit 423 via the recording/playing unit 462.

Also, the cellular telephone 400 analyzes the imaged two-dimensional code obtained by the CCD camera 416 at the main control unit 450, whereby information recorded in the two-dimensional code can be obtained.

Further, the cellular telephone 400 can communicate with an external device at the infrared communication unit 481 using infrared rays.

The cellular telephone 400 employs the above-described image encoding devices as the image encoder 453, whereby encoding efficiency can be improved. As a result, the cellular telephone 400 can provide encoded data (image data) with good encoding efficiency to another device.

Also, the cellular telephone 400 employs the above-described image decoding devices as the image decoder 456, whereby encoding efficiency can be improved. As a result thereof, the cellular telephone 400 can obtain and display higher definition decoded images from a moving image file linked to at a simple website or the like, for example.

Note that description has been made so far wherein the cellular telephone 400 employs the CCD camera 416, but the cellular telephone 400 may employ an image sensor (CMOS image sensor) using CMOS (Complementary Metal Oxide Semiconductor) instead of this CCD camera 416. In this case as well, the cellular telephone 400 can image a subject and generate the image data of an image of the subject in the same way as with the case of employing the CCD camera 416.

Also, description has been made so far regarding the cellular telephone 400, but the above-described image encoding devices and the above-described image decoding devices may be applied to any kind of device in the same way as with the case of the cellular telephone 400 as long as it is a device having the same imaging function and communication function as those of the cellular telephone 400, for example, such as a PDA (Personal Digital Assistants), smart phone, UMPC (Ultra Mobile Personal Computer), net book, notebook-sized personal computer, or the like.

[Configuration Example of Hard Disk Recorder]

Figure 29:
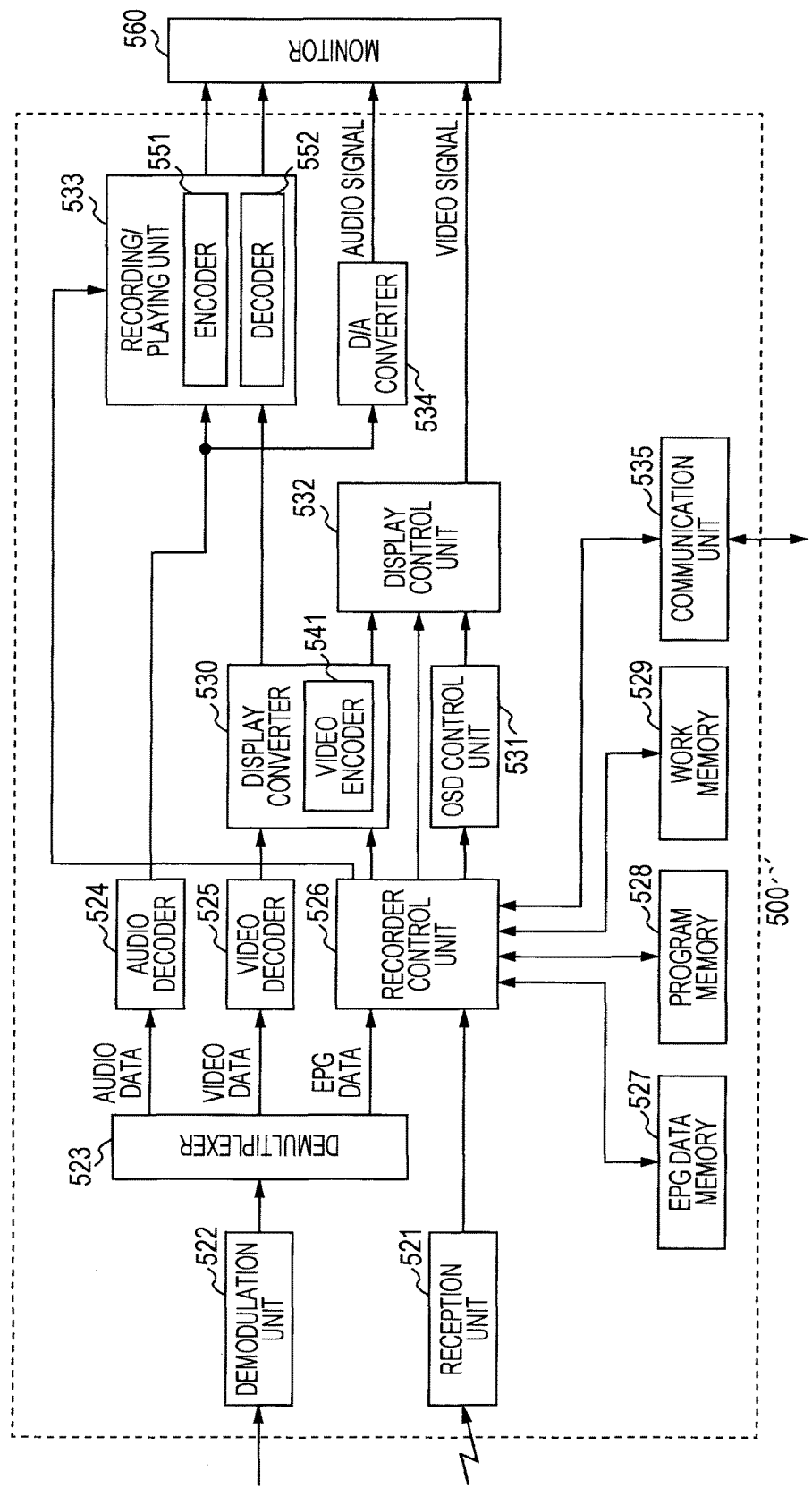
FIG. 29 is a block diagram illustrating a principal configuration example of a hard disk recorder.

FIG. 29 is a block diagram illustrating a principal configuration example of a hard disk recorder which employs the image encoding device and image decoding device to which the present invention has been applied.

A hard disk recorder (HDD recorder) 500 shown in FIG. 29 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 500 can extract audio data and video data from broadcast wave signals, decode these as appropriate, and store in the built-in hard disk, for example. Also, the hard disk recorder 500 can also obtain audio data and video data from another device via the network, decode these as appropriate, and store in the built-in hard disk, for example.

Further, the hard disk recorder 500 can decode audio data and video data recorded in the built-in hard disk, supply this to a monitor 560, display an image thereof on the screen of the monitor 560, and output audio thereof from the speaker of the monitor 560, for example.

The hard disk recorder 500 can decode audio data and video data extracted from broadcast signals obtained via a tuner, or audio data and video data obtained from another device via a network, supply this to the monitor 560, display an image thereof on the screen of the monitor 560, and output audio thereof from the speaker of the monitor 560, for example.

Of course, operations other than these may be performed.

As shown in FIG. 29, the hard disk recorder 500 includes a reception unit 521, a demodulation unit 522, a demultiplexer 523, an audio decoder 524, a video decoder 525, and a recorder control unit 526. The hard disk recorder 500 further includes EPG data memory 527, program memory 528, work memory 529, a display converter 530, an OSD (On Screen Display) control unit 531, a display control unit 532, a recording/playing unit 533, a D/A converter 534, and a communication unit 535.

Also, the display converter 530 includes a video encoder 541. The recording/playing unit 533 includes an encoder 551 and a decoder 552.

The reception unit 521 receives the infrared signal from the remote controller (not shown), converts into an electrical signal, and outputs to the recorder control unit 526. The recorder control unit 526 is configured of, for example, a microprocessor and so forth, and executes various types of processing in accordance with the program stored in the program memory 528. At this time, the recorder control unit 526 uses the work memory 529 according to need.

The communication unit 535, which is connected to the network, performs communication processing with another device via the network. For example, the communication unit 535 is controlled by the recorder control unit 526 to communicate with a tuner (not shown), and to principally output a channel selection control signal to the tuner.

The demodulation unit 522 demodulates the signal supplied from the tuner, and outputs to the demultiplexer 523. The demultiplexer 523 separates the data supplied from the demodulation unit 522 into audio data, video data, and EPG data, and outputs to the audio decoder 524, video decoder 525, and recorder control unit 526, respectively.

The audio decoder 524 decodes the input audio data, for example, with the MPEG format, and outputs to the recording/playing unit 533. The video decoder 525 decodes the input video data, for example, with the MPEG format, and outputs to the display converter 530. The recorder control unit 526 supplies the input EPG data to the EPG data memory 527 for storing.

The display converter 530 encodes the video data supplied from the video decoder 525 or recorder control unit 526 into, for example, the video data conforming to the NTSC (National Television Standards Committee) format using the video encoder 541, and outputs to the recording/playing unit 533. Also, the display converter 530 converts the size of the screen of the video data supplied from the video decoder 525 or recorder control unit 526 into the size corresponding to the size of the monitor 560, converts the video data of which the screen size has been converted into the video data conforming to the NTSC format using the video encoder 541, converts into an analog signal, and outputs to the display control unit 532.

The display control unit 532 superimposes, under the control of the recorder control unit 526, the OSD signal output from the OSD (On Screen Display) control unit 531 on the video signal input from the display converter 530, and outputs to the display of the monitor 560 for displaying.

Also, the audio data output from the audio decoder 524 has been converted into an analog signal using the D/A converter 534, and supplied to the monitor 560. The monitor 560 outputs this audio signal from the built-in speaker.

The recording/playing unit 533 includes a hard disk as a recording medium in which video data, audio data, and so forth are recorded.

The recording/playing unit 533 encodes the audio data supplied from the audio decoder 524 with the MPEG format by the encoder 551. Also, the recording/playing unit 533 encodes the video data supplied from the video encoder 541 of the display converter 530 with the MPEG format by the encoder 551. The recording/playing unit 533 synthesizes the encoded data of the audio data thereof, and the encoded data of the video data thereof using the multiplexer. The recording/playing unit 533 amplifies the synthesized data thereof by channel coding, and writes the data thereof in the hard disk via a recording head.

The recording/playing unit 533 plays the data recorded in the hard disk via a playing head, amplifies, and separates into audio data and video data using the demultiplexer. The recording/playing unit 533 decodes the audio data and video data by the decoder 552 using the MPEG format. The recording/playing unit 533 converts the decoded audio data from digital to analog, and outputs to the speaker of the monitor 560. Also, the recording/playing unit 533 converts the decoded video data from digital to analog, and outputs to the display of the monitor 560.

The recorder control unit 526 reads out the latest EPG data from the EPG data memory 527 based on the user's instructions indicated by the infrared signal from the remote controller which is received via the reception unit 521, and supplies to the OSD control unit 531. The OSD control unit 531 generates image data corresponding to the input EPG data, and outputs to the display control unit 532. The display control unit 532 outputs the video data input from the OSD control unit 531 to the display of the monitor 560 for displaying. Thus, EPG (Electronic Program Guide) is displayed on the display of the monitor 560.

Also, the hard disk recorder 500 can obtain various types of data such as video data, audio data, EPG data, and so forth supplied from another device via the network such as the Internet or the like.

The communication unit 535 is controlled by the recorder control unit 526 to obtain encoded data such as video data, audio data, EPG data, and so forth transmitted from another device via the network, and to supply this to the recorder control unit 526. The recorder control unit 526 supplies the encoded data of the obtained video data and audio data to the recording/playing unit 533, and stores in the hard disk, for example. At this time, the recorder control unit 526 and recording/playing unit 533 may perform processing such as re-encoding or the like according to need.

Also, the recorder control unit 526 decodes the encoded data of the obtained video data and audio data, and supplies the obtained video data to the display converter 530. The display converter 530 processes, in the same way as with the video data supplied from the video decoder 525, the video data supplied from the recorder control unit 526, supplies to the monitor 560 via the display control unit 532 for displaying an image thereof.

Alternatively, an arrangement may be made wherein in accordance with this image display, the recorder control unit 526 supplies the decoded audio data to the monitor 560 via the D/A converter 534, and outputs audio thereof from the speaker.

Further, the recorder control unit 526 decodes the encoded data of the obtained EPG data, and supplies the decoded EPG data to the EPG data memory 527.

The hard disk recorder 500 thus employs the above-described image decoding devices as the video decoder 525, decoder 552, and decoder housed in the recorder control unit 526. Accordingly, in the same way as with the above-described image decoding devices, the video decoder 525, decoder 552, and decoder housed in the recorder control unit 526 can achieve higher encoding efficiency.

Accordingly, the hard disk recorder 500 can generate higher definition prediction images. As a result thereof, the hard disk recorder 500 can obtain higher definition decoded images from encoded data of video data received via the tuner, from encoded data of video data read out from the hard disk of the recording/playing unit 533, and encoded data of video data obtained via the network, and display on the monitor 560, for example.

Also, the hard disk recorder 500 employs the above-described image encoding devices as the encoder 551. Accordingly, in the same way as with the case of the above-described image encoding devices, the encoder 551 can improve encoding efficiency.

Accordingly, the hard disk recorder 500 can realize increase in processing speed, and also improve encoding efficiency of encoded data to be recorded in the hard disk, for example. As a result thereof, the hard disk recorder 500 can more effectively use the storage region of the hard disk.

Note that description has been made so far regarding the hard disk recorder 500 for recording video data and audio data in the hard disk, but it goes without saying that any kind of recording medium may be employed. For example, even with a recorder to which a recording medium other than a hard disk, such as flash memory, optical disc, video tape, or the like, is applied, the above-described image encoding devices and image decoding devices can be applied thereto in the same way as with the case of the above hard disk recorder 500.

[Configuration Example of Camera]

Figure 30:
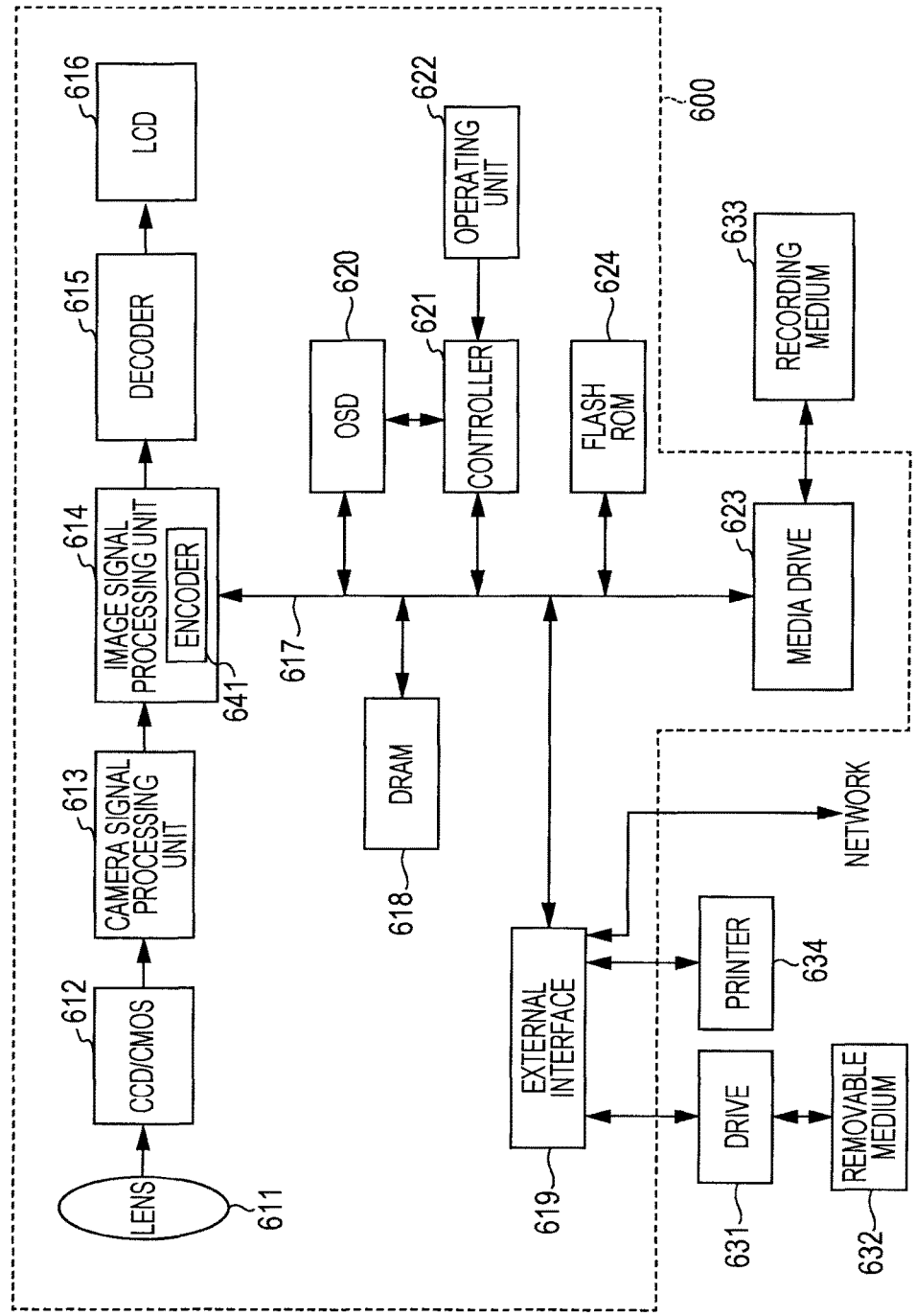
FIG. 30 is a block diagram illustrating a principal configuration example of a camera.

FIG. 30 is a block diagram illustrating a principal configuration example of a camera employing the image encoding device and image decoding device to which the present invention has been applied.

A camera 600 shown in FIG. 30 images a subject, displays an image of the subject on an LCD 616, and records this in a recording medium 633 as image data.

A lens block 611 inputs light (i.e., picture of a subject) to a CCD/CMOS 612. The CCD/CMOS 612 is an image sensor employing a CCD or CMOS, which converts the intensity of received light into an electrical signal, and supplies to a camera signal processing unit 613.

The camera signal processing unit 613 converts the electrical signal supplied from the CCD/CMOS 612 into color difference signals of Y, Cr, and Cb, and supplies to an image signal processing unit 614. The image signal processing unit 614 subjects, under the control of a controller 621, the image signal supplied from the camera signal processing unit 613 to predetermined image processing, or encodes the image signal thereof by an encoder 641 using the MPEG format for example. The image signal processing unit 614 supplies encoded data generated by encoding an image signal, to a decoder 615. Further, the image signal processing unit 614 obtains data for display generated at an on-screen display (OSD) 620, and supplies this to the decoder 615.

With the above-described processing, the camera signal processing unit 613 appropriately takes advantage of DRAM (Dynamic Random Access Memory) 618 connected via a bus 617 to hold image data, encoded data encoded from the image data thereof, and so forth in the DRAM 618 thereof according to need.

The decoder 615 decodes the encoded data supplied from the image signal processing unit 614, and supplies obtained image data (decoded image data) to the LCD 616. Also, the decoder 615 supplies the data for display supplied from the image signal processing unit 614 to the LCD 616. The LCD 616 synthesizes the image of the decoded image data, and the image of the data for display, supplied from the decoder 615 as appropriate, and displays a synthesizing image thereof.

The on-screen display 620 outputs, under the control of the controller 621, data for display such as a menu screen or icon or the like made up of a symbol, characters, or a figure to the image signal processing unit 614 via the bus 617.

Based on a signal indicating the content commanded by the user using an operating unit 622, the controller 621 executes various types of processing, and also controls the image signal processing unit 614, DRAM 618, external interface 619, on-screen display 620, media drive 623, and so forth via the bus 617. Programs, data, and so forth necessary for the controller 621 executing various types of processing are stored in FLASH ROM 624.

For example, the controller 621 can encode image data stored in the DRAM 618, or decode encoded data stored in the DRAM 618 instead of the image signal processing unit 614 and decoder 615. At this time, the controller 621 may perform encoding/decoding processing using the same format as the encoding/decoding format of the image signal processing unit 614 and decoder 615, or may perform encoding/decoding processing using a format that neither the image signal processing unit 614 nor the decoder 615 can handle.

Also, for example, in the event that start of image printing has been instructed from the operating unit 622, the controller 621 reads out image data from the DRAM 618, and supplies this to a printer 634 connected to the external interface 619 via the bus 617 for printing.

Further, for example, in the event that image recording has been instructed from the operating unit 622, the controller 621 reads out encoded data from the DRAM 618, and supplies this to a recording medium 633 mounted on the media drive 623 via the bus 617 for storing.

The recording medium 633 is an optional readable/writable removable medium, for example, such as a magnetic disk, a magneto-optical disk, an optical disc, semiconductor memory, or the like. It goes without saying that the recording medium 633 is also optional regarding the type of a removable medium, and accordingly may be a tape device, or may be a disc, or may be a memory card. It goes without saying that the recoding medium 633 may be a non-contact IC card or the like.

Alternatively, the media drive 623 and the recording medium 633 may be configured so as to be integrated into a non-transportable recording medium, for example, such as a built-in hard disk drive, SSD (Solid State Drive), or the like.

The external interface 619 is configured of, for example, a USB input/output terminal and so forth, and is connected to the printer 634 in the event of performing printing of an image. Also, a drive 631 is connected to the external interface 619 according to need, on which the removable medium 632 such as a magnetic disk, optical disc, or magneto-optical disk is mounted as appropriate, and a computer program read out therefrom is installed in the FLASH ROM 624 according to need.

Further, the external interface 619 includes a network interface to be connected to a predetermined network such as a LAN, the Internet, or the like. For example, in accordance with the instructions from the operating unit 622, the controller 621 can read out encoded data from the DRAM 618, and supply this from the external interface 619 to another device connected via the network. Also, the controller 621 can obtain, via the external interface 619, encoded data or image data supplied from another device via the network, and hold this in the DRAM 618, or supply this to the image signal processing unit 614.

The camera 600 thus configured employs the above-described image decoding devices as the decoder 615. Accordingly, in the same way as with the above-described image decoding devices, the decoder 615 can achieve higher encoding efficiency.

Accordingly, the camera 600 can generate a prediction image with high precision. As a result thereof, the camera 600 can obtain higher definition decoded images from, for example, image data generated at the CCD/CMOS 612, encoded data of video data read out from the DRAM 618 or recording medium 633, and encoded data of video data obtained via a network, and display on the LCD 616.

Also, the camera 600 employs the above-described image encoding devices as the encoder 641. Accordingly, in the same way as with the case of the above-described image encoding devices, the encoder 641 can achieve higher encoding efficiency.

Accordingly, the camera 600 can improve encoding efficiency of encoded data to be recorded in the hard disk, for example. As a result thereof, the camera 600 can more effectively use the storage region of the DRAM 618 or recording medium 633.

Note that the decoding method of the above-described image decoding devices may be applied to the decoding processing which the controller 621 performs. In the same way, the encoding method of the above-described image encoding devices may be applied to the encoding processing which the controller 621 performs.

Also, the image data which the camera 600 takes may be moving images or may be still images.

As a matter of course, the above-described image encoding devices and image decoding devices may be applied to devices and systems other than the above-described devices.

Note that the present technology may assume the following configurations as well.

(1) An image processing device including:

a code number assigning unit configured to control a way in which code numbers are assigned to prediction motion vector information, in accordance with motion features of an image; and a prediction motion vector generating unit configured to use peripheral motion information which is motion information of a peripheral region of a current region which is to be processed to generate prediction motion vector information of the region, and assign the code number to the prediction motion vector information that has been generated, following the way in which code numbers are assigned that has been decided by the code number assigning unit.

(2) The image processing device according to (1), wherein the code number assigning unit controls the way in which code numbers are assigned to the prediction motion vector information, for each increment region of prediction processing.

(3) The image processing device according to (2), wherein, in the event that the region is a still region, the code number assigning unit controls the way in which code numbers are assigned such that a small code number is assigned to temporal prediction motion vector information.

(4) The image processing device according to (3), wherein, in the event that the region is a still region, the prediction motion vector generating unit generates only the temporal prediction motion vector information, and assigns to the temporal prediction motion vector information a code number decided by the code number assigning unit.

(5) The image processing device according to any one of (2) through (4), wherein, in the event that the region is a moving region, the code number assigning unit controls the way in which code numbers are assigned such that a small code number is assigned to spatial prediction motion vector information.

(6) The image processing device according to any one of (2) through (5), further including:
a still region determining unit configured to determine whether or not a current region is a still region;
wherein the code number assigning unit controls the way in which code numbers are assigned to prediction motion vector information of the current region, following the determination results of the still region determining unit.

(7) The image processing device according to (6), wherein the still region determining region determines whether or not a current region is a still region using motion information of a Co-Located region of the current region.

(8) The image processing device according to (7), wherein the still region determining region determines a current region to be a still region in the event that absolute values of a horizontal component of motion information of the Co-Located region of the current region and a vertical component of the motion information are within a predetermined threshold value, and also in the event that a reference index is 0, a Ref_PicR_reordering is applied, or a reference index has a POC value indicating a picture immediately prior.

(9) The image processing device according to any one of (1) through (8), wherein the code number assigning unit controls the way in which code numbers are assigned to the prediction motion vector information, in accordance with user settings.

(10) The image processing device according to any one of (1) through (9), wherein the code number assigning unit controls the way in which code numbers are assigned to the prediction motion vector information, so as to raise encoding efficiency.

(11) The image processing device according to any one of (1) through (10), wherein the code number assigning unit controls the way in which code numbers are assigned to the prediction motion vector information, so as to optimize subjective image quality.

(12) The image processing device according to (1), wherein the code number assigning unit controls the way in which code numbers are assigned to the prediction motion vector information, for each slice.

(13) The image processing device according to any one of (1) through (12), further including:
a flag generating unit configured to generate a flag indicating a variable mode in which the way in which the code numbers are assigned is changeable.

(14) The image processing device according to any one of (1) through (13), wherein the prediction motion vector generating unit generates multiple prediction motion vector information for each prediction mode;
and further including:
a difference motion vector generating unit configured to select, for each the prediction mode, optimal prediction motion vector information from the plurality of prediction motion vector information generated by the prediction motion vector generating unit, and generating a difference motion vector which is the difference as to a motion vector of the current region;
a mode determining unit configured to determine from the prediction modes, an optimal prediction mode; and
a transmission unit configured to transmit the difference motion vector information of the prediction mode determined by the mode determining unit, and the code number of the prediction motion vector information of the prediction mode.

(15) The image processing device according to (14), further including:
an encoding unit configured to encode the difference motion vector information of the prediction mode determined by the mode determining unit, and the code number of the prediction motion vector information of the prediction mode;
wherein the transmission unit transmits the difference vector information encoded by the encoding unit, and the code number of the prediction motion vector information.

(16) An image processing method of an image processing device, the method including:
a code number assigning unit controlling a way in which code numbers are assigned to prediction motion vector information, in accordance with motion features of an image; and
a prediction motion vector generating unit using peripheral motion information which is motion information of a peripheral region of a current region which is to be processed to generate prediction motion vector information of the region, and assigning the code number to the prediction motion vector information that has been generated, following the way in which code numbers are assigned that has been decided.

(17) An image processing device including:
a code number assigning unit configured to control a way in which code numbers are assigned to prediction motion vector information, in accordance with motion features of an image; and
a prediction motion vector reconstructing unit configured to obtain a code number of prediction motion vector information of a current region which is to be processed, and reconstruct the prediction motion vector information from the code number, following the way in which code numbers are assigned that has been decided by the code number assigning unit.

(18) The image processing device according to (17), wherein the code number assigning unit controls the way in which code numbers are assigned to the prediction motion vector information, for each increment region of prediction processing.

(19) The image processing device according to (18), wherein, in the event that the region is a still region, the code number assigning unit controls the way in which code numbers are assigned such that a small code number is assigned to temporal prediction motion vector information.

(20) The image processing device according to (18) or (19), wherein, in the event that the region is a moving region, the code number assigning unit controls the way in which code numbers are assigned such that a small code number is assigned to spatial prediction motion vector information.

(21) The image processing device according to any one of (18) through (20), further including:
a still region determining unit configured to determine whether or not a current region is a still region;
wherein the code number assigning unit controls the way in which code numbers are assigned to prediction motion vector information of the current region, following the determination results of the still region determining unit.

(22) The image processing device according to (21), wherein the still region determining region determines whether or not a current region is a still region using motion information of a Co-Located region of the current region.

(23) The image processing device according to (22), wherein the still region determining region determines a current region to be a still region in the event that absolute values of a horizontal component of motion information of the Co-Located region of the current region and a vertical component of the motion information are within a predetermined threshold value, and also in the event that a reference index is 0, a Ref_PicR_reordering is applied, or a reference index has a POC value indicating a picture immediately prior.

(24) The image processing device according to any one of (17) through (23), wherein the code number assigning unit controls the way in which code numbers are assigned to the prediction motion vector information, in accordance with user settings.

(25) The image processing device according to any one of (17) through (24), wherein the code number assigning unit controls the way in which code numbers are assigned to the prediction motion vector information, so as to raise encoding efficiency.

(26) The image processing device according to any one of (17) through (25), wherein the code number assigning unit controls the way in which code numbers are assigned to the prediction motion vector information, so as to optimize subjective image quality.

(27) The image processing device according to (17), wherein the code number assigning unit controls the way in which code numbers are assigned to the prediction motion vector information, for each slice.

(28) The image processing device according to any one of (16) through (27), further including:
a flag obtaining unit configured to obtain a flag indicating a variable mode in which the way in which the code numbers are assigned is changeable;
wherein, in the event that the flag obtained by the flag indicates the variable mode, the code number assigning unit controls the way in which the code numbers are assigned to the prediction motion vector information.

(29) An image processing method of an image processing device, the method including:
a code number assigning unit controlling a way in which code numbers are assigned to prediction motion vector information, in accordance with motion features of an image; and
a prediction motion vector reconstructing unit obtaining a code number of prediction motion vector information of a current region which is to be processed, and reconstructing the prediction motion vector information from the code number, following the way in which code numbers are assigned that has been decided.

REFERENCE SIGNS LIST 51 image encoding device
66 lossless encoding unit
74 intra prediction unit
75 motion prediction/compensation unit
76 prediction motion vector generating unit
77 code number assigning unit
91 motion search unit
92 cost function calculating unit
93 optimal prediction motion vector selecting unit
94 mode determining unit
95 motion compensation unit
101 image decoding device
112 lossless decoding unit
121 intra prediction unit
122 motion prediction/compensation unit
123 code number assigning buffer
124 prediction motion vector generating unit
131 difference vector buffer
132 block level code number buffer
133 motion vector generating unit
134 motion vector buffer
135 motion compensation unit
151 image encoding device
161 code number assigning unit
162 lossless encoding unit
163 optimal code number assignation determining unit

The invention claimed is:

1. An image processing device comprising:
a code number assigning unit configured to dynamically assign a respective code number to each of a spatial prediction motion vector and a temporal prediction motion vector, wherein the code number assigned to the spatial prediction motion vector and the code number assigned to the temporal prediction motion vector are of values decided by the code number assigning unit based on motion features of an image to be encoded and according to frequency of appearance of the spatial prediction motion vector and the temporal prediction motion vector respectively; and
a prediction motion vector generating unit configured to generate a prediction motion vector in a current block of the image using the temporal prediction motion vector and the spatial prediction motion vector each having a respective code number dynamically assigned thereto by the code number assigning unit,
wherein the prediction motion vector generating unit and the code number assigning unit are each implemented via at least one processor.

2. The image processing device according to claim 1, wherein the code number assigned to the temporal prediction motion vector and the code number assigned to the spatial prediction motion vector are changed.

3. The image processing device according to claim 2, wherein, in the event that the code number assigned to the spatial prediction motion vector is set to be of a smaller value than the code number assigned to the temporal prediction motion vector as default settings, the code number assigned to the temporal prediction motion vector is changed to be of a greater value than the code number assigned to the spatial prediction motion vector.

4. The image processing device according to claim 3, wherein the value of the code number assigned to the temporal prediction motion vector is set from 1 to 0, and the value of the code number assigned to the spatial prediction motion vector is set from 0 to 1.

5. The image processing device according to claim 4, further comprising:
a mode setting unit configured to set a condition in accordance with changeability of motion vector candidates of the spatial prediction motion vector and the temporal prediction motion vector;
wherein the code number assigning unit assigns the code number following the condition set by the mode setting unit; and wherein the mode setting unit and the code number assigning unit are each implemented via at least one processor.

6. An image processing method of an image processing device, the method comprising:
  dynamically assigning a respective code number to each of a spatial prediction motion vector and a temporal prediction motion vector, wherein the code number assigned to the spatial prediction motion vector and the code number assigned to the temporal prediction motion vector are of values decided based on motion features of an image to be encoded and according to frequency of appearance of the spatial prediction motion vector and the temporal prediction motion vector respectively; and
  generating a prediction motion vector in a current block of the image using the temporal prediction motion vector and spatial prediction motion vector each having a respective code number dynamically assigned thereto.

7. The image processing device according to claim 1, wherein the assigned code number is smaller as the frequency of appearance is higher.

8. The image processing method according to claim 6, wherein the assigned code number is smaller as the frequency of appearance is higher.

* * * * *